US012154697B2

(12) United States Patent
Cisneros, Jr. et al.

(10) Patent No.: US 12,154,697 B2
(45) Date of Patent: Nov. 26, 2024

(54) ANTI-PROLIFERATION SAFEGUARDS FOR NUCLEAR FUEL SALTS

(71) Applicant: TerraPower, LLC, Bellevue, WA (US)

(72) Inventors: Anselmo T. Cisneros, Jr., Seattle, WA (US); Ken Czerwinski, Seattle, WA (US); Bassem S. El-Dasher, Sammamish, WA (US); Brian C. Kelleher, Seattle, WA (US); William M. Kerlin, Bellevue, WA (US); Kevin Kramer, Redmond, WA (US); Jeffery F. Latkowski, Mercer Island, WA (US); Robert C. Petroski, Seattle, WA (US); Joshua C. Walter, Kirkland, WA (US)

(73) Assignee: TerraPower, LLC, Bellevue, WA (US)

( * ) Notice: Subject to any disclaimer, the term of this patent is extended or adjusted under 35 U.S.C. 154(b) by 381 days.

(21) Appl. No.: 17/580,295

(22) Filed: Jan. 20, 2022

(65) Prior Publication Data

US 2022/0139577 A1    May 5, 2022

Related U.S. Application Data

(63) Continuation of application No. 16/676,183, filed on Nov. 6, 2019, now Pat. No. 11,276,503, which is a
(Continued)

(51) Int. Cl.
*G21C 3/54* (2006.01)
*G21C 1/02* (2006.01)
*G21C 19/30* (2006.01)

(52) U.S. Cl.
CPC ............. *G21C 3/54* (2013.01); *G21C 1/026* (2013.01); *G21C 19/30* (2013.01)

(58) Field of Classification Search
CPC ........................................................ G21C 3/54
See application file for complete search history.

(56) References Cited

U.S. PATENT DOCUMENTS 2,375,009 A    5/1945    Lepsoe et al.
2,874,106 A    2/1959    Hammond et al.
(Continued)

FOREIGN PATENT DOCUMENTS

CN    107112055    9/2020
DE    1112791    8/1961
(Continued)

OTHER PUBLICATIONS

EP14863738.2 European Extended Search Report for EP 14863738.2 dated Jun. 2, 2017, 11 pages.
(Continued)

*Primary Examiner* — Sharon M Davis
(74) *Attorney, Agent, or Firm* — Merchant and Gould, PC

(57) ABSTRACT

An anti-proliferation technique is disclosed to reduce the likelihood of nuclear proliferation due to the use fissionable fuel salts. The technique includes doping the fuel salt with one or more elements (referred to herein as activation dopants) that, upon exposure to neutrons such as would occur in the fuel salt when a reactor is in operation, undergo a nuclear reaction to, directly or indirectly, form highly active "protecting isotopes" (of the same element as the activation dopant or a different element). A sufficient mass of activation dopants is used so that the Figure of Merit (FOM) of the fuel salt is decreased to below 1.0 within some target number of days of fission. This allows the FOM of the fuel salt to be controlled so that the fuel becomes too dangerous to handle before to the creation of a significant amount of weaponizable isotopes.

14 Claims, 28 Drawing Sheets

Related U.S. Application Data continuation-in-part of application No. 15/584,926, filed on May 2, 2017, now abandoned, which is a continuation-in-part of application No. 14/981,512, filed on Dec. 28, 2015, now abandoned.

(60) Provisional application No. 62/330,695, filed on May 2, 2016, provisional application No. 62/234,889, filed on Sep. 30, 2015, provisional application No. 62/098,984, filed on Dec. 31, 2014, provisional application No. 62/097,235, filed on Dec. 29, 2014.

(56) References Cited

U.S. PATENT DOCUMENTS

| | | | |
|---|---|---|---|
| 2,920,024 | A | 1/1960 | Barton et al. |
| 2,945,794 | A | 7/1960 | Winters et al. |
| 3,018,239 | A | 1/1962 | Happell et al. |
| 3,029,130 | A | 4/1962 | Moore |
| 3,046,212 | A | 7/1962 | Anderson |
| 3,136,700 | A | 6/1964 | Poppendiek et al. |
| 3,216,901 | A | 11/1965 | Teitel |
| 3,218,160 | A | 11/1965 | Knighton et al. |
| 3,262,856 | A | 7/1966 | Bettis |
| 3,287,225 | A | 11/1966 | Ackroyd et al. |
| 3,383,285 | A | 5/1968 | Ackroyd et al. |
| 3,450,198 | A | 6/1969 | Brunner |
| 3,785,924 | A | 1/1974 | Notari |
| 3,909,351 | A | 9/1975 | Tilliette |
| 3,996,099 | A | 12/1976 | Faugeras et al. |
| 3,997,413 | A | 12/1976 | Fougner |
| 4,039,377 | A | 8/1977 | Andrieu et al. |
| 4,045,286 | A | 8/1977 | Blum et al. |
| 4,056,435 | A | 11/1977 | Carlier et al. |
| 4,216,821 | A | 8/1980 | Robin |
| 4,342,721 | A | 8/1982 | Pomie |
| 4,397,778 | A | 8/1983 | Lloyd |
| 4,762,667 | A | 8/1988 | Sharbaugh |
| 5,185,120 | A | 2/1993 | Fennern |
| 5,196,159 | A | 3/1993 | Kawashima et al. |
| 5,223,210 | A | 6/1993 | Hunsbedt et al. |
| 5,380,406 | A | 1/1995 | Horton et al. |
| 5,421,855 | A | 6/1995 | Hayden et al. |
| 6,181,759 | B1 | 1/2001 | Heibel |
| 7,217,402 | B1 | 5/2007 | Miller et al. |
| 8,416,908 | B2 | 4/2013 | Mann |
| 8,594,268 | B2 | 11/2013 | Shu |
| 8,734,738 | B1 | 5/2014 | Herrmann |
| 9,171,646 | B2 | 10/2015 | Moses et al. |
| 10,043,594 | B2 | 8/2018 | Scott |
| 10,438,705 | B2 | 10/2019 | Cheatham |
| 10,497,479 | B2 | 12/2019 | Abbott et al. |
| 10,566,096 | B2 | 2/2020 | Czerwinski et al. |
| 10,867,710 | B2 | 12/2020 | Cisneros et al. |
| 10,878,969 | B2 | 12/2020 | Huke et al. |
| 2004/0114703 | A1 | 6/2004 | Bolton et al. |
| 2005/0220251 | A1 | 10/2005 | Yokoyama et al. |
| 2008/0310575 | A1 | 12/2008 | Cinotti |
| 2011/0222642 | A1 | 9/2011 | Gautier |
| 2011/0286563 | A1 | 11/2011 | Moses et al. |
| 2012/0051481 | A1 | 3/2012 | Shu |
| 2012/0056125 | A1 | 3/2012 | Raade et al. |
| 2012/0183112 | A1 | 7/2012 | LeBlanc |
| 2012/0288048 | A1 | 11/2012 | Mann |
| 2012/0314829 | A1 | 12/2012 | Greene |
| 2013/0083878 | A1 | 4/2013 | Massie et al. |
| 2013/0180520 | A1 | 7/2013 | Raade et al. |
| 2013/0272470 | A1 | 10/2013 | Whitten et al. |
| 2014/0166924 | A1 | 6/2014 | Raade et al. |
| 2015/0010875 | A1 | 1/2015 | Raade et al. |
| 2015/0036779 | A1 | 2/2015 | LeBlanc |
| 2015/0078504 | A1 | 3/2015 | Woolley |
| 2015/0117589 | A1 | 4/2015 | Kamei |
| 2015/0170766 | A1 | 6/2015 | Singh et al. |
| 2015/0228363 | A1 | 8/2015 | Dewan et al. |
| 2015/0243376 | A1 | 8/2015 | Wilson |
| 2015/0357056 | A1 | 12/2015 | Shayer |
| 2016/0005497 | A1 | 1/2016 | Scott |
| 2016/0189806 | A1 | 6/2016 | Cheatham, III et al. |
| 2016/0189813 | A1 | 6/2016 | Cisneros et al. |
| 2016/0196885 | A1 | 7/2016 | Singh |
| 2016/0217874 | A1 | 7/2016 | Dewan et al. |
| 2016/0260505 | A1 | 9/2016 | Cadell et al. |
| 2016/0260509 | A1 | 9/2016 | Kim et al. |
| 2017/0084355 | A1 | 3/2017 | Scott |
| 2017/0092381 | A1 | 3/2017 | Cisneros et al. |
| 2017/0117065 | A1 | 4/2017 | Scott |
| 2017/0213610 | A1 | 7/2017 | Sumita et al. |
| 2017/0301413 | A1 | 10/2017 | Cisneros et al. |
| 2017/0301421 | A1 | 10/2017 | Abbott et al. |
| 2017/0316840 | A1 | 11/2017 | Abbott et al. |
| 2017/0316841 | A1 | 11/2017 | Abbott et al. |
| 2018/0019025 | A1 | 1/2018 | Abbott et al. |
| 2018/0047467 | A1 | 2/2018 | Czerwinski et al. |
| 2018/0068750 | A1 | 3/2018 | Cisneros et al. |
| 2018/0137944 | A1 | 5/2018 | Abbott et al. |
| 2018/0277260 | A1 | 9/2018 | Marcille et al. |
| 2019/0237205 | A1 | 8/2019 | Abbott et al. |
| 2019/0311816 | A1 | 10/2019 | Sumita et al. |
| 2020/0027590 | A1 | 1/2020 | Cisneros et al. |
| 2020/0087156 | A1 | 3/2020 | Kelleher |
| 2020/0118698 | A1 | 4/2020 | Cheatham et al. |
| 2020/0122109 | A1 | 4/2020 | Kruizenga et al. |
| 2020/0185114 | A1 | 6/2020 | Abbott et al. |
| 2020/0251231 | A1 | 8/2020 | Czerwinski et al. |

FOREIGN PATENT DOCUMENTS

| | | |
|---|---|---|
| DE | 1439107 | 2/1969 |
| EP | 0617430 | 9/1994 |
| FR | 2296248 | 11/1977 |
| GB | 739968 | 11/1955 |
| GB | 835266 | 5/1960 |
| GB | 964841 | 7/1964 |
| GB | 2073938 B | 7/1984 |
| GB | 2508537 | 12/2014 |
| JP | 571991 | 1/1982 |
| JP | 03282397 A | 12/1991 |
| JP | 2001133572 | 5/2001 |
| JP | 2014119429 A | 12/2012 |
| RU | 57040 U1 | 9/2006 |
| RU | 2424587 C1 | 7/2011 |
| WO | 2013116942 | 8/2013 |
| WO | 2013180029 | 12/2013 |
| WO | 2014074930 | 5/2014 |
| WO | 2014128457 | 8/2014 |
| WO | 2014196338 | 12/2014 |
| WO | 2015140495 | 9/2015 |
| WO | 2016109565 | 7/2016 |
| WO | 2018013317 | 1/2018 |

OTHER PUBLICATIONS

EP15876187.4 European Extended Search Report for EP 15876187.4 dated Sep. 11, 2018, 10 pages.

Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.

Forsberg et al., Fluoride-Salt-Cooled High-Temperature Reactor (FHR) for Power and Process Heat, Final Project Report, MIT-ANP-TR-157, Dec. 2014, 62 pgs.

Forsberg et al., Fluoride-Salt-Cooled High-Temperature Reactor (FHR): Goals, Options, Ownership, Requirements, Design, Licensing, and Support Facilities, MIT Center for Advanced Nuclear Energy Systems, MIT-ANP-TR-154, Dec. 2014, 217 pgs.

Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.

Freeman et al., "Archimedes Plasma Mass Filter," AIP Conf. Proc. 694, 403 (2003).

(56) References Cited

OTHER PUBLICATIONS

Gen IV International Forum, Molten Salt Reactor (MSR), https://www.gen-4.org/gif/jcms/c_9359/msr, accessed Feb. 26, 2016, 3 pgs.

Grimes, W. R., "Molten-Salt Reactor Chemistry," Nucl. Appl. Technol. vol. 8, 137-155 (1970).

Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, 28 pages, Aug. 1969.

Holcomb, et al. Fast Spectrum Molten Salt Reactor Options, Jul. 2011, 46 pages. Available at: http://info.ornl.gov/sites/publications/files/Pub29596.pdf.

Kimura-Neutron Spectrum in Small Iron Pile Surrounded by Lead Reflector, Journal of Nuclear Science and Technology, 15(3), pp. 183-191 (Mar. 1978).

Kramer et al., Fusion-Fission Blanket Options for the Life Engine, Fusion Science and Technology, vol. 60, pp. 72-77, Jul. 2011.

Kramer et al., Parameter study of the Life engine nuclear design, Energy Conversion and Management, 51, pp. 1744-1750, 2010.

Kuznetsov et al., Electrochemical Behavior and Some Thermodynamic Properties of UCl [sub 4] and UCl [sub 3] Dissolved in a LiCl-KCl Eutectic Melt, Journal of the Electrochemical Society, vol. 152, No. 4, Jan. 2005, 11 pages.

Maltsev et al., Redox potentials of uranium in molten eutectic mixture of lithium, potassium, and cesium chlorides, Russian Metallurgy, Maiknauka—Interperidica, RU, vol. 2016, No. 8, Dec. 2016.

Merle-Lucotte, E., Introduction to the Physics of the Molten Salt Fast Reactor, Thorium Energy Conference 2013 (ThEC13), 2013.

Molten Salt Reactor (MSR) Review: Feasibility Study of developing a pilot scale molten salt reactor in the UK, Jul. 2015, Energy Process Development, LTD (available at www.energyprocessdevelopments.com).

Mourogov et al., Potentialities of the fast spectrum molten salt reactor concept: REBUS-3700, Energy Conversion and Management, Mar. 30, 2006, vol. 47, No. 17, pp. 2761-2771.

MSR-Fuji General Information, Technical Features, and Operating Characteristics.

Ottewitte, E. H., "Configuration of a Molten Chloride Fast Reactor on a Thorium Fuel Cycle to Current Nuclear Fuel Cycle Concerns," Ph.D. dissertation, University of California at Los Angeles, 1982.

Ottewitte, E. H., Cursory First Look at the Molten Chloride Fast Reactor as an Alternative to the Conventional BATR Concept.

PCT/US2015/067905 ISR + WO—International Search Report and Written Opinion in International Application PCT/US2015/067905 mailed Aug. 5, 2016, 20 pages.

PCT/US2015/067923 ISR + WO—International Search Report and Written Opinion in International Application PCT/US2015/067923, mailed Apr. 19, 2016.

PCT/US2016/055001 IPRP + WO—International Preliminary Report on Patentability and Written Opinion mailed Apr. 12, 2018, 8 pages.

PCT/US2016/055001 ISR + WO—International Search Report and Written Opinion in International Application PCT/US2016/055001, mailed Jan. 25, 2017, 14 pages.

PCT/US2017/030455 IPRP—International Preliminary Report on Patentability mailed Nov. 6, 2018, 17 pages.

PCT/US2017/030455 ISR + WO—International Search Report and Written Opinion mailed Jan. 30, 2018, 23 pages.

PCT/US2017/030457 IPRP—International Preliminary Report on Patentability mailed Nov. 15, 2018, 15 pages.

PCT/US2017/030457 ISR + WO—International Search Report and Written Opinion in International Application PCT/US2017/030457, mailed Jan. 23, 2018, 20 pages.

PCT/US2017/030666 ISR + WO, date mailed Jul. 20, 2017.

PCT/US2017/030666 PCT International Preliminary Report on Patentability in International Application PCT/US2017/030666 date mailed Nov. 6, 2018, 9 pages.

PCT/US2017/030672 IPRP + WO—International Preliminary Report on Patentability and Written Opinion mailed Nov. 6, 2018, 7 pages.

PCT/US2017/030672 ISR + WO—International Search Report and Written Opinion in International Application No. PCT/US2017/030672, mailed Sep. 27, 2017, 11 pages.

PCT/US2017/038806 IPRP + WO—International Preliminary Report on Patentability and Written Opinion in International Application PCT/US2017/038806, mailed Jan. 15, 2019, 7 pgs.

PCT/US2017/038806 ISR + WO—International Search Report and Written Opinion Oct. 16, 2017.

PCT/US2017/046139 IPRP + WO—International Preliminary Report on Patentability and Written Opinion Feb. 12, 2019, 8 pgs.

Abbott et al, Thermal and Mechanical Design Aspects of the Life Engine, Fusion Science and Technology Dec. 2008; 56(2).

Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.

ASTM International, Designation: B898-11, Standard Specification for Reactive and Refractory Metal Clad Plate (Sep. 2011), 15 pages.

Clarno, K.T. et al., "Trade studies for the liquid-salt-cooled very high-temperature reactor. fiscal year 2006 progress report", ORNL/TM-2006 140 (2007), 35 pgs.

Cohen et al., "Vanadium-Lined HT9 Cladding Tubes", Argonne National Lab ANL/ET/CP-80384, (Feb. 1994), 12 pgs.

Donnelly et al., Fabrication of Heat Exchanger Tube Bundle for the Molten-Salt Reactor Experiment, ORNL-3500, Dec. 9, 1963.

PCT/US2017/046139 ISR + WO—International Search Report and Written Opinion, Jan. 17, 2018, 16 pages.

PCT/US2017/061843 IPRP + WO—International Preliminary Report on Patentability and Written Opinion in International Application PCT/US2017/061843, mailed May 21, 2019, 13 pages.

PCT/US2017/061843 ISR + WO—International Search Report and Written Opinion in International Application PCT/US2017/061843, mailed Oct. 29, 2018, 35 pages.

PCT/US2019/015967 IPRP—International Preliminary Report on Patentability (IPRP) dated Aug. 13, 2020.

PCT/US2019/015967 ISR + WO—International Search Report and Written Opinion of PCT/US2019/015967, mailed Jun. 12, 2019, 20 pages.

PCT/US2019/021791 IPRP—PCT International Preliminary Report on Patentability in International Application PCT/US2019/021791, mailed Sep. 24, 2020, 8 pages.

PCT/US2019/021791 ISR + WO—International Search Report and Written Opinion in International Application PCT/US2019/021791, mailed Nov. 19, 2019, 15 pages.

PCT/US2019/051345 ISR + WO—International Search Report and Written Opinion in International Application PCT/US2019/051345, mailed Mar. 5, 2020, 15 pages.

Reactor Start-up Procedure. Technical University Dresden. Reactor Training Course. pp. 3-4. <https://tu-dresden.de/ing/maschinenwesen/iet/wket/ressourcen/dateien/akr2/Lehrmaterialien/start_e.pdf?lang=en>. (Mar. 2015), 22 pgs.

Scott, Ian and Durham John, the Simple Molten Salt Reactor, Practical, safe and cheap, Moltex Energy LLP presentation slides, 19 pgs.

Scott, Ian: Safer, cheaper nuclear: The simple molten salt reactor, http://www.ee.co.za/article/safer-cheaper-nuclear-simple-molten-salt-reactor.html, Dec. 2, 2014, 9 pgs.

Shaffer "Preparation and Handling of Salt Mixtures for the Molten Salt Reactor Experiment" ORNL-4616, Oak Ridge National Laboratory, Oak Ridge, Tennessee (Jan. 1971).

Special Metals "The story of the "Incoloy alloys series," from 800, through 800H, 800HT" https://www.specialmetals.com/documents/technical-bulletins/incoloy/incoloy-alloy-800h-800ht.pdf, pp. 1-16 (Sep. 2004).

Taube, et al., Molten Plutonium Chlorides Fast Breeder Reactor Cooled by Molten Uranium Chloride, Annals of Nuclear Science and Engineering, vol. 1, pp. 277-281., 1974.

Thoma, R. E., "Chemical Aspects of MSRE Operations," ORNL-4658, Dec. 1971.

Transatomic Power Technical White Paper, Mar. 2014, V1 .0.1., (2014), http://www.transatomicpower.com/, 34 pgs.

(56) References Cited

OTHER PUBLICATIONS

Van't Eind, R.J.S., Simulation of a Fast Molten Salt Reactor, PSR-131-2011-009, Jul. 2011, 68 pages.

Vidal et al., "Molten Chloride Technology Pathway to Meet the U.S. Doe Sunshot Initiative with Gen3 CSP" AIP Conference Proceedings 2126, 080006, National Renewable Energy Laboratory, Golden Colorado (Jul. 26, 2019).

Wang, Jun-Wei et al.: "Influence of MgC12 content on corrosion behavior of GH1140 in molten NaCl—MgCl2as thermal storage medium", Solar Energy Materials and Solar Cells, Elsevier Science Publishers, Amsterdam, NL, vol. 179, Nov. 20, 2017, pp. 194-201, ISSN: 0927-0248.

Xu et al., Thorium Energy R&D in China, THEO13, CERN, Oct. 28, 2013, 59 pgs.

Zhao "Molten Chloride Thermophysical Properties, Chemical Optimization, and Purification" Technical Report NREL/TP-5500-78047 National Renewable Energy Laboratory, Golden, Colorado, (2020).

| Alloy | Elemental Composition (%) | |
|---|---|---|
| | Major (%) | Minor (<1%) |
| Mo-La | Mo | La |
| MoRe | Mo-5Re | La |
| 304 SS, LN | Fe - 19Cr - 10Ni - 2Mn | C, N, P, Si |
| 316 SS, LN | Fe - 17Cr - 12Ni - 2.5Mo | C, Mn, P, Si |
| Nickel 200 | Ni | C, Cu, Fe, Mn, Si |
| Inconel 617 | 44.5Ni - 22Cr - 12.5Co - 9Mo | Al, C, Fe, Mn, Si, Ti |
| Incoloy 740H | 51Ni - 24.5Cr - 20Co | Al, Nb, Ti |
| Incoloy 800H | 32.5Ni - 21Cr - 39.5Fe | Al, C, Ti |

FIG. 13

ANTI-PROLIFERATION SAFEGUARDS FOR NUCLEAR FUEL SALTS

CROSS REFERENCE TO RELATED APPLICATIONS

This application is a continuation of U.S. patent application Ser. No. 16/676,183, filed Nov. 6, 2019, which issued as U.S. Pat. No. 11,276,503 on Mar. 15, 2022, which application is a continuation-in-part of U.S. patent application Ser. No. 15/584,926, filed May 2, 2017, which application is a continuation-in-part of U.S. patent application Ser. No. 14/981,512, filed Dec. 28, 2015, which application claims the benefit of U.S. Provisional Application Nos. 62/097,235, filed Dec. 29, 2014, 62/098,984, filed Dec. 31, 2014, and 62/234,889, filed Sep. 30, 2015, which applications are hereby incorporated by reference.

U.S. patent application Ser. No. 15/584,926 also claims the benefit of U.S. Provisional Application No. 62/330,695, filed May 2, 2016, which application is hereby incorporated by reference.

INTRODUCTION

The utilization of molten fuels in a nuclear reactor to produce power provides significant advantages as compared to solid fuels. For instance, molten fuel reactors generally provide higher power densities compared to solid fuel reactors, while limiting fuel fabrication processes, which are necessary in the construction of solid fuels. Molten fuel reactors may also provide a higher level of burn-up in a given reactor, even in systems lacking salt cleanup.

Molten fluoride fuel salt suitable for use in nuclear reactors have been developed using uranium tetrafluoride ($UF_4$) mixed with other fluoride salts. For instance, a $UF_4$ based fuel salt may include a mixture of LiF, $BeF_2$, $ThF_4$ and $UF_4$. It is noted that in such a family of $UF_4$ based fuel salt compositions the heavy metal content may range from approximately 40-45% by weight and have a melting temperature of approximately 500° C.

Anti-Proliferation Safeguards for Nuclear Fuel Salts

This disclosure describes specific embodiments of uranium salts of chloride usable as nuclear fuel in certain molten salt reactor designs. Where the parent application describes a wide range of binary, ternary and quaternary chloride fuel salts of uranium, as well as other related technologies, this disclosure focuses on fuel salt embodiments determined to be particularly suited for certain reactor designs.

Due to the high level of fissile content achievable through molten fuel salts of the present disclosure and the ease of access to the molten fuel salt, it is desirable to provide non-proliferation measures with respect to the fuel(s) of the present disclosure. Some embodiments of the present disclosure provide a molten fuel salt that is pre-loaded (i.e., loaded prior to start-up) with one or more selected lanthanides to increase the activity of the initial salt. In addition, unless subsequently separated, the lanthanides will act as a neutron poison in the fuel and, thus, reduce the desirability of the lanthanide-loaded fuel for weapons-grade purposes.

In one aspect, the fuel salts of this disclosure include ternary fuel salts of $UCl_3$, $UCl_4$, and NaCl having a melting point of less than 600° C., from 1 to 50 mol % $UCl_4$, a uranium density of greater than 1.5 g/cc, and a specific heat of greater than 600 J/kg-C. Embodiments of fuel salts may have melting points of less than 600° C., 550° C., 500° C., 450° C., 400° C., or even 350° C. Embodiments of fuel salts may have a uranium density of greater than 1.5 g/cc, 1.6 g/cc, 1.7 g/cc, 1.8 g/cc, 1.9 g/cc, 2 g/cc or even 2.1 g/cc. Embodiments of fuel salts may have a specific heat of greater than 600 J/kg-C, 700 J/kg-C, 800 J/kg-C, or even 900 J/kg-C.

Embodiments of fuel salts may also have reduced amounts of $UCl_4$ (relative to $17UCl_3$-$71UCl_4$-12NaCl). In addition to the properties described above, such embodiments of fuel salts may have less than 50 mol % $UCl_4$, less than 40%, 30%, 20%, 15% or even less than 10 mol % $UCl_4$. Embodiments of uranium fuel salts have a molar fraction of $UCl_4$ from 1% to 50% by molar fraction $UCl_4$. Embodiments of fuel salts have a molar fraction of $UCl_3$ from 1% to 33% by molar fraction $UCl_3$. Embodiments of fuel salts have a molar fraction of NaCl wherein the fissionable fuel salt has from 40% to 66% by molar fraction NaCl.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

FIG. 13 lists some alloys of potential applicability as fuel salt-facing materials in a molten salt nuclear reactor.

DETAILED DESCRIPTION

Figure 1A:
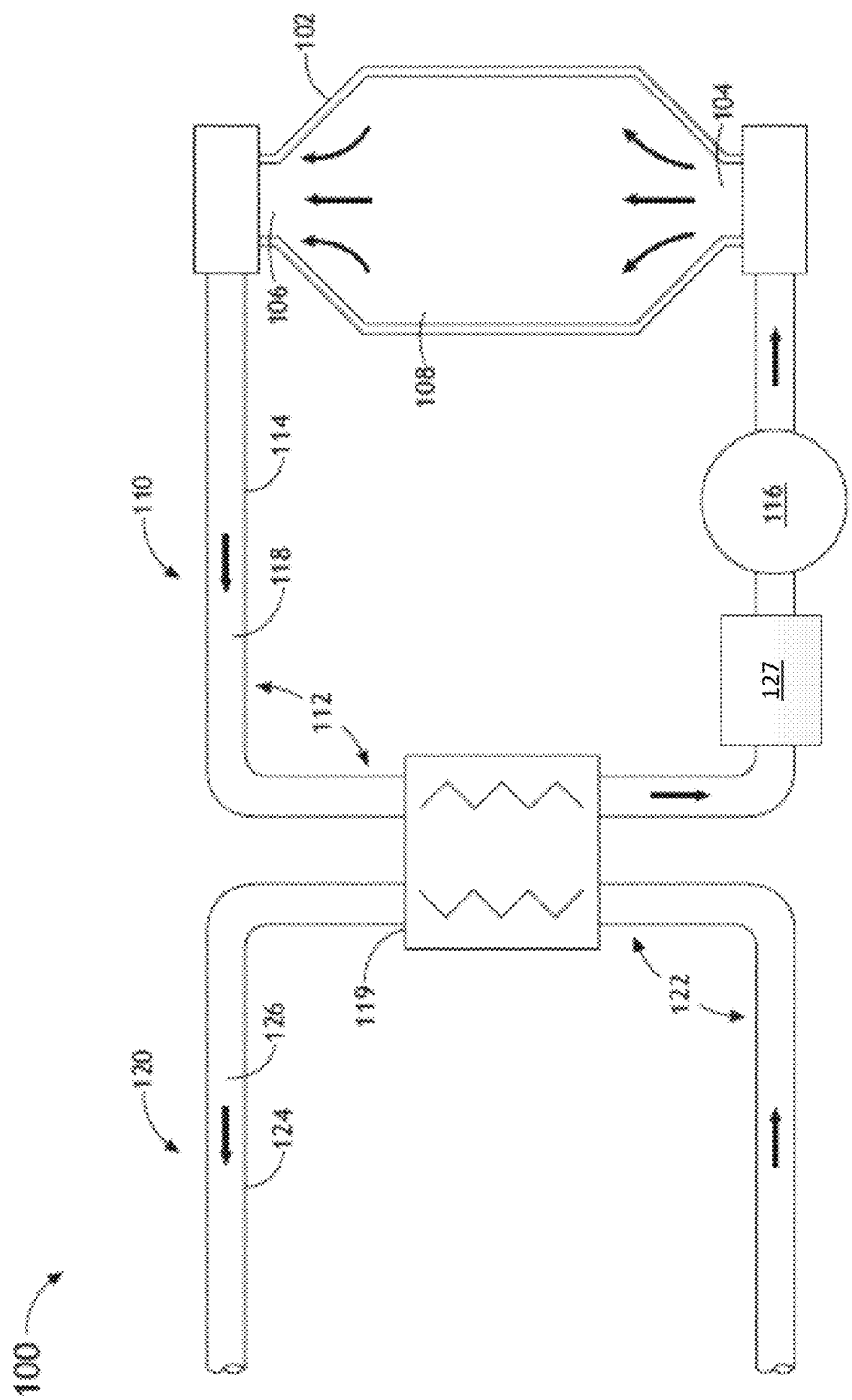
FIGS. 1A-1G generally describe novel embodiments of a molten salt nuclear reactor for operating in a fast spectrum breed-and-burn mode.

This disclosure describes embodiments of nuclear fuel salts usable in certain molten salt reactor designs and related systems and methods. Binary, ternary and quaternary chloride fuel salts of uranium, as well as other fissionable elements, are described. In addition, fuel salts of $UCl_xF_y$ are disclosed as well as bromide fuel salts. This disclosure also presents methods and systems for manufacturing such fuel salts, for creating salts that reduce corrosion of the reactor components and for creating fuel salts that are not suitable for weapons applications.

The present disclosure is directed to a fast spectrum molten salt breed-and-burn nuclear reactor fuel and methods of fuel fabrication, management and use.

Much of the historical and current research related to molten salt nuclear fission reactors focused on uranium- and thorium-based fluorine salts. The molten chlorides differ significantly from the fluoride based salts due to a couple of key aspects. First, chlorides can be somewhat less moderating than the fluorides, particularly if the chlorides are enriched with the $^{37}Cl$ isotope. Second, the chlorides offer the possibility of very high heavy metal concentrations in mixtures with reasonable melting points. This is an aspect which allows for the utilization of the uranium chlorine salt mixtures in a fast neutron spectrum. Fluoride salts typically contain no more than 10-12 mol % heavy metal. Historically proposed fluorine salt mixtures typically contained molar concentrations of 63-72 mol % LiF (enriched to 99.997% $^7Li$), 16-25 mol % $BeF_2$, 6.7-11.7 mol % $ThF_4$, and only 0.3 mol % $UF_4$ (heavy metal is 40-45%, by weight). Such salts melted at 500° C. By contrast, one embodiment of a chloride salt proposed here has a composition of $17UCl_3$-$71UCl_4$-$12NaCl$ (62%, by weight, heavy metal), and it also melts at 500° C., as discussed in greater detail below.

Some fuel embodiments of the present disclosure may provide for equilibrium or quasi-equilibrium breed-and-burn behavior, while other embodiments provide for non-equilibrium breed-and-burn behavior without reprocessing of the fuel salt. This is notable because prior molten salt reactor designs could not achieve equilibrium breed-and-burn behavior without chemical separation of the fuel salt in the reactor necessitating ongoing chemical reprocessing of the fuel salt. For example, the present disclosure discloses, but is not limited to, a molten chloride fuel salts suitable for use in a fast spectrum reactor displaying equilibrium, quasi-equilibrium and/or non-equilibrium breed-and-burn behavior. In embodiments, little or no reprocessing may be required and what little reprocessing that may be used may be physical reprocessing only (e.g., physical separation of byproducts such as by gas sparging and/or filtering). Various embodiments of the molten fuel salt of the present disclosure may include mixtures of a first uranium chloride salt, a second uranium chloride salt and/or additional metal chloride salts. Some embodiments of the present disclosure provide for a molten fuel salt having a uranium tetrachloride ($UCl_4$) content level above 5% by molar fraction, which aids in establishing a high heavy metal content in the molten fuel salt (e.g., above 61% by weight) while maintaining operable melting temperatures. Embodiments including $UCl_4$ may be formed through a mixture of $UCl_4$ and uranium trichloride ($UCl_3$) and/or and additional metal chloride (e.g., NaCl) such that desirable heavy metal content levels and melting temperatures (e.g., 330-800° C.) are achieved.

Due to the high level of fissile content achievable through molten fuel salts of the present disclosure and the ease of access to the molten fuel salt, it is desirable to provide non-proliferation measures with respect to the fuel(s) of the present disclosure. Some embodiments of the present disclosure provide a molten fuel salt that is pre-loaded (i.e., loaded prior to start-up) with one or more selected lanthanides to increase the activity of the initial salt. In addition, unless subsequently separated, the lanthanides will act as a neutron poison in the fuel and, thus, reduce the desirability of the lanthanide-loaded fuel for weapons-grade purposes.

Molten Salt Reactors

Prior to discussing the fuel salt embodiments in greater detail, a brief discussion of the general components of molten fuel salt reactors suitable for using the fuel salt embodiments will be helpful. FIGS. 1A-1F generally describe a novel embodiment of a molten salt nuclear reactor 100 for operating in a fast spectrum breed-and-burn mode. FIG. 2 describes a different configuration of a molten salt nuclear reactor 200. These are just examples to provide context for discussion of the fuel embodiments described herein and the reader should understand that potentially any molten fuel nuclear reactor could be adapted to use the fuel embodiments described below. While various fluoride salts may be utilized in molten salt nuclear reactors as described below, fluoride-based fuel salts typically display heavy metal concentrations significantly below that which may be achieved with chloride-based and chloride-fluoride-based fuel salts described in the present disclosure.

Figure 2:
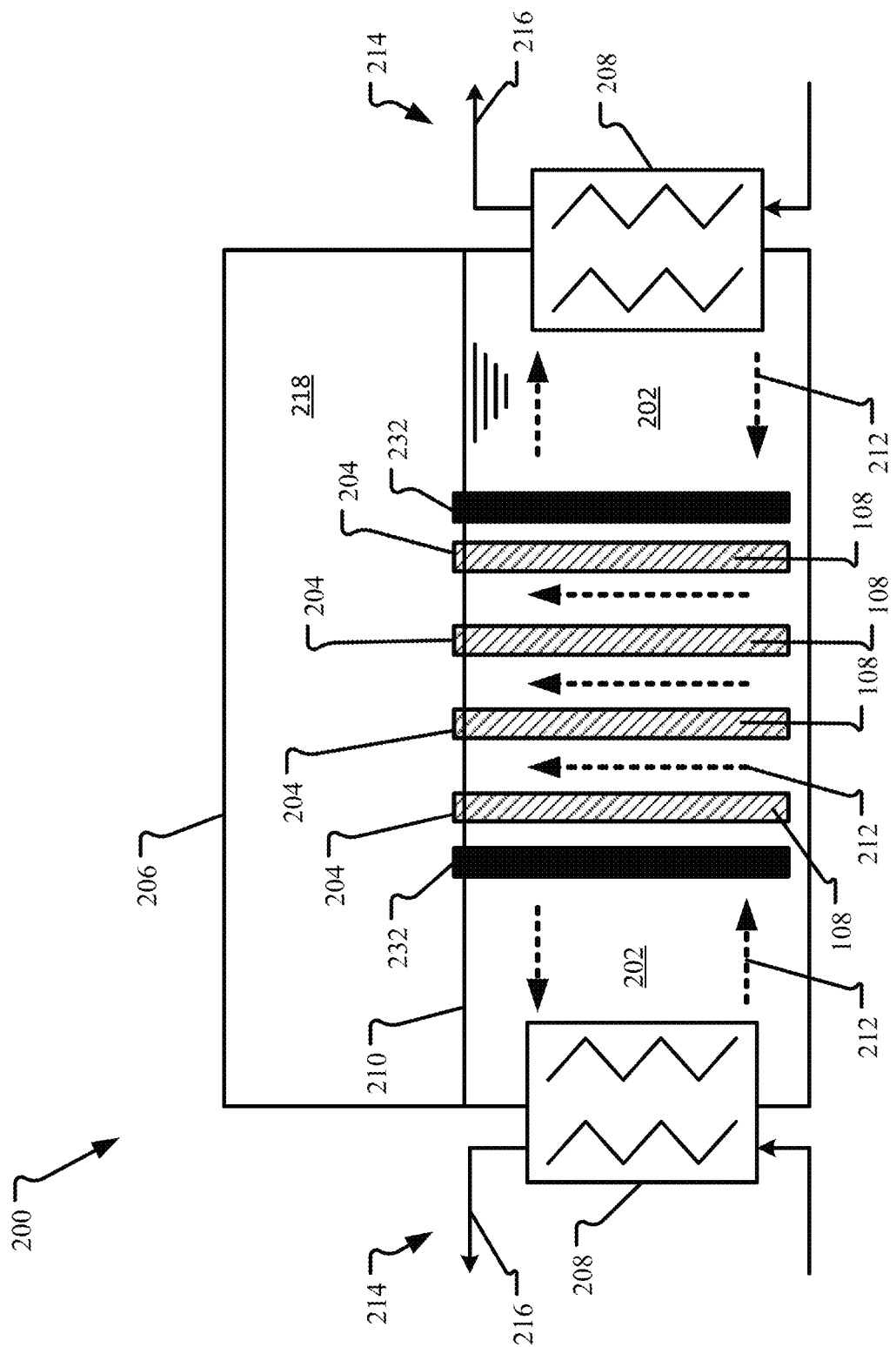
FIG. 2 describes a different configuration of a molten salt nuclear reactor.

FIG. 1A illustrates a simplified schematic view of a molten salt fast spectrum nuclear reactor 100, in accordance with one or more embodiments of the present disclosure. In one embodiment, the reactor 100 includes a reactor core section 102. The reactor core section 102 (which may also be referred to as the "reactor vessel") includes a fuel input 104 and a fuel output 106. The fuel input 104 and the fuel output 106 are arranged such that during operation a flow of the molten fuel salt 108 is established through the reactor core section 102. For example, the fuel input 104 and/or the fuel output 106 may consist of conical sections acting as converging and diverging nozzles respectively. In this regard, the molten fuel 108 is fluidically transported through the volume of the reactor core section 102 from the input 104 to the output 106 of the reactor core section 102. Although FIG. 1A shows fluid fuel flow with arrows, it is to be appreciated that the direction of flow may be modified as appropriate for different reactor and plant configurations. Specifically, FIG. 1A shows fluid fuel 108 flow from the 'bottom' to the 'top' in the central core region, and alternative apparatuses may create and/or maintain a fluid fuel 108 flow from the top towards the bottom in the central core region.

The reactor core section 108 may take on any shape suitable for establishing criticality within the molten fuel salt 108 within the reactor core section 102. By way of non-limiting example, the reactor 100 may include, but is not limited to, an elongated core section, as depicted in FIG. 1A. In addition, the reactor core section 108 may take on any cross-sectional shape. By way of non-limiting example, the reactor core section 108 may have, but is not required to have, a circular cross-section, an ellipsoidal cross-section or a polygonal cross-section.

The dimensions of the reactor core section 102 are selected such that criticality is achieved within the molten fuel salt 108 when flowing through the reactor core section 102. Criticality refers to a state of operation in which the nuclear fuel sustains a fission chain reaction, i.e., the rate of production of neutrons in the fuel is at least equal to rate at which neutrons are consumed (or lost). For example, in the case of an elongated core section, the length and cross-sectional area of the elongated core section may be selected in order to establish criticality within the reactor core section 102. It is noted that the specific dimensions necessary to establish criticality are at least a function of the type of fissile material, fertile material and/or carrier salt contained within the reactor 100. Principles of molten fuel nuclear reactors are described in U.S. patent application Ser. No. 12/118,118 to Leblanc, filed on May 9, 2008, which is incorporated herein in the entirety.

The reactor core section 102 is formed from any material suitable for use in molten salt nuclear reactors. For example, the bulk portion of the reactor core section 102 may be formed, but is not required to be formed, from one or more molybdenum alloy, one or more zirconium alloys (e.g., ZIRCALOY™), one or more niobium alloys, nickel, one or more nickel alloys (e.g., HASTELLOY™ N) or high temperature ferritic, martensitic, or stainless steel and the like. It is further noted that the internal surface may coated, plated or lined with one or more additional materials in order to provide resistance to corrosion and/or radiation damage, as discussed in additional detail further herein.

In the embodiment shown, the reactor 100 includes a primary coolant system 110 that takes heat from the reactor core 102 and transfers that heat to the secondary coolant 126 in the secondary coolant system 120 via the heat exchanger 119. In the embodiment illustrated in FIG. 1A, the molten fuel salt 108 is used as the primary coolant 118. Cooling is achieved by flowing molten fuel salt 108 heated by the ongoing chain reaction from the reactor core 102, and flowing cooler molten fuel salt 108 into the reactor core 102, at the rate necessary to maintain the temperature of the reactor core 102 within its operational range. In this embodiment, the primary coolant system 110 is adapted to maintain the molten fuel salt 108 in a subcritical condition when outside of the reactor core 102.

The primary coolant system 110 may include one or more primary coolant loops 112 formed from piping 114. The primary coolant system 110 may include any primary coolant system arrangement known in the art suitable for implementation in a molten fuel salt context. The primary coolant system 110 may circulate fuel 108 through one or more pipes 114 and/or fluid transfer assemblies of the one or more primary coolant loops 112 in order to transfer heat generated by the reactor core section 102 to downstream thermally driven electrical generation devices and systems. For purposes of simplicity, a single primary coolant loop 112 is depicted in FIG. 1A. It is recognized herein, however, that the primary coolant system 110 may include multiple parallel primary coolant loops (e.g., 2-5 parallel loops), each carrying a selected portion of the molten fuel salt inventory through the primary coolant circuit.

Figure 1C:
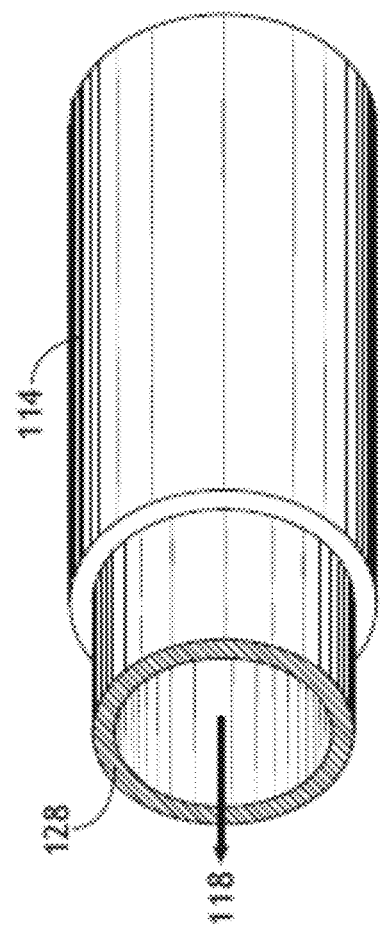
Figure 1B:
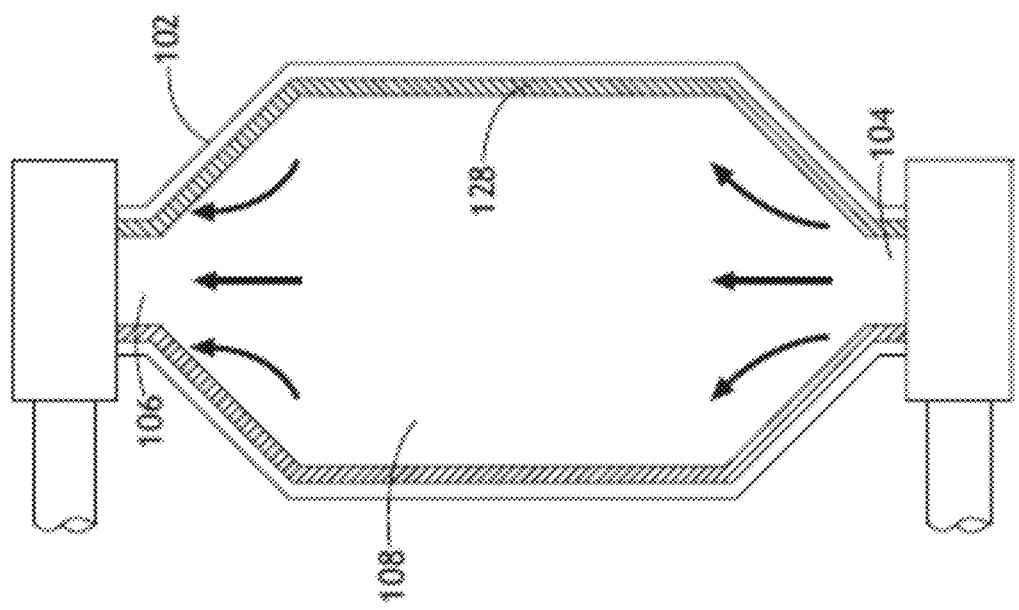
Figure 1D:
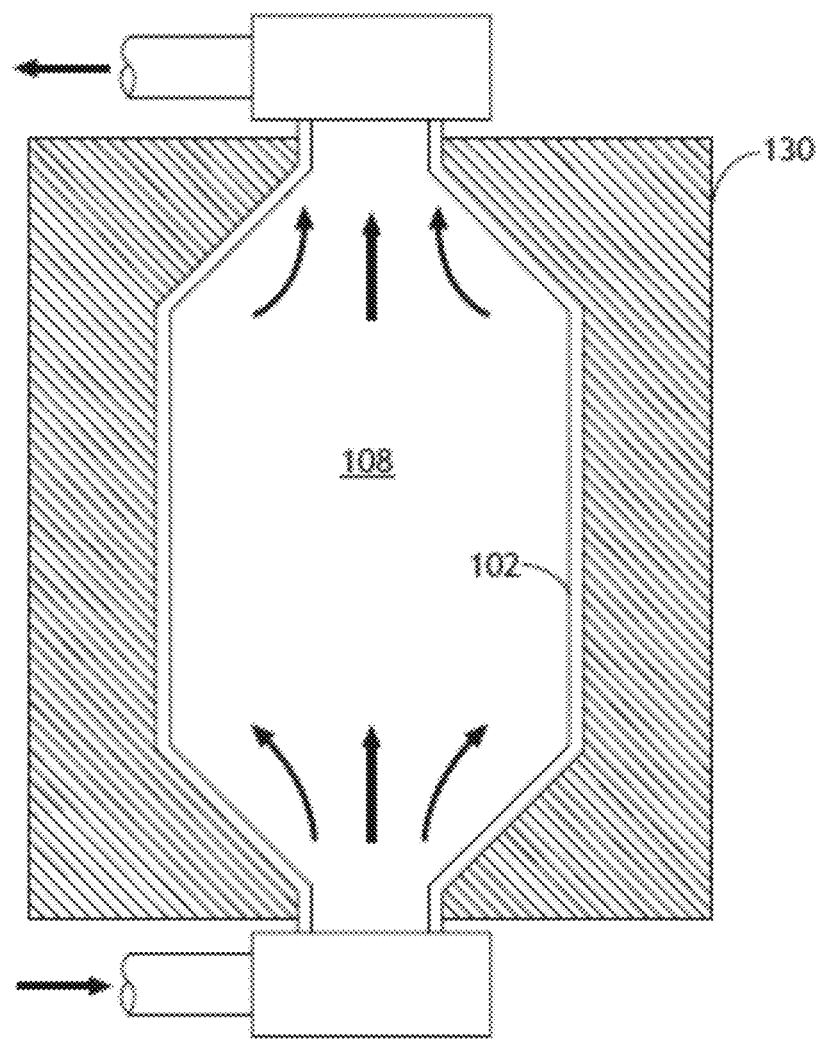
Figure 1F:
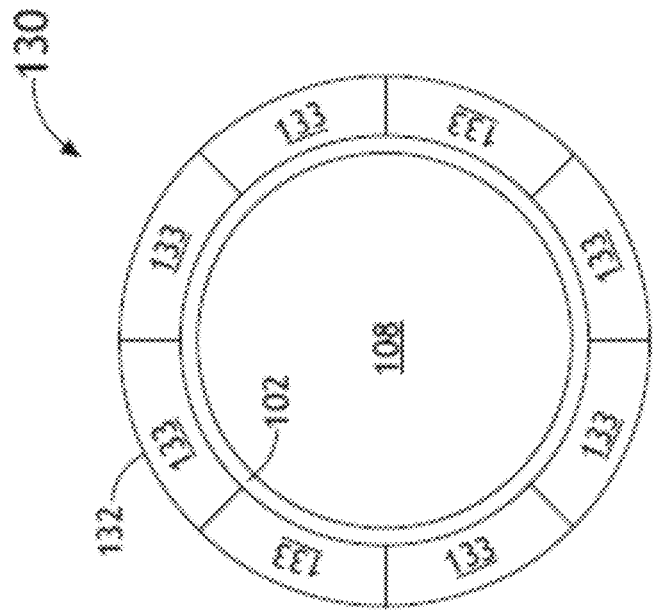
Figure 1E:
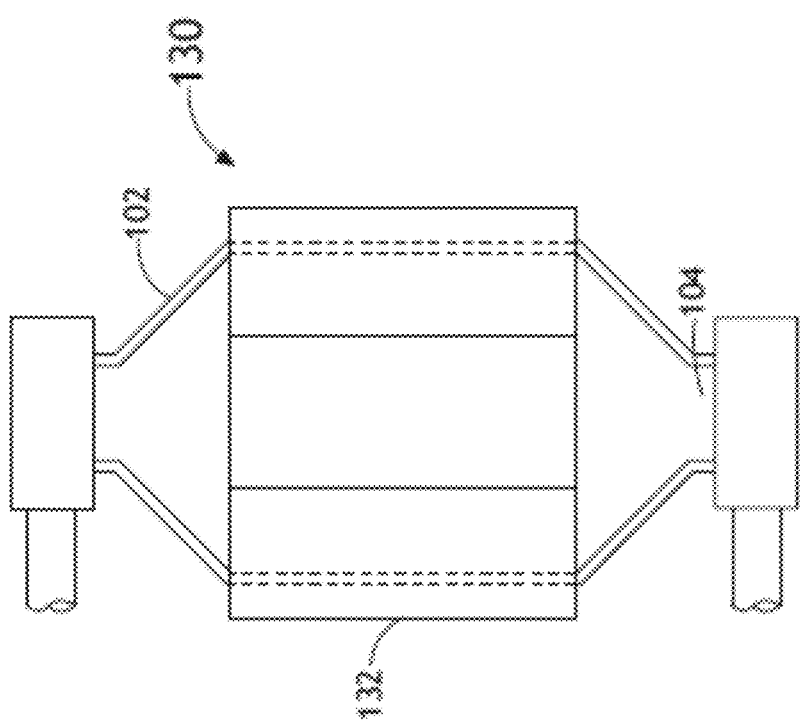
Figure 1G:
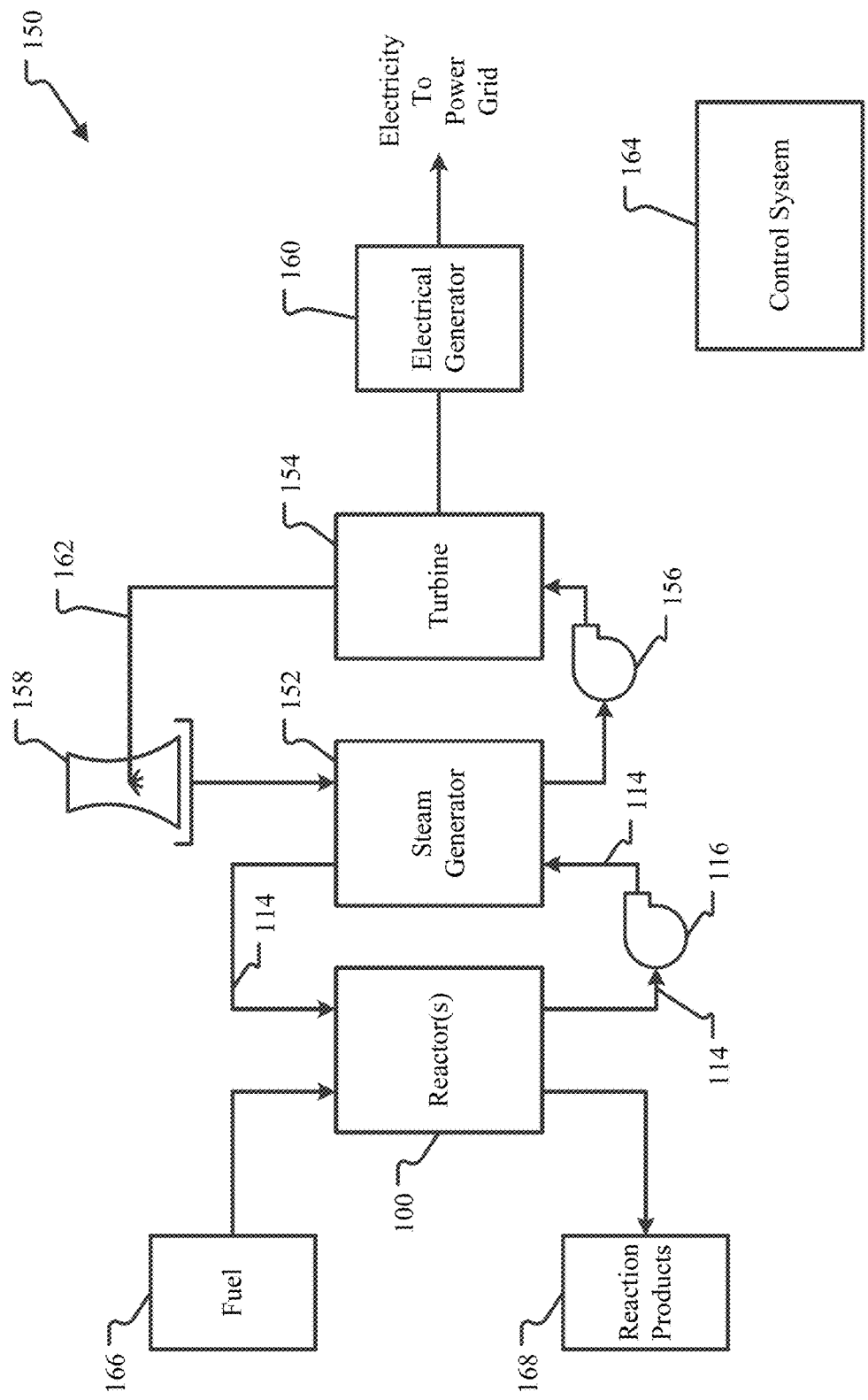

In an alternative embodiment (an example of which is shown in FIGS. 1G and 2), the primary coolant system 110 may be configured such that a primary coolant 118 (different than the molten fuel salt 108) enters the reactor core section 108 (e.g., main vessel). In this embodiment, the fuel salt 108 does not leave the reactor core section, or main vessel, but rather the primary coolant 118 is flowed into the reactor core 102 to maintain the temperature of the core within the desired range. It is noted that in this embodiment the reactor 100 may include an additional heat exchanger (not shown) in the reactor core section 102, or main vessel. In this embodiment, the secondary coolant system 120 may be optional, the usable thermal power can be derived directly from the primary coolant system 110. In this embodiment, the primary coolant may be a chloride salt with a suitable melting point. For example, the salt may be a mixture of sodium chloride and magnesium chloride.

In the embodiment shown in FIG. 1A, the primary coolant system 110 includes one or more pumps 116. For example, one or more pumps 116 may be fluidically coupled to the primary coolant system 110 such that the one or more pumps 116 drive the primary coolant 118, in this case the molten fuel 108, through the primary coolant/reactor core section circuit. The one or more pumps 116 may include any coolant/fuel pump known in the art. For example, the one or more fluid pumps 116 may include, but are not limited to, one or more mechanical pumps fluidically coupled to the primary coolant loop 112. By way of another example, the one or more fluid pumps 116 may include, but are not limited to, one or more electromagnetic (EM) pumps fluidically coupled to the primary coolant loop 112.

FIG. 1A further illustrates that the reactor 100 includes a secondary coolant system 120 thermally coupled to the primary coolant system 110 via one or more heat exchangers 119. The secondary coolant system 120 may include one or more secondary coolant loops 122 formed from piping 124. The secondary coolant system 120 may include any secondary coolant system arrangement known in the art suitable for implementation in a molten fuel salt context. The secondary coolant system 120 may circulate a secondary coolant 126 through one or more pipes 124 and/or fluid transfer assemblies of the one or more secondary coolant loops 122 in order to transfer heat generated by the reactor core section 102 and received via the primary heat exchanger 119 to downstream thermally driven electrical generation devices and systems. For purposes of simplicity, a single secondary coolant loop 124 is depicted in FIG. 1A. It is recognized herein, however, that the secondary coolant system 120 may include multiple parallel secondary coolant loops (e.g., 2-5 parallel loops), each carrying a selected portion of the secondary coolant through the secondary coolant circuit. It is noted that the secondary coolant may include any second coolant known in the art. By way of example, the secondary coolant may include, but is not limited to, liquid sodium.

It is further noted that, while not depicted in FIG. 1A, the reactor 100 may include any number of additional or intermediate heating/cooling systems and/or heat transfer circuits. Such additional heating/cooling systems may be provided for various purposes in addition to maintaining the reactor core 102 within its operational temperature range. For example, a tertiary heating system may be provided for the reactor core 102 and primary coolant system 110 to allow a cold reactor containing solidified fuel salt to be heated to an operational temperature in which the salt is molten and flowable.

Other ancillary components 127 may also be utilized, as illustrated, in the primary coolant loop 112. Such ancillary components 127 may be include one or more filters or drop out boxes for removing particulates that precipitate from the primary coolant 118 during operation. To remove unwanted liquids from the primary coolant 118, the ancillary components 127 may include any suitable liquid-liquid extraction system such as one or more co-current or countercurrent mixer/settler stages, an ion exchange technology, or a gas absorption system. For gas removal, the ancillary components 127 may include any suitable gas-liquid extraction technology such as a flash vaporization chamber, distillation system, or a gas stripper. Some additional embodiments of ancillary components 127 are discussed in greater detail below.

It is noted herein that the utilization of various metal salts, such as metal chloride salts, in reactor 100 may cause corrosion and/or radiation degradation over time. A variety of measures may be taken in order to mitigate the impact of corrosion and/or radiation degradation on the integrity of the various salt-facing components (e.g., reactor core section 102, primary coolant piping 114, heat exchanger 119 and the like) of the reactor 100 that come into direct or indirect contact with the fuel salt or its radiation.

In one embodiment, the velocity of fuel flow through one or more components of the reactor 100 is limited to a selected fuel salt velocity. For example, the one or more pumps 116 may drive the molten fuel 108 through the primary coolant loop 112 of the reactor 100 at a selected fuel salt velocity. It is noted that in some instances a flow velocity below a certain level may have a detrimental impact on reactor performance, including the breeding process and reactor control. By way of non-limiting example, the total fuel salt inventory in the primary loop 112 (and other portions of the primary coolant system 110) may exceed desirable levels in the case of lower velocity limits since the cross-sectional area of the corresponding piping of the primary loop 112 scales upward as flow velocity is reduced in order to maintain adequate volumetric flow through the primary loop 112. As such, very low velocity limits (e.g., 1 m/s) result in large out-of-core volumes of fuel salt and can negatively impact the breeding process of the reactor 100 and reactor control. In addition, a flow velocity above a certain level may detrimentally impact reactor performance and longevity due to erosion and/or corrosion of the internal surfaces of the primary loop 112 and/or reactor core section 102. As such, suitable operational fuel salt velocities may provide a balance between velocity limits required to minimize erosion/corrosion and velocity limits required to manage out-of-core fuel salt inventory. For example, in the case of a molten chloride fuel salt, the fuel salt velocity may be controlled from 2-20 m/s, such as, but not limited to, 7 m/s.

FIGS. 1B and 1C illustrate a simplified schematic view of a molten salt fast spectrum nuclear reactor 100 with a protective layer 128 disposed on one or more internal surfaces of the reactor 100, in accordance with one or more embodiments of the present disclosure.

In one embodiment, the protective layer 128 is disposed on one or more surfaces of the reactor 100 facing the fuel salt 108 of the reactor 100. The protective layer 128 may provide resistance to corrosion and/or radiation degradation of one or more reactor salt-facing surfaces of the reactor 100. For the purposes of the present disclosure, a material resistant to corrosion and/or radiation degradation is interpreted as any material displaying resistance to corrosion and/or radiation degradation superior to the underlying bare surface of the reactor 100.

The protective layer 128 may include any material known in the art suitable for providing an internal surface of a reactor with corrosion and/or radiation resistance to a corresponding nuclear fuel salt. Thus, the material of the protective layer 128 may vary depending on the salt 108 used. In one embodiment, the protective layer 128 includes one or more refractory metals. For example, the protective layer 128 may include, but is not limited to, one or more of niobium, molybdenum, tantalum, tungsten or rhenium. In another embodiment, the protective layer 128 includes one or more refractory alloys. For example, the protective layer 128 may include, but is not limited to, one or more of a molybdenum alloy (e.g., titanium-zirconium-molybdenum (TZM) alloy), a tungsten alloy, tantalum, a niobium or a rhenium. In another embodiment, the protective layer 128 includes nickel and/or one or more nickel alloys. In another embodiment, the protective layer 128 includes a carbide, such as, but not limited to, silicon carbide.

In an embodiment, the protective layer 128 is formed by plating the internal surface of the one or more portions (e.g., piping 114 or primary loop 112) of the reactor 100 with the selected protective material. In another embodiment, the protective layer 128 includes one or more coatings of the selected protective material disposed on the internal surface of one or more portions of the reactor 100. In yet another embodiment, the bulk material of the various components may be formed with one or more of the protective materials described above. For instance, the piping 114 of the primary coolant loop 112 may include, but is not limited to, TZM piping.

In one embodiment, as shown in FIG. 1B, the internal salt-facing surface of the reactor core section 102 includes a protective layer 128. For example, the vessel of the reactor core section 102 may be formed from steel or a zirconium alloy, with refractory alloy, nickel, or nickel alloy plating disposed on the internal salt-facing surface of the reactor core section 102 to form the protective layer 128. For instance, the reactor core section 102 may include, but is not limited to, a molybdenum-based protective layer 128 having a thickness from approximately 5-7 mm, with the vessel of the reactor core section 102 having a wall thickness of approximately 9-11 cm thick.

Similarly, as shown in FIG. 1C, the salt-facing surface of the piping 114 of the primary coolant loop 112 (which may be the internal and/or external surface of piping or other components) includes a protective layer 128. For example, refractory alloy or nickel alloy plating may be disposed on the salt-facing surface of the piping 114 of the primary coolant loop 112 to form the protective layer 128.

FIG. 1D illustrates a schematic view of a reflector assembly 130 of the reactor core 100. The reflector assembly 130 is suitable for reflecting neutrons emanating from the reactor core section 102 back into the fuel salt 108. In one embodiment, the reflector assembly 130 is disposed at the external surface of the reactor core section 102 such that the reflector assembly 130 surrounds at least a portion of the reactor core 102. In the embodiment shown, the neutrons reflected back into the reactor core section 102 by the reactor assembly 130 may contribute to maintaining criticality within the reactor core section 102 and/or the breeding of fissile fuels from fertile feed materials. By reducing such losses of neutrons, the amount of fuel salt necessary for criticality, therefore, the size of the reactor core 102, may be reduced. The reflector assembly 130 may be formed from any material known in the art suitable for neutron reflection. For example, the reflector assembly may include, but is not limited to, one or more of zirconium, steel, iron, graphite, beryllium, tungsten carbide, lead, lead-bismuth and like materials.

FIGS. 1E and 1F illustrate the reflector assembly 130 constructed with multiple reflector modules 132, in accordance with one or more embodiments of the present disclosure. It is noted that at some operating temperatures of the nuclear reactor 100 of the present disclosure a variety of neutron reflecting materials will liquefy. For example, lead and lead-bismuth are both materials that provide good neutron reflecting characteristics. However, lead melts at approximately 327° C., while lead-bismuth alloys commonly have melting temperatures below 200° C. As noted elsewhere in this application, the reactor 100 may operate in a temperature range from approximately 330 to 800° C., above the melting points associated with lead and lead-bismuth alloys. In one embodiment, the reactor modules 132 include a reflector container to contain a liquid-phase of the selected neutron reflecting material 133, as shown in FIGS. 1E and 1F. The reactor modules 132 may be formed from any material known in the art and may be selected based on consideration of any one or more design functions including temperature resistance, corrosion resistance, non-reactivity with other components and/or the fuel, radiation resistance, structural support, weight, etc. In some cases, one or more reflector containers may be formed of a material which is substantially neutronically translucent with the reflector material inside the container, and/or one or more reflector containers may be formed of a material which is refractory. For example, the reflector modules 132 (such as the reflector containers) may be formed from one or more refractory alloys, one or more nickel alloys or one or more carbides, or graphite compounds. For instance, the material used to form the reflector modules 132 and/or reflector containers may include, but are not limited to, any one or more components or combinations of one or more molybdenum alloys (e.g., TZM alloy), one or more tungsten alloys, one or more tantalum alloys, one or more niobium alloys, one or more rhenium alloys, one or more nickel alloys, silicon carbide, or graphite compounds, and the like. The reflector module may include (either contain or be formed from) one or more moderating compounds that can exist at the operating temperatures (e.g., graphite and/or lead) and may consider balancing a stronger moderator (e.g., graphite) and a weaker moderating material (e.g., lead) and may be used to determine the overall reflector neutron spectrum.

In one embodiment, the reflector modules 132 are positioned at the external surface of the reactor core section 102 and distributed across the external surface of the reactor core section 102. As shown in the examples of FIGS. 1E and 1F, the reflector modules 132 are arranged azimuthally across the external surface of the reactor core section 102. Each reflector module 132 contains a volume of neutron reflecting liquid (e.g., lead, lead-bismuth or the like). In this regard, the discrete reflector modules 132 may be arranged to form a contiguous volume of neutron reflecting liquid 133 the reactor core section 102. While FIGS. 1E and 1F depict an azimuthal arrangement of reflector modules 132, such a configuration should not be interpreted as limiting. It is noted herein that any geometrical arrangement and number of reflector modules 132 is suitable for implementation within the context of reactor 100 of the present disclosure. For example, although not shown, the set of reflector modules 132 may take on a stacked-ring configuration, with each module being a ring filled with the selected neutron reflecting liquid. In this regard, set of modules 132 may be stacked so as to form a neutron reflecting volume about the core section 102. The volume may be spherically shaped, cylindrically shaped, may be a rectangular-, hexagonal-, octagonal-, triangular-, pentagonal-, or other prism or otherwise be a volume of any cross-sectional shape. In an embodiment, the reflector will utilize a 12.7-mm-thick (½"-thick) HASTELLOY™-N or SiC plating on all exterior surfaces and the inner vessel will have a thickness of 2 cm of the same plating material. It is to be appreciated that the shape of the reflector modules may be formed as appropriate for the core design and may include any appropriate shape including trapezoidal rectangular, hexagonal, circular, ellipsoidal, and may even include irregular shapes.

FIG. 1G illustrates an embodiment of a nuclear power plant for generating power from a nuclear reaction using a molten chloride fast reactor (MCFR). For a power plant application, the heat generated by the MCFR will be converted into electrical power by power conversion hardware. In the embodiment shown, Rankine cycle power conversion hardware was used with water (steam) as the working fluid. The conversion efficiency of a Rankine cycle plant is in large part determined by the temperature (and pressure) of the steam entering the turbines, where higher temperatures correlate to higher efficiency. Performance is coupled to steam pressure as well as temperature and the highest efficiency Rankine cycle plants use supercritical and ultra-supercritical steam.

The power conversion system encompasses all systems that come into contact with the power conversion system working fluid. In the case of a steam Rankine cycle plant as illustrated, this includes a steam generator 152, a turbine system 154, water circulation loop 162 including one or more water circulation pumps 156 and a cooling tower 158, electrical generation equipment 160 and a control system 162. In addition, a fuel storage system 166 for storing new fuel salt and a reaction product storage system 168 to receive and safely contain used fuel salt are illustrated. As illustrated in FIG. 1G, the power conversion system starts with a primary coolant transferring heat to the power cycle working fluid through a heat exchanger (e.g. steam generator 152). A modelling of the system included simplified models of the primary coolant salt loop 114, and steam generator 152, with more detailed treatment of the Rankine cycle system components. Although a Rankine cycle steam turbine was used for modelling purposes, heat engines based on other cycles are also feasible such as closed-cycle gas turbines (e.g., air, helium, or $CO_2$) based on the Brayton cycle.

Inputs to the power conversion system used in the modelling come from primary coolant heat transfer fluid mass flow rate, supply and return temperatures and pressures. The power cycle cost and performance are evaluated for different rated thermal power output levels of 600 MW, 1200 MW, 1800 MW, 2400 MW, and 3000 MW. For the baseline reactor design conditions, the primary coolant salt temperature is delivered to the steam generator 152 at 612° C. and is returned from the steam generator 152 at 498° C. The analysis included modelling operation with 580° C., 300 bar main steam conditions and 600° C., 70 bar reheat steam conditions, although higher and lower temperature and pressure operation may affect cost and performance.

The analysis used Themoflow, Inc.'s software packages STEAMPRO™ and THERMOFLEX™ to provide cost and performance data for the power cycle for steady state operation. The analysis used standard thermodynamic models for turbine system 154 components, coupled with proprietary models for specific components in the power cycle. A large body of water, like a river or lake, is assumed to be available for heat rejection (i.e. no cooling towers were modeled), although a cooling tower 158 could be utilized as illustrated in FIG. 1G for heat rejection. Thermodynamic efficiencies and component parameters are kept at the default values determined by STEAMPRO™ and THERMOFLEX™ submodels. For the modelling, a fuel salt of 17% $UCl_3$-71% $UCl_4$-12% NaCl and primary coolant of 58% NaCl-42% $MgCl_2$ were used. Fuel salt properties have been added to THERMOFLEX™ as lookup tables based on data curve fits. The data used are shown in Table 1 for fuel salt and Table 2 for primary coolant salt, below.

TABLE 1

Fuel salt properties used in THERMOFLEX ™ calculations

| | Temperature ° C. | Density kg/m³ | Specific Heat kJ/kg-C. | Thermal Cond. W/m-C. | Dynamic Visc. kg/m-s | Vapor Pressure bar |
|---|---|---|---|---|---|---|
| 1 | 400 | 4189 | 0.5732 | 0.972 | 0.0171 | 0 |
| 2 | 450 | 4077 | 0.5515 | 1.081 | 0.0117 | 0 |
| 3 | 500 | 3965 | 0.5297 | 1.19 | 0.00817 | 0 |
| 4 | 550 | 3853 | 0.5079 | 1.299 | 0.00585 | 0 |
| 5 | 600 | 3741 | 0.4861 | 1.409 | 0.00427 | 0 |
| 6 | 650 | 3629 | 0.4644 | 1.518 | 0.00317 | 0 |
| 7 | 700 | 3517 | 0.4426 | 1.627 | 0.00239 | 0 |
| 8 | 750 | 3406 | 0.4208 | 1.736 | 0.00183 | 0 |
| 9 | 800 | 3294 | 0.399 | 1.845 | 0.00142 | 0 |
| 10 | 850 | 3182 | 0.3773 | 1.954 | 0.00111 | 0 |
| 11 | 900 | 3070 | 0.3555 | 2.064 | 8.83E−04 | 0 |
| 12 | 950 | 2958.3 | 0.3337 | 2.173 | 7.07E−04 | 0 |
| 13 | 1000 | 2846.5 | 0.3119 | 2.282 | 5.71E−04 | 0 |
| 14 | 1050 | 2734.6 | 0.2902 | 2.391 | 4.65E−04 | 0 |
| 15 | 1100 | 2622.8 | 0.2684 | 2.5 | 3.81E−04 | 0 |
| 16 | 1150 | 2511 | 0.2466 | 2.609 | 3.15E−04 | 0 |
| 17 | 1200 | 2399.1 | 0.2248 | 2.719 | 2.62E−04 | 0 |
| 18 | 1250 | 2287.3 | 0.2031 | 2.828 | 2.19E−04 | 0 |
| 19 | 1300 | 2175.5 | 0.1813 | 2.937 | 1.85E−04 | 0 |
| 20 | 1350 | 2063.6 | 0.1595 | 3.046 | 1.56E−04 | 0 |
| 21 | 1400 | 1951.8 | 0.1377 | 3.155 | 1.33E−04 | 0 |
| 22 | 1450 | 1840 | 0.116 | 3.264 | 1.14E−04 | 0 |
| 23 | 1500 | 1728.1 | 0.0942 | 3.374 | 9.74E−05 | 0 |
| 24 | 1550 | 1616.3 | 0.0724 | 3.483 | 8.40E−05 | 0 |
| 25 | 1600 | 1504.5 | 0.0506 | 3.592 | 7.27E−05 | 0 |
| 26 | 1650 | 1392.6 | 0.0289 | 3.701 | 6.32E−05 | 0 |
| 27 | 1700 | 1280.8 | 0.00709 | 3.81 | 5.51E−05 | 0 |

TABLE 2

Primary coolant salt properties used in THERMOFLEX ™ calculations

| | Temperature ° C. | Density kg/m³ | Specific Heat kJ/kg-C. | Thermal Cond. W/m-C. | Dynamic Visc. kg/m-s | Vapor Pressure bar |
|---|---|---|---|---|---|---|
| 1 | 444.8 | 1785 | 1.128 | 1.555 | 0.0023 | 0 |
| 2 | 498.6 | 1759 | 1.114 | 1.672 | 0.00201 | 0 |
| 3 | 552.2 | 1734 | 1.1 | 1.789 | 0.00176 | 0 |
| 4 | 606 | 1708 | 1.086 | 1.906 | 0.00154 | 0 |
| 5 | 659.6 | 1683 | 1.072 | 2.022 | 0.00134 | 0 |
| 6 | 713.2 | 1658 | 1.058 | 2.139 | 0.00118 | 0 |
| 7 | 766.8 | 1632 | 1.044 | 2.255 | 0.00103 | 0 |
| 8 | 820.8 | 1607 | 1.03 | 2.372 | 8.98E−04 | 0 |
| 9 | 873.8 | 1581 | 1.016 | 2.487 | 7.87E−04 | 0 |
| 10 | 927.8 | 1556 | 1.002 | 2.604 | 6.87E−04 | 0 |
| 11 | 981.8 | 1530 | 0.9874 | 2.721 | 6.01E−04 | 0 |
| 12 | 1035.8 | 1505 | 0.9732 | 2.838 | 5.25E−04 | 0 |
| 13 | 1088.8 | 1479 | 0.9593 | 2.952 | 4.60E−04 | 0 |
| 14 | 1142.8 | 1454 | 0.9452 | 3.069 | 4.02E−04 | 0 |
| 15 | 1196.8 | 1428 | 0.931 | 3.186 | 3.51E−04 | 0 |
| 16 | 1249.8 | 1403 | 0.9171 | 3.3 | 3.07E−04 | 0 |
| 17 | 1303.8 | 1378 | 0.9029 | 3.416 | 2.69E−04 | 0 |
| 18 | 1357.8 | 1352 | 0.8887 | 3.532 | 2.35E−04 | 0 |
| 19 | 1410.8 | 1327 | 0.8748 | 3.647 | 2.06E−04 | 0 |
| 20 | 1464.8 | 1301 | 0.8607 | 3.763 | 1.80E−04 | 0 |

The power conversion system receives thermal power from the reactor 100 and converts that heat into mechanical and then electrical power. The analysis specifically focused on using conventional steam Rankine cycle hardware for power conversion. The analyzed configuration has three-turbines, with a high pressure turbine (HPT), intermediate pressure turbine (IPT), and low pressure turbine (LPT), illustrated simply as the turbine system 154. FIG. 1G shows a simplified cycle diagram for the 2400 $MW_{th}$ Rankine cycle analysis. The model in FIG. 1G is simplified in that it shows only the major components of the power plant. In the model used, the HPT receives steam from the "main steam" generation system that is heated by the primary cooling fluid carrying thermal energy from the reactor. Exhaust from HPT is sent to the reheat steam generation system, where the primary cooling fluid transfers heat to the exhaust from the HPT, and that heated steam is fed to the IPT. The exhaust from the IPT is fed to directly to the LPT to extract additional enthalpy. There are often multiple turbines in parallel, particularly for the LPT. In the model used, there are twin LPTs that are used for the final expansion step. In the model, all turbines are on a common shaft and direct coupled to an electrical generator 160. The outlet of the LPT flows to a condenser that cools the steam to near ambient temperature. For this analysis, the LPT is assumed to be a once-through condenser that receives heat from a large body of water, like a large lake or river. After the condenser, the water is pumped and sent through several feedwater heaters. The feedwater heaters preheat the feedwater by mixing with steam extracted from various points on the turbines. The preheated fluid from the feedwater heaters is then fed to the steam generator, where it is heated to temperature for the main turbine.

The analysis process involves using STEAMPRO™ to specify the characteristics of the Rankine cycle system, and then exporting that model to Thermoflex to investigate the interactions with the molten salt loops. STEAMPRO™ is a purpose-built tool for configuring steam turbine components, while Thermoflex is considered a "fully-flexible" design tool with more features and options. In STEAMPRO™, the plant is defined as having a "black-box steam generator" and "once-through open-loop water cooling."

The steam cycle is defined as single-reheat condensing supercritical cycle with an electric motor driven boiler feed pump. All turbines are specified to operate at 3600 RPM. The turbine group characteristics, feedwater heaters, and pumps are determined by STEAMPRO™ 's default parameters and selection method. The cycle is then computed and exported to THERMOFLEX™. STEAMPRO™ gives a detailed component layout of the Rankine cycle plant selected for efficient operation at rated conditions.

In THERMOFLEX™, the black-box steam generator is replaced with molten-salt-to-steam heat exchangers for the main and reheat steam generators. Simplified fuel salt and primary coolant salt loops are included in the model. The fuel and primary coolant salt loops are included to provide the energy source and are not modeled in detail. The modelling approach in THERMOFLEX™ is to specify outlet conditions of heat exchangers in the salt and steam loops, and then adjust the steam flow rate to that the heat input into the fuel salt matches the rated conditions. Although the component layout and performance characteristics of the plant was determined by STEAMPRO™, THERMOFLEX™ will further tune (resize) components (e.g. turbines, pumps, and heat exchangers) to achieve good performance for the working fluid conditions. The heat input into the fuel salt loop represents the thermal power of the reactor. The gross efficiency is the turbine shaft power output relative to the thermal power input. Net power is generator output power subtracting pumping and auxiliary losses relative to thermal power input.

Table 3 below shows the performance and cost results for the supercritical Rankine cycle operated with thermal power input of 600 MW, 1200 MW, 1800 MW, 2400 MW, and 3000 MW.

In the example shown in FIG. 2, the fuel salt is contained in tubes 204 that are located at the center of a pool 210 of coolant 202 in a closed reactor vessel 206. The top portion of the reactor vessel 206 may be filled with some inert gas 218 such as argon. The fuel tubes 204 are arranged in an array similar to conventional solid fuel arrays in a light water reactor. The coolant 202 transfers heat from the center of the pool 210 to heat exchangers 208 located on the periphery of the pool 210. In the embodiment shown, the circulation of the coolant 202 (illustrated by the dashed arrows 212) within the pool 210, which may be natural or induced by an impeller or other mechanism (not shown), convects heat away from the fuel tubes 204 to be removed by the heat exchangers 208.

The heat exchangers 208 transfer heat from the pool 210 to a secondary coolant system 214. In an embodiment, the secondary coolant is water that is boiled in the heat exchangers and the resulting steam 216 is used to drive turbines (not shown) for the generation of power.

An optional set of reflector modules 232, such as reflector modules 132 discussed with reference to FIGS. 1E and 1F, may be provided around the array of fuel tubes either within the reactor vessel as shown in FIG. 2 and/or external to the reactor vessel similar to that of FIGS. 1E and 1F to increase the efficiency of the reactor. Optional shutdown rods may be provided to maintain the reactor subcritical when needed.

Following its initial start-up with enriched (~12% $^{235}$U) fuel, an MCFR may not require the ongoing feed of enriched fissile material. Instead, an MCFR can be fed depleted or natural uranium, among other fertile materials. During normal operations, modelling shows that the reactor slowly breeds up in reactivity. To counter this increase in reactivity, a small quantity of fully mixed fuel salt may be removed and

TABLE 3

Performance and overall THERMOFLEX ™ cost results for supercritical Rankine operation at thermal power levels from 600 MW to 3000 MW

| Heat input | MW | 600.0 | 1200.0 | 1800.0 | 2400.0 | 3000.1 |
| --- | --- | --- | --- | --- | --- | --- |
| Net power | MW | 276.1 | 560.9 | 845.5 | 1130.3 | 1415.2 |
| Net electrical efficiency | % | 46.0 | 46.7 | 47.0 | 47.1 | 47.2 |
| Fuel salt mass flow | kg/s | 14625 | 29251 | 43876 | 58501 | 73130 |
| Primary coolant salt total mass flow | kg/s | 4774 | 9487 | 14231 | 18975 | 23719 |
| Primary coolant salt main steam generator mass flow | kg/s | 3800 | 7520 | 11244 | 14968 | 18691 |
| Primary coolant salt reheater mass flow | kg/s | 943.7 | 1967 | 2986.4 | 4006 | 5029 |
| Main steam mass flow rate | kg/s | 224.5 | 452.8 | 677.1 | 901.3 | 1025 |
| Reheat steam mass flow rate | kg/s | 195.2 | 403.7 | 610.9 | 818 | 1125.4 |
| Fuel salt heat source outlet | ° C. | 737 | 737 | 737 | 737 | 737 |
| Fuel salt primary heat exchanger outlet | ° C. | 645 | 645 | 645 | 645 | 645 |
| Primary coolant primary heat exchanger outlet | ° C. | 612 | 612 | 612 | 612 | 612 |
| Primary coolant main steam generator outlet | ° C. | 498 | 498 | 498 | 498 | 498 |
| Primary coolant reheat steam generator outlet | ° C. | 498 | 498 | 498 | 498 | 498 |
| Main steam generator steam outlet | ° C. | 580 | 580 | 580 | 580 | 580 |
| Reheat steam generator outlet | ° C. | 600 | 600 | 600 | 600 | 600 |

FIG. 2 illustrates another embodiment of a simplified schematic view of a molten salt nuclear reactor 200. The reactor 200 is a pool-type reactor in which in some examples the fuel salt 108 may be flowing/circulating through the pool or in other cases contained or guided such as through piping.

replaced with fertile feed salt. The addition of fertile material is, in effect, a control rod that reduces reactivity.

Rather than going to disposal, used MCFR fuel can be collected until a sufficient amount is available to start a new reactor. Such a daughter reactor contains a chemically identical fuel salt, and thus, is able to be started without any new enrichment. By transferring used fuel, in total, to a daughter plant for use as the initial fuel for that plant, creation of a fleet of MCFRs significantly reduces the use of actinides and defers the vast majority of radioactive waste until the end of fleet build-out. For ultimate disposal of actinide-bearing fuel salt, prior work found that the salt itself could be packaged, without chemical conversion, into a suitable waste form.

Chloride-Based Fuel Salts

Nuclear fuel salts are generally described by E. H. Ottewitte, "Configuration of a Molten Chloride Fast Reactor on a Thorium Fuel Cycle to Current Nuclear Fuel Cycle Concerns," Ph.D. dissertation, University of California at Los Angeles, 1982, which is incorporated herein by reference in the entirety. Uranium chloride compounds are also discussed generally by B. R. Harder, G. Long and W. P. Stanaway, "Compatibility and Processing Problems in the Use of Molten Uranium Chloride-Alkali Chloride Mixtures as Reactor Fuels," Symposium on Reprocessing of Nuclear Fuels, Iowa State University, 405-432, August 1969, which is incorporated herein by reference in the entirety. The novel fuel salt embodiments described below improve this work and have been developed through modelling and other theoretical research.

It is noted that the molten chloride fuel salts of the present disclosure provide for the introduction of high heavy metal concentration in the fuel salt 108 at reasonable temperatures. By way of a non-limiting example, one or more of the chloride fuel salts of the present disclosure may provide a heavy metal concentration of greater than 61% by weight, with a melting temperature of approximately 500° C. When operated using the fuel salts described below, embodiments of a molten fuel salt reactor may have possible nominal operating temperatures from 200-800° C. While each different fuel will have a slightly different optimal operating temperature, reactors having an operational temperature range of 330-550° C., 350-520° C., 400-510° C. and 450-500° C. The ability to achieve high uranium content levels allows for the utilization of uranium chloride based fuel salt mixtures in the fast neutron spectrum breed-and-burn reactor of the present disclosure. Furthermore, the fissile material may be enriched to any level desired such as 12.5% $^{235}$U or 19.99% $^{235}$U, or any other suitable enrichment level.

It is also noted that the molten chloride fuel salts of the present disclosure have a relatively low vapor pressure when heated to the operating temperatures described herein. While each different fuel will have a slightly different optimal operating pressure to reduce the amount of vaporization of the fuel salt, reactors having an operational pressure range of from 1-10 atm and from 2-5 atm are contemplated.

The following discussion presents various embodiments of molten chloride nuclear fuel salt having a mixture of a metal chloride fuel salt with one or more additional metal chloride salts. For example, the molten chloride nuclear fuel salt may include, but is not limited to, a mixture of a first uranium chloride salt, a second uranium chloride salt and/or an additional metal chloride salt. It is noted that relative amounts of the various components of the fuel salt 108 may be manipulated to control one or more thermal, chemical or neutronic parameters of the fuel salt including, but not limited to, the melting point, thermal conductivity, corrosivity, actinide content level, reactivity, effective neutron multiplication factor ($k_{eff}$) at equilibrium, and the like. For example, the relative amount of fissile uranium (e.g. $^{235}$U) in a given fuel salt mixture may dictate the size of the reactor core section 102 necessary to provide a given power density.

By way of non-limiting example, a fuel salt having a $^{235}$U content of 10 mol % (except where specifically stated otherwise, all % values for chemical compounds will be in molar %) may have a reactor core section volume of approximately 67 cubic meters (m$^3$) and produce a power density of 200 MW/m3, while a fuel salt having a $^{235}$U content of 16% may only require a reactor core section volume of approximately 11 m$^3$. Such a relationship shows the strong dependence of the size of the reactor core section 102 (or number of fuel tubes 204) on the composition of the utilized fuel salt 108.

In one embodiment, the salt mixture of the present disclosure may be selected so that the associated breeding ratio, which is the ratio of the new fissile material created in a reactor during a nuclear reaction to the fissile material consumed by that reaction, of the fuel salt 108 is greater than 1 (e.g., breeding ratio=1.000001, 1.001, etc.), resulting in a long reactor life, but with a breeding performance less than potentially achievable. In another embodiment, the salt mixture of the present disclosure may be selected so that the associated breeding ratio of the fuel salt 108 is less than 1, resulting in burn off of enrichment for a given period of time. It is to be appreciated that selection of a specific fuel composition is dependent on many different competing factors including the reactor design, nominal operating parameters (e.g., temperature and pressure), and, not least of all, overall operational goals (e.g., reducing enrichment, reactor longevity, breeding additional fissile material).

Chlorine-37 Modified Chloride Fuel Salt

In addition to enriching the fissile element(s) (such as uranium or thorium) used to create the fuel salts, embodiments of the fuel salts described herein may be enriched so that some amount of the chloride ion in any one or more of the chloride compounds contain a specific percentage of $^{37}$Cl. Chlorine has many isotopes with various mass numbers. Of these, there are two stable isotopes, $^{35}$Cl (which forms 76% of naturally-occurring chlorine) and $^{37}$Cl (24% in naturally-occurring chlorine). The most common isotope, $^{35}$Cl, is a neutron moderator, that is, $^{35}$Cl reduces the speed of fast neutrons, thereby turning them into thermal neutrons. The isotope $^{35}$Cl is also a strong neutron absorber, and leads to formation of corrosive sulfur and long lived radioactive $^{36}$Cl. The isotope $^{37}$Cl, on the other hand, is relatively transparent to fast neutrons.

One aspect of the present technology is to adjust the $^{37}$Cl content of any chloride-containing compounds to be used as molten fuel salt 108. As discussed above, use of naturally occurring chloride ions to create a chloride compound would result in roughly 76% of the chloride ions being $^{35}$Cl and 24% being $^{37}$Cl. However, in the embodiments described herein any ratio of $^{37}$Cl to total Cl may be used in any particular chloride fuel salt embodiment, and in some cases may meet or exceed a selected ratio of $^{37}$Cl to total Cl. It is to be appreciated that any known or to be developed enrichment techniques may be used to ensure the desired and/or selected $^{37}$Cl ratio concentration including but not limited to centrifuges, ion exchange columns, etc.

In an embodiment all chloride-containing compounds may be created from as pure a feed of $^{37}$Cl as possible. For example, chloride-based fuel salt compounds may be created so that greater than 90%, 95%, 98%, 99% or even 99.9% of the chloride ions in the fuel salt are $^{37}$Cl. Alternatively, a chloride-based nuclear fuel may be developed to achieve any target or selected percentage amount of $^{37}$Cl to other chloride ions in the fuel or in different components of the fuel. For example, for a fuel designed for thermal reactions, the chloride-based fuel salt compounds may be created so that less than 10%, 5%, 2%, 1% or even 0.1% of the chloride ions in the fuel salt are $^{35}$Cl, the remaining being $^{37}$Cl. For fuels tailored to fast reactions, the chloride-based fuel salt compounds may be created so that greater than 10%, 25%, 30%, 35%, 40%, 45%, 50%, 55%, 60%, 65%, 70%, 75%, 80%, 85%, 90%, or more up to 100% as described above of the chloride ions in the fuel salt are $^{37}$Cl. Modelling has indicated that MCFR performance improves significantly with chlorine that is enriched to at least 75% $^{37}$Cl. The use of enriched chlorine reduces both neutron parasitic absorption and production of $^{36}$Cl, which is a long-lived activation product.

Figure 3:
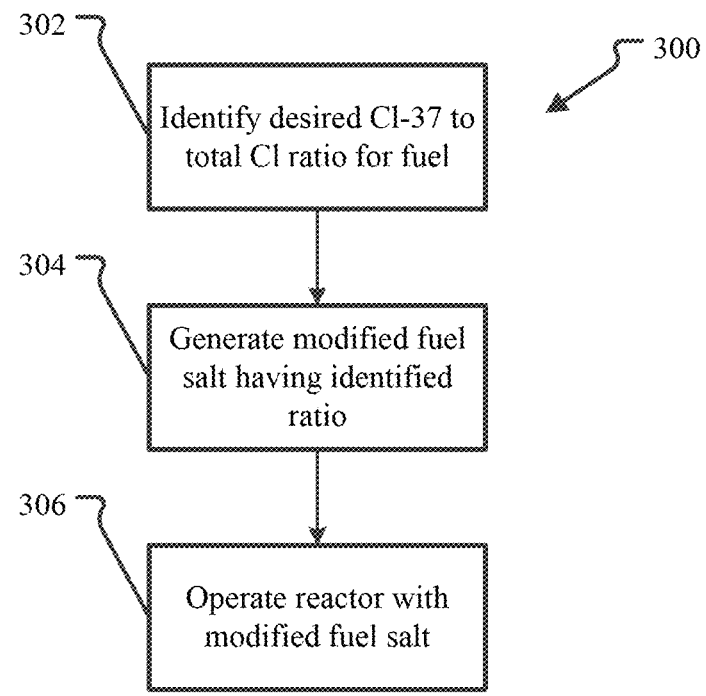
FIG. 3 illustrates an embodiment of a method for creating a fuel tailored to a specific reactor.

FIG. 3 illustrates an embodiment of a method for creating a fuel tailored to a specific reactor. This adjustment of the relative amounts of $^{35}$Cl to $^{37}$Cl provides an additional method to control the reactivity of the fuel salt in fast or thermal reactions. The method 300 begins with an identification operation 302. In the identification operation 302, the desired ratio of $^{37}$Cl to total Cl is determined. To determine the appropriate ratio, factors such as the reactor design, the desired operating parameters of the reactor (e.g., temperature, pressure, etc.), and the chloride-based compounds to be used in the fuel may be taken into account.

The fuel identification operation 302, for example, may include choosing an initial Cl salt having a second ratio of $^{37}$Cl to total Cl in the fuel and determining an initial effective neutron multiplication factor ($k_{eff}$) for the reactor using the initial molten chloride fuel salt, comparing the initial effective neutron multiplication factor to the target effective neutron multiplication factor, and calculating the next or final ratio of $^{37}$Cl to total Cl based on results of the comparing operation. A target effective neutron multiplication factor ($k_{eff}$) may be identified based on the desires of the manufacturer or operator of the nuclear reactor. These techniques may be iterated and/or adjusted as appropriate to determine 302 the selected ratio of $^{37}$Cl to total Cl.

A fuel generation operation 304 is then performed. In the fuel generation operation 304, a fuel is created by modifying the ratio of $^{37}$Cl to total Cl in the final fuel.

In an embodiment, the modified molten chloride fuel salt includes a mixture of different chloride compounds including a first fissile chloride salt compound and a first non-fissile chloride salt compound. In this embodiment, the fuel generation operation 304 may include generating the first fissile chloride salt compound and the first non-fissile chloride salt compound so that they have different ratios of $^{37}$Cl to total Cl of the first fissile chloride salt compound or first non-fissile chloride salt compound, respectively. The $^{37}$Cl to total Cl ratio of each compound is adjusted so that upon combination of the two (or more) compounds to form the final modified fuel salt mixture, the modified molten chloride fuel salt has the desired ratio of $^{37}$Cl to total Cl based on the mass balance of the compounds and their respective $^{37}$Cl to total Cl ratios.

The result of the fuel generation operation 304 is a modified molten chloride fuel salt having a first ratio of $^{37}$Cl to total Cl in the modified molten chloride fuel salt that, when used in the nuclear reactor, achieves the target effective neutron multiplication factor. The fuel salt is referred to as 'modified' to recognize that the final ratio is different than the naturally occurring ratio of $^{37}$Cl to total Cl. For example, a fuel salt may be a mixture of 33% UCl$_4$, 33% UCl$_3$ and 33% NaCl and, in order to achieve a final modified fuel salt ratio of 40% $^{37}$Cl to total Cl, the NaCl may be enriched to have a ratio of 75% $^{37}$Cl to total Cl while the naturally occurring ratio is used for the other two components. This results in a final modified UCl$_4$—UCl$_3$—NaCl fuel salt having a ratio of 40% $^{37}$Cl to total Cl.

The preceding example also shows that, for efficiency, it may be decided to enrich only one compound of a multi-compound fuel salt mixture. For example, if a non-fissile chloride salts is included in the final fuel salt, a large amount of high (or low)$^{37}$Cl to total Cl ratio salt may be created and maintained for later use in blending fuel. The refining of $^{37}$Cl from naturally occurring chlorine is known in the art and any suitable method may be used. For example, centrifugal or ion exchange column (IXC) methods of enrichment appear viable and extensible to the required quantities. Other methods are also possible.

After the modified fuel has been generated, the reactor is charged with the modified fuel and the reactor is operated using the modified fuel in a reactor operation 306. If it is determined during operation that the reactivity is not optimal, new fuel may be generated using the method 300 to either replace the existing fuel or to be blended with the existing fuel until the desired reactivity is achieved in a subsequent fuel generation and blending operation (not shown). In yet another embodiment, the method 300 may be used to change or maintain the reactivity over time in a reactor.

As discussed in greater detail below, chloride-containing fuel salts may include one or more of UCl$_4$, UCl$_3$, UCl$_3$F, UCl$_2$F$_2$, and UClF$_3$ and/or any of the specific fuel salt embodiments described herein may be modified as described above. If a non-fissile chloride compound is used, such additional metal chloride salt may be selected from NaCl, MgCl$_2$, CaCl$_2$, BaCl$_2$, KCl, SrCl$_2$, VCl$_3$, CrCl$_3$, TiCl$_4$, ZrCl$_4$, ThCl$_4$, AcCl$_3$, NpCl$_4$, AmCl$_3$, LaCl$_3$, CeCl$_3$, PrCl$_3$ and/or NdCl$_3$.

UCl$_3$—UCl$_4$—[X]Cl$_n$ Fuel Salts

Embodiments of uranium salts suitable for use as nuclear fuel includes salts that are a mixture of from 0-100% UCl$_3$, 0-100% UCl$_4$ and 0-95% of a metal chloride salt. Thus, these salts include 100% UCl$_3$ fuel salt, 100% UCl$_4$ fuel salt, as well as fuel salts that are mixtures of UCl$_3$ and/or UCl$_4$ with or without an additional metal chloride salt. Based on the results for NaCl as the additional metal chloride salt, fuel salts having a NaCl content less than 68 mol % are considered suitable based on the modelling results. In another embodiment, uranium salts suitable for use as nuclear fuel includes salts that are a mixture of from 0-100% UCl$_3$, 0-100% UCl$_4$ and 0-95% of a metal chloride salt having a melting point below 800, 700, 600, 500, 400 or 350° C. For NaCl embodiments, uranium salts suitable for use as nuclear fuel include salts that are a mixture of from 0-100% UCl$_3$, 0-100% UCl$_4$ and 0-68% of NaCl having a melting point of each of the constituent salts below 800, 700, 600, 500, 400 or 350° C. In yet another embodiment, NaCl content of the fuel salt may vary between 12 and 68% of NaCl.

The molten chlorides differ significantly from the historically used fluorides in two noteworthy aspects. First, chlorides are less effective at moderating neutrons than the fluorides. This ensures a fast neutron spectrum, which is essential to breed-and-burn operation. Second, and more importantly, the chlorides offer the possibility of very high heavy metal concentrations in mixtures with reasonable melting points, which is important to obtain a compact fast breeding reactor design. Fluoride salts typically contain no more than 10-12 mole % heavy metal with proposed salt mixtures typically containing molar concentrations of 63-72 mole % LiF (enriched to 99.997% $^7$Li), 16-25 mole % BeF$_2$, 6.7-11.7 mole % ThF$_4$, and only 0.3 mole % UF$_4$ (heavy metal is 40-45%, by weight).

Figure 4:
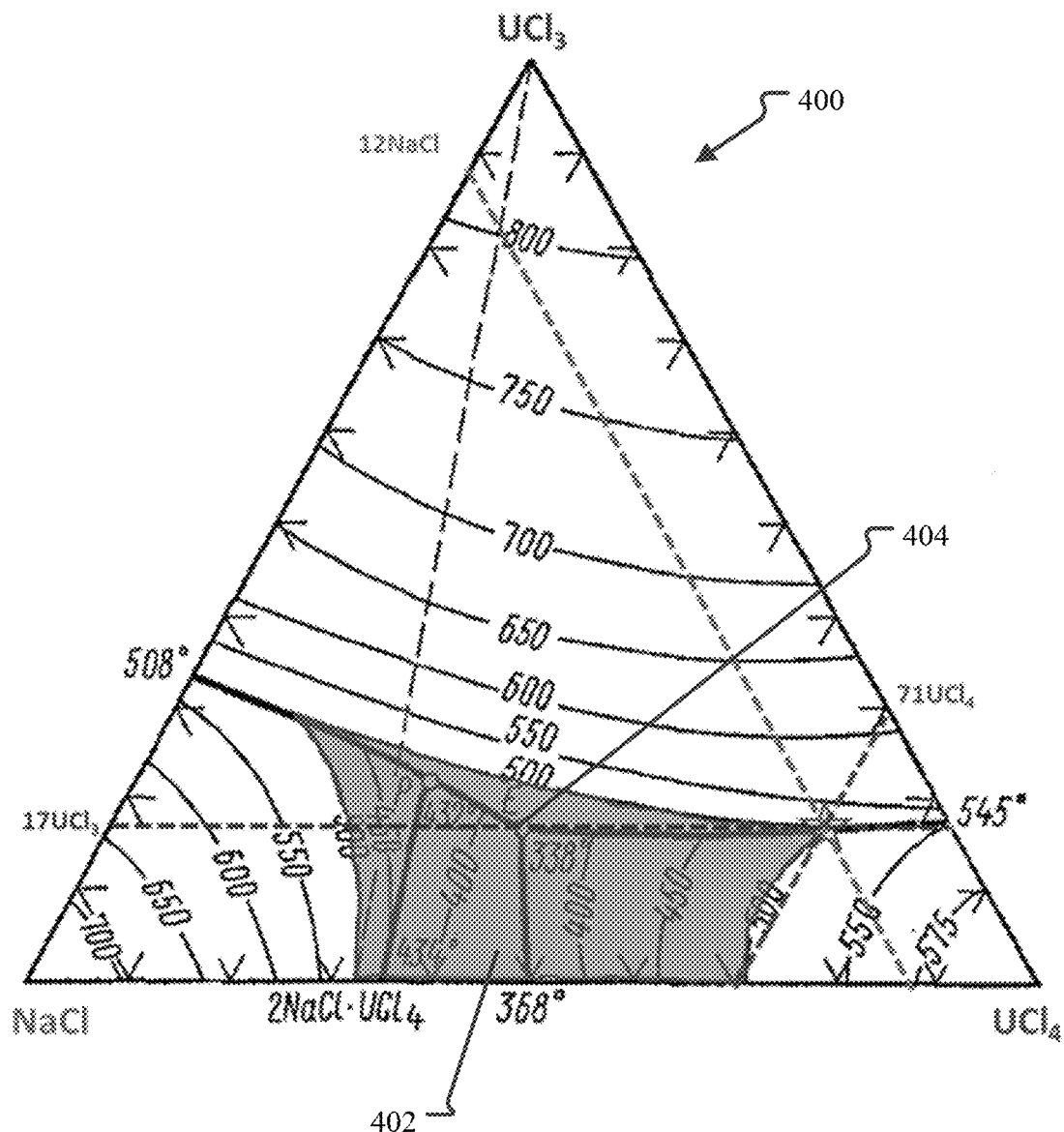
FIG. 4 illustrates a ternary phase diagram calculated for $UCl_3$—$UCl_4$—NaCl fuel salts.

FIG. 4 illustrates a ternary phase diagram calculated for $UCl_3$—$UCl_4$—NaCl fuel salts based thermodynamic models. The diagram 400 shows the expected melting temperature for any mixture of $UCl_3$—$UCl_4$—NaCl. Of particular interest are mixtures having a melting point less than 500° C., which mixtures are illustrated in the shaded region 402 of the diagram 400. The eutectic point 404 has a melt temperature of 338° C. and a composition of $17UCl_3$-$40.5UCl_4$-$42.5NaCl$ (i.e., 17 mol % $UCl_3$, 40.5 mol % $UCl_4$ and 42.5 mol % NaCl). The shaded region 402 indicates a melting point envelope of 500° C. Moving to the far-right of this envelope 402 provides an embodiment, $17UCl_3$-$71UCl_4$-$12NaCl$, but note that many possible compositions exist within the envelope 402 as embodiments of fuel salt mixtures having a melting point below 500° C. Furthermore, if the melting temperature limit is slightly extended to 508° C., a composition of $34UCl_3$-$66NaCl$ provides an option that is free of $UCl_4$. Likewise, the ternary diagram 400 allows a range of specific $UCl_3$—$UCl_4$—NaCl fuel salt embodiments to be identified for any given melting point limit from 800° C. and 338° C. For example, ternary salts with melting points from 300-550° C., 338-500° C., and 338-450° C. may be easily identified.

The specific composition of the mixture may include any formulation including two or more of $UCl_4$, $UCl_3$ or NaCl such that the resulting uranium content level and melting temperature achieve desired levels. By way of non-limiting example, the specific composition may be selected so that the corresponding melting temperature falls from 330 and 800° C. By way of another non-limiting example, the specific composition may be selected so that the overall uranium content level is at or above 61% by weight. In addition to selecting the overall uranium content level the fuel composition may also be determined to meet a selected amount of fissile uranium (as opposed to fertile). For example, the specific composition of the fuel salt 108 may be selected such that the $^{235}U$ content of the fuel salt 108 is below 20%.

As part of initial concept development, a series of neutron transport and burn calculations have been completed for a variety of fuel salts, fissile enrichments, sizes and powers. As would be expected, higher enrichments enable smaller core sizes, but suffer from reduced breeding potential. Systems with some form of fission product removal can reach equilibrium behavior, while others breed up and then are eventually overwhelmed by the build-up of fission products. Multiple options exist for fuel salt selection, each with benefits and risks. The following discussion will identify particular embodiments of interest, however the following discussion does not limit the scope of the invention as claimed to only the embodiments described below, but rather, that any embodiments identifiable from FIG. 4 are contemplated, as well as any embodiments having different metal chlorides other than NaCl. Examples of additional, non-fissile metal chlorides include NaCl, $MgCl_2$, $CaCl_2$), $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$ and/or $NdCl_3$.

$UCl_4$ Fuel Salt Embodiments

In one embodiment, fuel salt 108 includes $UCl_4$. For example, the fuel salt 108 may have a $UCl_4$ content at or above 5% by molar fraction. In another embodiment, the fuel salt 108 of the reactor 100 may include a mixture of $UCl_4$, an additional uranium chloride salt and/or an additional metal chloride salt (e.g., carrier salt) such that the $UCl_4$ content of the mixture is at or above 5% by molar fraction. In other embodiments, the $UCl_4$ content of the mixture may be at or above 0.01% by molar fraction, 0.1%, 0.5%, 1%, 2%, 3% or 4% $UCl_4$. It is noted that fuel salt 108 having a $UCl_4$ content at or above 5% by molar fraction may experience increased levels of corrosive exposure. As discussed below, a variety of approaches may be implemented to mitigate corrosion caused by increased chloride content.

In another embodiment, the fuel salt 108 of the reactor may include a mixture of $UCl_4$, an additional uranium chloride salt and/or an additional metal chloride salt such that uranium concentration of the mixture is at or above 61% by weight.

In one embodiment, the additional uranium chloride salt includes $UCl_3$, as is described in greater detail below. In another embodiment, the additional metal chloride salt may include a carrier salt, a fission product chloride salt, an actinide chloride salt and/or a lanthanide chloride salt. By way of non-limiting example, the additional metal chloride salt may include, but is not limited to, NaCl, $MgCl_2$, $CaCl_2$), $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$ and/or $NdCl_3$.

By way of non-limiting example, the fuel salt 108 of the reactor 100 may include a mixture of $UCl_4$ and $UCl_3$ (with no NaCl) such that the composition of the mixture corresponds to $82UCl_4$-$18UCl_3$ (in molar %). It is noted that such a fuel salt composition has a uranium content of approximately 65% by weight and a melting temperature of 545° C.

By way of another non-limiting example, the fuel salt 108 of the reactor 100 may include a mixture of $UCl_4$, $UCl_3$ and NaCl such that the composition of the mixture corresponds to $17UCl_3$-$71UCl_4$-$12NaCl$ (in molar %). It is noted that such a fuel salt composition has a uranium content of approximately 61% by weight and a melting temperature of approximately 500° C.

By way of another non-limiting example, the fuel salt 108 of the reactor 100 may include a mixture of $UCl_4$ and NaCl (with no $UCl_3$) such that the composition of the mixture corresponds to $50UCl_4$-$50NaCl$ (in molar %). It is noted that such a fuel salt composition will have a melting temperature of approximately 368° C. It is noted herein that, as the lanthanides and/or plutonium build up within the fuel salt 108, they may act similar to $UCl_3$, since lanthanides and plutonium form trichloride compounds (as discussed above). In this event, the change in composition may cause the behavior of the fuel salt 108 to shift toward that of the eutectic (as discussed above), thereby reducing the melting point of the composition.

By way of yet another example, pure $UCl_4$ may be used as a fuel salt. Pure $UCl_4$ has a melting temperature (as shown in FIG. 4) of 590° C.

Due to the lower uranium content of the $66NaCl$-$34UCl_3$ composition, the binary salt requires a larger core than the $UCl_4$-containing compositions in order to achieve initial criticality. For example, the reactor core section 102 may require a volume 3-4 times larger than required for a $UCl_4$-containing version of the fuel salt 108 to achieve initial criticality.

Figure 5:
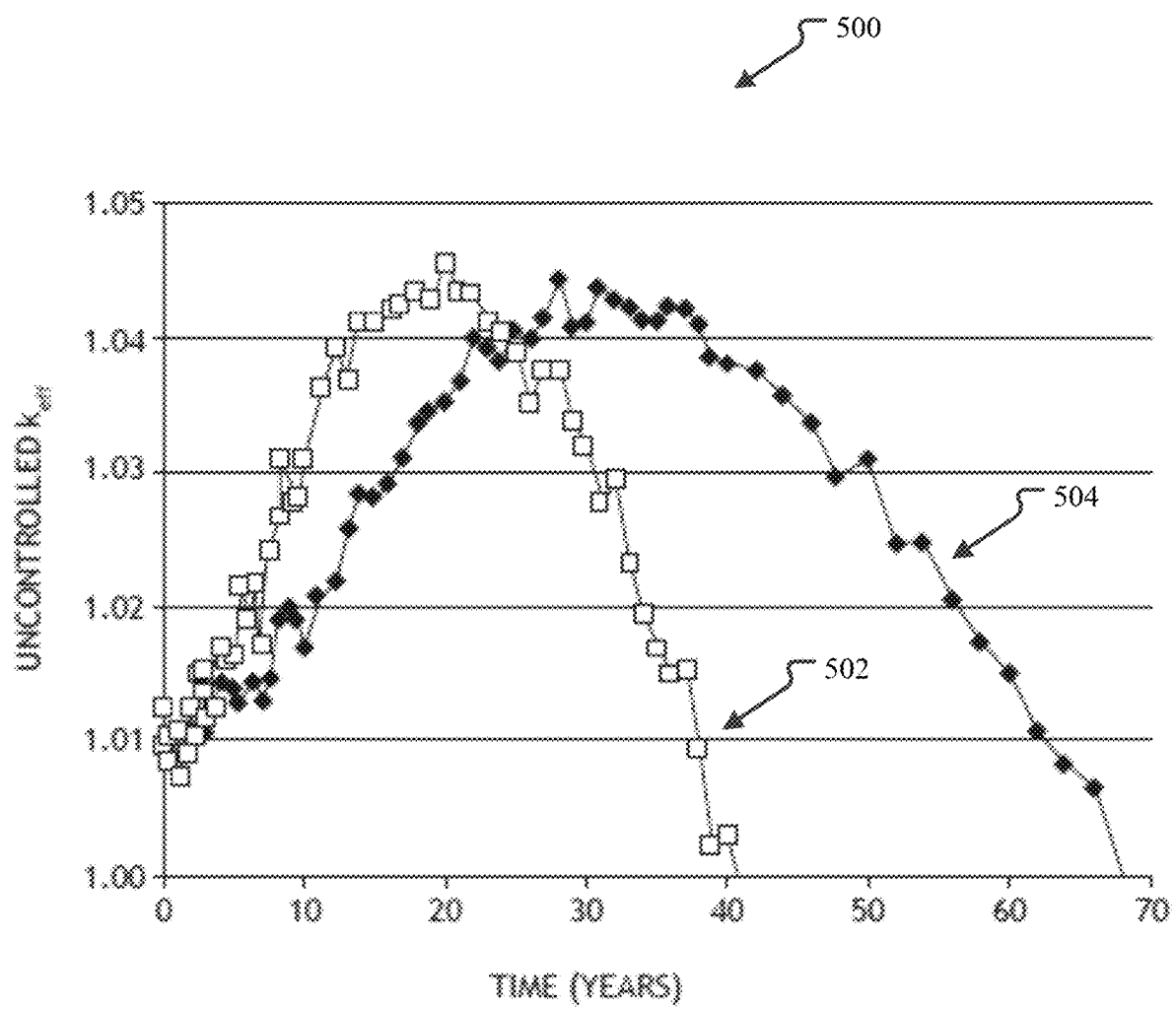
FIG. 5 illustrates $k_{eff}$ modeled as a function of time for a larger reactor core section of the reactor illustrated in FIGS. 1A-1F utilizing the $66NaCl$-$34UCl_3$ composition.

FIG. 5 illustrates $k_{eff}$ modeled as a function of time for a larger reactor core section of the reactor illustrated in FIGS. 1A-1F utilizing the $66NaCl$-$34UCl_3$ composition. Curve 502 depicts a modeled $k_{eff}$ curve for a power level of 5800 MW and curve 504 depicts a modeled $k_{eff}$ curve for a power level of 3420 MW. It is noted that both curves 502, 504 are modeled to operate with a depleted uranium (DU) feed and without specific lanthanide removal. As shown in FIG. 5, the 3420 MW case (curve 504) may operate for nearly 70 years before going subcritical, while the 5800 MW case (curve 502) may operate for approximately 41 years prior to going subcritical. In addition, the model shown in FIG. 5 also predicted a fuel burnup of 43% without any lanthanide removal during the years of operation. Thus, the modeling shows that chlorine-based uranium fuel salt may be effective at reducing dependencies of prior molten salt reactors on enriched uranium to maintain criticality.

Figure 6:
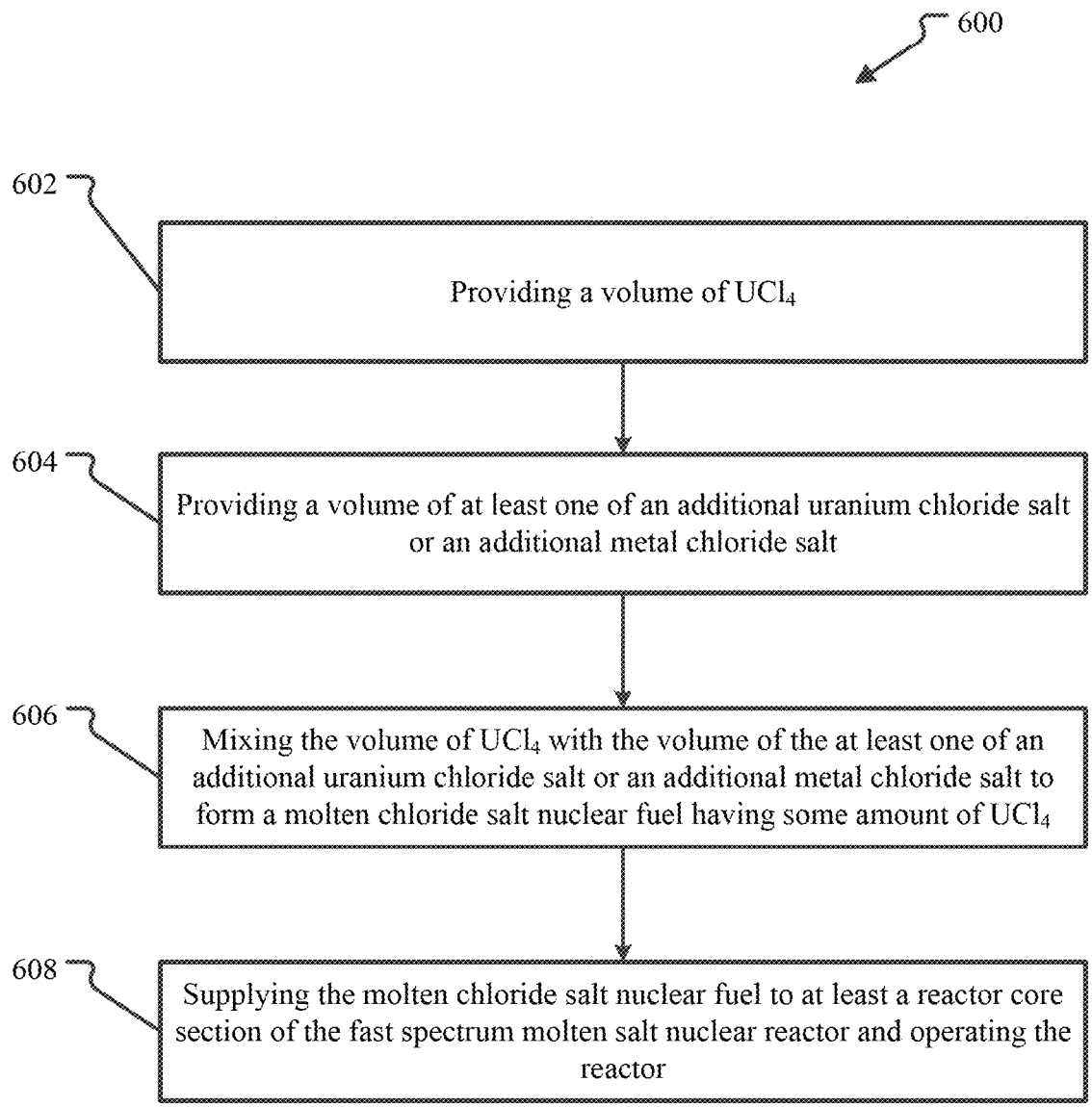
FIG. 6 illustrates a process flow representing example operations related to fueling a fast spectrum molten salt nuclear reactor, in accordance with one or more embodiments of the present disclosure.

FIG. 6 illustrates a process flow 600 representing example operations related to fueling a fast spectrum molten salt nuclear reactor, in accordance with one or more embodiments of the present disclosure. Although the operations of FIG. 6 are presented in the sequence(s) illustrated, it should be understood that the various operations may be performed in other orders than those which are illustrated, or may be performed concurrently.

Operation 602 of flow diagram 600 includes providing a volume of $UCl_4$. By way of non-limiting example, a selected volume of $UCl_4$ may be provided in a substantially pure form. By way of another non-limiting example, a selected volume of $UCl_4$ may be provided in the form of a mixture of $UCl_4$ with another salt, such as, but not limited to, a carrier salt (e.g., NaCl).

Operation 604 of flow diagram 600 includes providing a volume of at least one of an additional uranium chloride salt or an additional metal chloride salt. By way of non-limiting example, the additional uranium chloride may include, but is not limited to, $UCl_3$. In one embodiment, a selected volume of substantially pure $UCl_3$ may be provided. In another embodiment, a selected volume of $UCl_3$ may be provided in the form of a mixture of $UCl_3$ with another salt, such as, but not limited to, a carrier salt (e.g., NaCl). By way of another non-limiting example, the additional metal chloride includes, but is not limited to, one or more NaCl, $MgCl_2$, $CaCl_2$, $BaCl_2$, KCl, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$ and/or $NdCl_3$. In one embodiment, a selected volume of an additional metal chloride may be provided. In another embodiment, a selected volume of an additional metal chloride may be provided in the form of a mixture of the metal chloride with another salt, such as, but not limited to, a carrier salt.

Operation 606 of flow diagram 600 includes mixing the volume of $UCl_4$ with the volume of the at least one of an additional uranium chloride salt or an additional metal chloride salt to form a molten chloride nuclear fuel salt having a $UCl_4$ content greater than 5% by molar fraction. By way of non-limiting example, the volume of $UCl_4$ provided in operation 602 may be mixed with the volume of operation 604 such that the resulting molten chloride salt mixture has a $UCl_4$ content greater than 5% by molar fraction. In this regard, the volume of $UCl_4$ of operation 602 and the volumes of additional uranium chloride and/or an additional metal chloride may be selected such that the resulting molten chloride salt mixture has a $UCl_4$ content greater than 5% by molar fraction. Additionally or alternatively, operation 606 includes mixing the volume of $UCl_4$ with the volume of the additional uranium chloride salt and/or additional metal chloride salt to form a molten chloride salt mixture having a melting temperature from 330 to 800° C.

In one embodiment, the volumes of operations 602 and 604 may be selected and mixed such that the resulting molten chloride salt mixture has a chemical composition of (or approximately) $82UCl_4$-$18UCl_3$. In another embodiment, the volumes of operations 602 and 604 may be selected and mixed such that he resulting molten chloride salt mixture has a chemical composition of (or approximately) $17UCl_3$-$71UCl_4$-12NaCl. In another embodiment, the volumes of operations 602 and 604 may be selected and mixed such that the resulting molten chloride salt mixture has a chemical composition of (or approximately) 50 $UCl_4$-50NaCl.

Operation 608 of flow diagram 600 includes supplying the molten chloride nuclear fuel salt having some amount of $UCl_4$ as described above (e.g., the $UCl_4$ content of the mixture may be at or above 0.01% by molar fraction, 0.1%, 0.5%, 1%, 2%, 3%, 4% or 5%) to at least a reactor core section of the fast spectrum molten salt nuclear reactor. In one embodiment, the mixture of operation 606 may be formed by mixing the volume of $UCl_4$ with the volume of the at least one of an additional uranium chloride salt or an additional metal chloride salt inside of the fast spectrum molten salt nuclear reactor. In one embodiment, the mixture of operation 606 may be formed by mixing the volume of $UCl_4$ with the volume of the at least one of an additional uranium chloride salt or an additional metal chloride salt at a location outside of the fast spectrum molten salt nuclear reactor, such as, but not limited to, a mixing vessel. In this regard, following the mixture of $UCl_4$ with the volume of the at least one of an additional uranium chloride salt or an additional metal chloride salt, the molten chloride salt mixture may be loaded into the reactor 100. The reactor may then be operated as described herein, for example by initiating fission in the fuel salt and then maintaining breed-and-burn behavior in the reactor core for some period of time.

In one embodiment, the concentration of one or more of the additional metal chlorides (discussed above) is selected to be at or below the precipitation concentration for precipitation of the additional metal chloride within the nuclear fuel mixture. For instance, a fission product concentration may be kept below the concentration associated with that fission product that would cause another constituent, such as Pu, of the fuel salt 108 to precipitate out of the fuel solution.

It is again noted that the molten chloride salt compositions provided above are not limitations on the reactor 100 or associated methods of the present disclosure. Rather, the specific compositions are provided merely for illustrative purposes. It is recognized that any molten chloride fuel salt may be implemented in the reactor 100 of the present disclosure.

$UCl_3$ Fuel Salt Embodiments

In addition to the embodiments described above that contained $UCl_3$ in combination with $UCl_4$, additional embodiments of the fuel salts include $UCl_3$ and lack any $UCl_4$ content. These embodiments and their associated melting points are also identified on FIG. 4 along the left axis. It is noted that a fuel mixture free of $UCl_4$ may be of particular interest in the event $UCl_4$ corrosion concerns become significant and may lessen the need for corrosion mitigation techniques (as described below). By way of non-limiting example, the fuel salt 108 of the reactor 100 may include a mixture of $UCl_3$ and NaCl such that the composition of the mixture corresponds to 66NaCl-$34UCl_3$ (in molar %). It is noted that such a fuel salt composition has a melting temperature of approximately 508° C., but a reduced uranium content level as compared to the $UCl_4$-containing compositions (described above).

$UCl_3$ fuel salt embodiments also include pure $UCl_3$, however, the melting point is slightly above 800° C. and thus this embodiment may not be suitable for certain reactor designs.

Mixed Chloride-Fluoride Fuel Salt Embodiments

Mixed chloride-fluoride salts of actinides, and particularly of uranium, may also be suitable fissionable salts for use in a molten salt reactor. $UCl_3F$ is an embodiment of a potentially useful chloride-fluoride salt. $UCl_3F$ has a melting point of from 410-440° C. which is less than the melting point of pure UCl$_4$, which is 590° C. Because of the molecular symmetry and chemical composition of the UCl$_3$F salt, it is also anticipated that UCl$_3$F will have a lower volatility than UCl$_4$ making it even more attractive as a fuel salt in a low temperature (e.g., less than 800° C., or even less than 550° C.) molten salt reactor.

Based on the above information, the calculated ternary diagram for UCl$_4$ shown in FIG. 4, and the similarity between UCl$_3$F and UCl$_4$, it is expected that UCl$_3$F could be used to replace some or all of the UCl$_4$ in a fuel salt mixture to obtain fuel salt embodiments that have even better properties (e.g., lower melting point and lower volatility) while having substantially the same reactivity. Although a ternary diagram of UCl$_3$F, UCl$_3$ and NaCl has not been calculated, a ternary diagram for UCl$_3$F, UCl$_3$ and NaCl is anticipated to show a minimum melting point at a location near the corresponding eutectic point 404 on FIG. 4 for the salt 17UCl$_3$-40.5UCl$_4$-42.5NaCl. That is, it is anticipated that such a diagram for UCl$_3$F, UCl$_3$ and NaCl will show a similar trend in reduced melting point in a region from 15-20 mol % UCl$_3$ and the balance being from 35-45 mol % NaCl and 35-45 mol % UCl$_3$F. Given that UCl$_3$F normally has a melting point substantially less than UCl$_4$, replacing UCl$_4$ with UCl$_3$F in fuel salt embodiments is anticipated to result in fuel salts with even lower melting points than those observed in FIG. 4.

Given this information, uranium embodiments of Cl$_3$F fuel salts include salts having from 1-100 mol % UCl$_3$F. For example, embodiments of mixed chloride-fluoride fuel salts include salts with at least 5%, 10%, 15%, 20%, 25%, 30%, 35%, 40%, 45%, 50%, 55%, 60%, 65%, 70%, 75%, 80%, 85%, 90%, 95%, and 99% UCl$_3$F. A fuel salt of pure or substantially pure UCl$_3$F is also possible, as the melting point is within the operational range of the reactors described herein. In an alternative embodiment, a UCl$_3$F fuel salt may have only a detectable amount of UCl$_3$F. While it is recognized that detection limits may change as technology improves, in an embodiment a detectable amount means equal to or greater than 0.01 mol %.

Other salts that could be combined with UCl$_3$F to make fuel salt embodiments include, UCl$_3$, NaCl, and UCl$_4$. As discussed above salts of UCl$_3$F—UCl$_3$—NaCl are particularly contemplated including embodiments having from 15-20 mol % UCl$_3$ and the balance being from 35-45 mol % NaCl and 35-45 mol % UCl$_3$F. In addition, any other salts discussed herein may be included, such as ThCl$_4$, uranium fluoride salts, non-fissile salts, and uranium bromide salts.

In addition to UCl$_3$F, other mixed actinide salts such as UCl$_2$F$_2$, and UClF$_3$ may be suitable for use as a fuel salt or a constituent of a fuel salt in a molten reactor. Mixed chloride-fluoride salts of plutonium or thorium may also be suitable for use as molten fuel salts.

Embodiments of methods for creating UCl$_3$F, UCl$_2$F$_2$, and UClF$_3$ are described below including an experiment in which UCl$_3$F was created.

Modified chloride fuel salt embodiments having an altered ratio of $^{37}$Cl to total Cl are also possible and may be used for molten fuel salts. In addition, mixed chloride fluoride fuel salt embodiments may include non-fissile chloride compounds in addition to or instead of NaCl, such as MgCl$_2$, CaCl$_2$, BaCl$_2$, KCl, SrCl$_2$, VCl$_3$, CrCl$_3$, TiCl$_4$, ZrCl$_4$, ThCl$_4$, AcCl$_3$, NpCl$_4$, AmCl$_3$, LaCl$_3$, CeCl$_3$, PrCl$_3$ and/or NdCl$_3$.

In use, mixed uranium chloride-fluoride salt embodiments will be used in a similar fashion to that described above for the chloride salt embodiments. For example, the desired salt composition, such as from 15-20 mol % UCl$_3$ and the balance being from 35-45 mol % NaCl and 35-45 mol % UCl$_3$F, is created. This may be done remotely or by adding the constituents directly into the reactor core. The constituents may be added in solid or liquid form. After charging the reactor core with the fuel salt, the reactor is then brought to operating conditions to initiate a chain reaction, as described above.

Thorium Chloride Fuel Salt

In one embodiment, the fuel salt 108 may include a selected amount of thorium. By way of example, in the case of a chloride-based nuclear fuel salt, the thorium may be presented in the fuel salt 108 in the form of thorium chloride (e.g., ThCl$_4$). Methods for manufacturing ThCl$_4$ are known in the art and any suitable method may be used.

The introduction of ThCl$_4$ into chloride-salt systems has been shown to reduce the melt temperature of the system by approximately 50° C. Thus, based on the information from the ternary salt diagram of FIG. 4, ThCl$_4$ embodiments should have a melting point at or below those found in the ternary system and should be capable of supporting a breed-and-burn reaction while in the molten state. For example, melting points below 800° C. and even 550° C. should be achievable based on the information from the ternary diagram.

An embodiment utilizing ThCl$_4$ is UCl$_3$F—UCl$_4$—UCl$_3$—ThCl$_4$—[X]Cl where, as above, [X]Cl is any additional, non-fissile salt. In these embodiments, the mol ratios of the any of various chloride salt may be determined as needed to obtain the desired melting point. In an embodiment, the amount of ThCl$_4$ varies from a detectable amount of ThCl$_4$ and 80 mol % and the other components (i.e., UCl$_3$F, UCl$_4$, UCl$_3$, and [X]Cl) vary independently from 0 to 80%. Thus, embodiments such as UCl$_3$F—ThCl$_4$—[X]Cl, and UCl$_3$—ThCl$_4$—[X]Cl are contemplated as are UCl$_4$—UCl$_3$—ThCl$_4$—NaCl.

Uranium Bromide Fuel Salt Embodiments

In addition to the chloride fuel salt embodiments described herein, bromide fuel salts are also possible as an alternative or backup to a chloride fuel salt. A feature of a molten chloride fuel salt reactor is the ability to breed-and-burn its own fissile fuel from fertile fuel because of the very fast neutron spectrum. This is enabled by the use of an enriched chloride salt to bind the actinide atoms. Chlorine is generally a poor neutron moderator relative to other materials like water, graphite or fluorine. It also has a relatively low neutron capture cross section for parasitic capture (wasted neutrons). A well-performing salt constituent would create a strong chemical bond with actinides, exist with a low vapor pressure, be high Z number to enable a fast spectrum, and have a low (n,γ) capture cross section. $^{37}$Cl is an excellent choice as discussed above. However, based on this analysis bromine may also be suitable.

Bromide salt (UBr$_3$, UBr$_4$) is in the same group and will have similar chemical properties to chloride salts. Bromine is a higher Z material than Cl, so it should moderate neutrons less and result in a faster spectrum. Bromine's chemical bond should be similar to that of Cl. These features make it an attractive alternative to a Cl salt. UBr$_4$ has a reported melting temperature of 519° C., lower than that of UCl$_4$, and so should be suitable for use in the systems and methods described herein. While the boiling point of UBr$_4$ is reported as 791° C. so operating at high temperatures is likely not possible, this is not a limitation for nuclear reactors that are designed to operate in some of the lower ranges identified herein, e.g., 330-550° C., 338-500° C. and 338-450° C.

Figure 7:
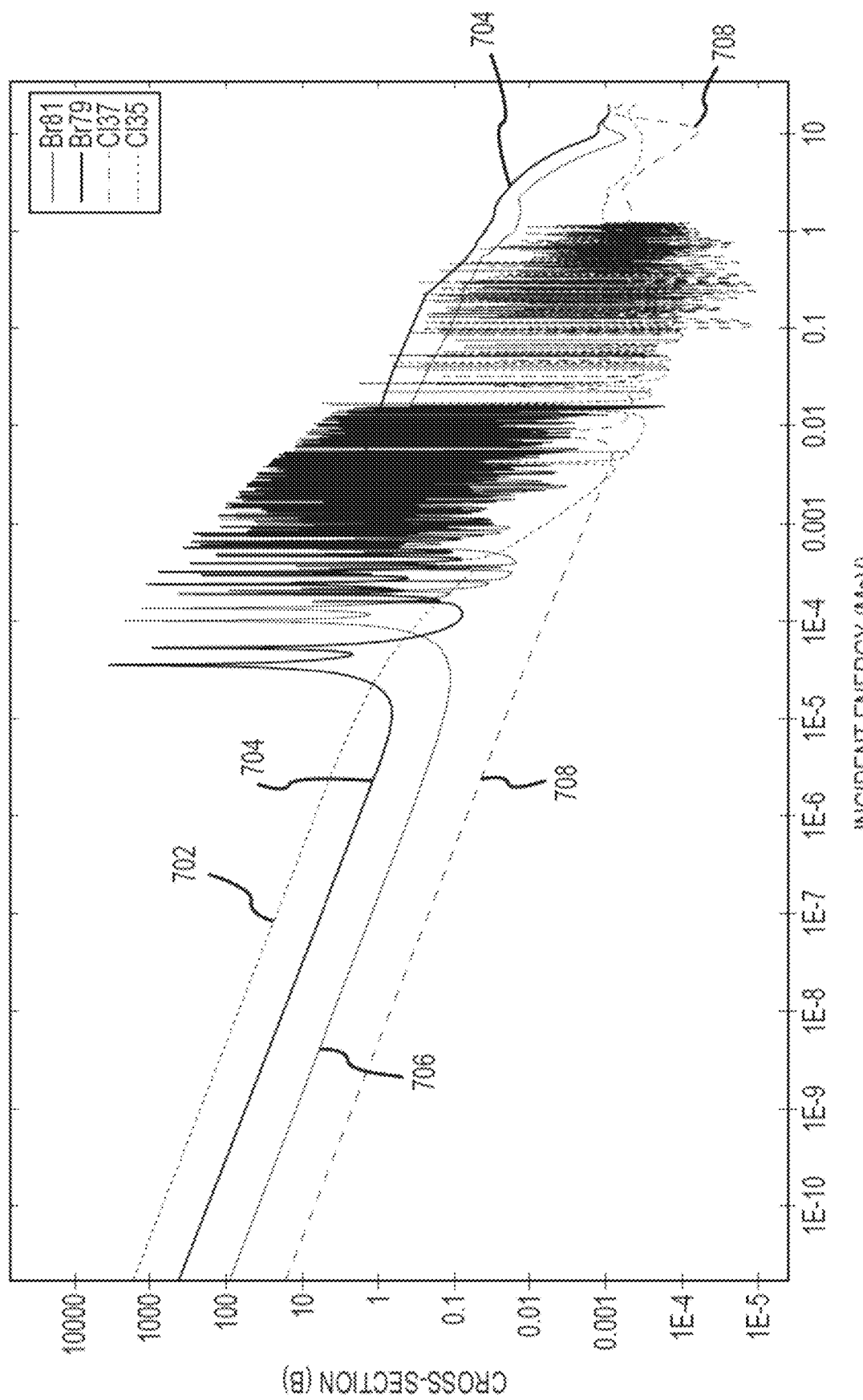
FIG. 7 illustrates the (n,γ) capture cross section for the main Cl and Br isotopes.

FIG. 7 illustrates the (n,γ) capture cross section for the main Cl and Br isotopes, which illustrates that the (n,γ) capture cross section of Br is higher than Cl in most of the energy spectrum. In fact, $^{37}$Cl (curve 708 of FIG. 7) has a lower capture cross section throughout almost the entire spectrum when compared to $^{79}$Br (curve 706 of FIG. 7) and $^{81}$Br (curve 704 of FIG. 7). The $^{35}$Cl (curve 702 of FIG. 7) is also generally lower than the Br above 1×10$^{-4}$ MeV.

Figure 8:
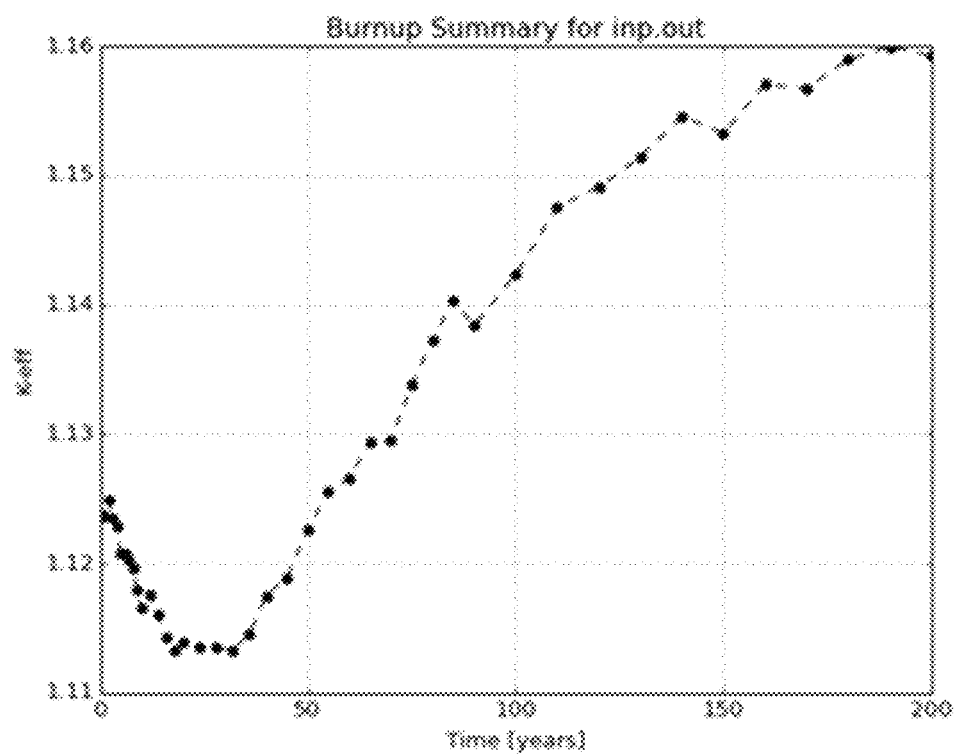
FIG. 8 illustrates the modelling results for a breed-and-burn curve of the bromide fuel salt embodiment of $17UBr_3$-$71UBr_4$-12NaBr and 19.99% $^{235}U$ enrichment.

In addition, the suitability of a bromide salt to actually support a breed-and-burn reaction was studied. This study started with the same chemical makeup of salt and enrichment of the baseline chloride salt. These were 17UBr$_3$-71UBr$_4$-12NaBr and 12.6% $^{235}$U enrichment. This fuel salt was modeled in a standard 1 GWth molten chloride fast reactor with no other changes. The resulting system was subcritical and required either increasing the reactor core size or increasing the enrichment. Increasing the enrichment to 19.99% (maximum allowed to be considered low enriched fuel) in the model resulted in a breed-and-burn curve is shown in FIG. 8. The reactor starts at an artificially high $k_{eff}$, burns down for a few decades, but eventually breeds enough Pu and minor actinides to increase $k_{eff}$ again. Even without being optimized for the bromide salt system, the results of the modelling in FIG. 8 illustrate that the bromide fuel salt embodiments do breed-and-burn and that a molten bromide salt reactor can operate. Thus, UBr$_3$ and/or UBr$_4$ containing fuel salts in which the fuel salts are enriched with $^{235}$U at levels greater than 19% are suitable.

There exist a number optimization possibilities to maximize performance while minimizing volumes necessary to support a breed-and-burn reaction. First, a minimum enrichment may be found to ensure breed-and-burn performance without falling subcritical. Second, reflector sizing and material configurations could be used to tailor the spectrum in a region that maximizes breeding. Third, consistent with the chloride embodiments described above, different fuel salt combinations (XXUBr$_3$—YYUBr$_4$—ZZNaBr) could be investigated to find the optimal embodiments.

In addition, the bromide anions used in one or components of the salt could be modified similar to that described with chloride salts using $^{37}$Cl. As shown in FIG. 7, the two stable isotopes of bromine, 79Br and 81Br, have different neutron capture cross sections. Thus, the capture characteristics of the salt can be tailored by modifying the ratio of these isotopes used in the bromide salts. In an embodiment all bromide-containing compounds may be created from as pure a feed as possible of either $^{79}$Br or $^{81}$Br. For example, bromide-based fuel salt compounds may be created so that greater than 90%, 95%, 98%, 99% or even 99.9% of the bromide ions in the fuel salt are either $^{79}$Br or $^{81}$Br. Alternatively, a bromide-based nuclear fuel may be developed to achieve any target or selected percentage amount of either $^{79}$Br or $^{81}$Br or a combination of the two to other bromide ions in the fuel or in different components of the fuel. For example, in an embodiment, the bromide-based fuel salt compounds may be created so that less than 10%, 5%, 2%, 1% or even 0.1% of the bromide ions in the fuel salt are $^{81}$Br, the remaining being $^{79}$Br. Alternatively, the bromide-based fuel salt compounds may be created so that greater than 10%, 25%, 30%, 35%, 40%, 45%, 50%, 55%, 60%, 65%, 70%, 75%, 80%, 85%, 90%, or more up to 100% as described above of the bromide ions in the fuel salt are $^{81}$Br.

Uranium Chloride Fuel Manufacturing Processes

Various methods of manufacturing of UCl$_4$ and UCl$_3$ are known in the art and any suitable method may be used. For example, UCl$_4$ may be manufactured by the chemical reaction:

$$UO_3+Cl_3CCCl=CCl_2 \rightarrow UCl_4 + byproduct$$

Likewise, UCl$_3$ may be manufactured using either of the following reactions:

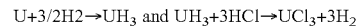
$$U+3/2H_2 \rightarrow UH_3 \text{ and } UH_3+3HCl \rightarrow UCl_3+3H_2$$

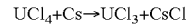
$$UCl_4+Cs \rightarrow UCl_3+CsCl$$

Using the above methods, any amount of UCl$_4$ and UCl$_3$ may be created and then blended to form any of the uranium chloride fuel salt embodiments described above. In addition to the above methods, the following describes another method that can efficiently and simply create a UCl$_4$—UCl$_3$—NaCl embodiment.

Synthesized salts will be subject to strict chemical control to minimize corrosion and precipitation of nuclear material. These chemical controls revolve around eliminating the formation of oxides and hydroxides, especially associated with the uranium cation, which are all more stable than their chloride counterparts. Therefore, once component salts are manufactured they must not contact oxide layers, oxygen, or water, for the duration of their lifetime. To satisfy this stringent requirement, one may purify and process salts under an inert atmosphere, in a closed container. When component salts are required to be mixed, the operation should be performed without exposure to air, water, or oxygen. Storage should be done within leak tight, oxide free, canisters with a positive partial pressure of inert gas. These strict purity actions coupled with the isotopic enrichment and high temperatures lead to unique challenges.

While there are many simpler lab scale processes, it is proposed that a four-step process be used to create high purity, chlorine-37 enriched, and chloride salt mixtures. First, uranium dioxide and sodium carbonate should be reacted in tandem below liquidus temperatures, in vessels coupled in series, with a controlled mixture of chlorine and carbon monoxide gas yielding uranium tetrachloride, sodium chloride, and carbon dioxide gas. Second, the uranium tetrachloride is heated below its liquidus temperature and dry argon is slowly passed over it, facilitating its sublimation and subsequent transfer through heated lines into the cooler bed of fresh sodium chloride. Third, a charge of silicon is added to the UCl$_4$—NaCl mixture and allowed to react in the liquid phase, producing silicon tetrachloride, which can be sparged from the salt. Other reducing agents can be used instead of Si and will be examined if necessary. Fourth, the salt is transferred into a storage container and cold stored under argon.

Figure 9:
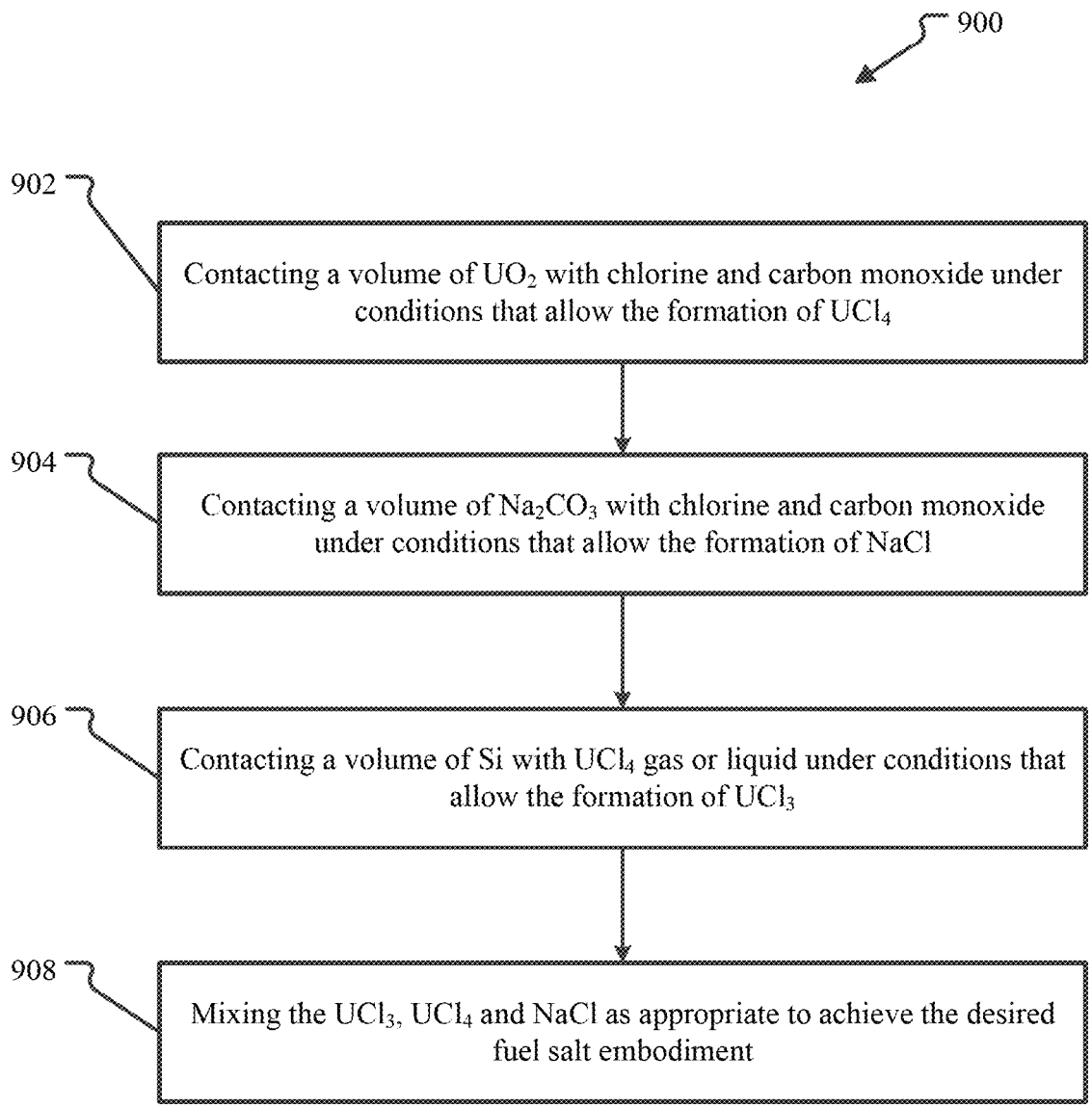
FIG. 9 illustrates an embodiment a method of manufacturing a fuel salt containing $UCl_4$.

FIG. 9 illustrates an embodiment of a method of manufacturing a fuel salt containing UCl$_4$ based on the process outlined above. In the embodiment shown, the method starts with a uranium dioxide contacting operation 902. In the uranium dioxide contacting operation 902, a volume of UO$_2$ is brought into contact with gaseous chlorine and carbon monoxide at a temperature that allows the formation of UCl$_4$. In an embodiment, this operation may be performed by providing an amount of solid UO$_2$. By providing the solid UO$_2$ in a high surface area form that allows easy contact with a gas, such as a powder, a particulate or a porous matrix, the reaction can be made more efficient. The result of the contacting operation 902 is that at least some of the $UO_2$ that comes in contact with the gases is converted into $UCl_4$ via the carbochlorination reaction:

$$UO_2(s)+2CO(g)+2Cl_2(g)=UCl_4(s)+2CO_2(g)$$

This reaction is unique as it contains both a reductant, carbon monoxide, and oxidizer, chloride. These two components oscillate uranium's oxidization state from IV to VI in order to satisfy the thermodynamics of producing uranium tetrachloride from the much more stable oxide. The reaction is very complex in terms of partial reactions. It can be thought of, in order, as $$UO_{2(s)}+\tfrac{1}{2}Cl_{2(g)} \rightarrow UO_2Cl;\ \text{Oxidization,}$$

$$UO_2Cl+\tfrac{1}{2}Cl_{2(g)} \rightarrow UO_2Cl_{2(s)};\ \text{Oxidation,}$$

$$UO_2Cl_{2(s)}+CO_{(g)} \rightarrow UOCl_2+CO_{2(g)};\ \text{Reduction,}$$

$$UOCl_{2(s)}+\tfrac{1}{2}Cl_{2(g)} \rightarrow UOCl_{3(s)};\ \text{Oxidation,}$$

$$UOCl_{3(s)}+\tfrac{1}{2}Cl_{2(g)} \rightarrow UOCl_4;\ \text{Oxidation,}$$

$$UOCl_4+CO_{(g)} \rightarrow UCl_4+CO_{2(g)};\ \text{Reduction.}$$

It is important to note that two reactions are predicted after the tetrachloride $$UCl_4+\tfrac{1}{2}Cl_{2(g)} \rightarrow UCl_5;\ \text{Oxidation,}$$

$$UCl_5+\tfrac{1}{2}Cl_{2(g)} \rightarrow UCl_6;\ \text{Oxidation.}$$

Two oxidization reactions are known to produce uranium pentachloride and uranium hexachloride, but these products are predicted to decompose to uranium tetrachloride at 250° C. To avoid the production of uranium pentachloride and uranium hexachloride, and the melting or sublimation of the uranium tetrachloride as well, the reaction may be kept between the temperatures of 250° C. and 400° C.

As described above, some or all of the chlorine may be $^{37}Cl$ in order to achieve a target $^{37}Cl$ to total Cl in the resulting $UCl_4$ or the Cl in the fuel overall as discussed above. Depending on the desired ratio, multiple sources of different isotopes of Cl may be used to achieve the desired $^{37}Cl$ to total Cl ratio, e.g., a source of pure $^{37}Cl$, a source of natural Cl, a source of pure $^{35}Cl$ and/or some other blend of $^{35}Cl$ and $^{37}Cl$.

The method 900 also includes a sodium carbonate ($Na_2CO_3$) contacting operation 904. Similar to the $UO_2$ contacting operation 902, the $Na_2CO_3$ contacting operation 904, includes contacting a volume of $Na_2CO_3$ with gaseous chlorine and carbon monoxide at a temperature that allows the formation of NaCl. In an embodiment, this operation may be performed by providing an amount of solid $Na_2CO_3$. By providing the solid $Na_2CO_3$ in a high surface area form that allows easy contact with a gas, such as a powder, a particulate or a porous matrix, the reaction can be made more efficient. The result of the sodium carbonate contacting operation 904 is that at least some of the $Na_2CO_3$ that comes in contact with the gases is converted into NaCl. Again, as described above, the amount of Cl enrichment (e.g., $^{37}Cl$ enrichment) in the final NaCl can be controlled by controlling the enrichment in the chlorine gas used. The equation for this reaction is as follows:

$$Na_2CO_3(s)+CO(g)+Cl_2(g)=2NaCl(s)+2CO_2(g)$$

The method 900 also includes silicon contacting operation 906 in which liquid or gaseous $UCl_4$ is contacted with silicon metal. In an embodiment, the silicon contacting operation 906 may control the reaction conditions to cause a specified $UCl_4$—Si reaction or reactions to occur, whereby the amount of $UCl_3$ generated is controlled by the amount of Si used and $UCl_4$ is provided in excess. This operation 906 may be performed by providing an excess amount of liquid $UCl_4$ and immersing a known amount of silicon in the liquid until all or substantially all the Si has reacted. The result of the silicon contacting operation 906 is that at least some of the $UCl_4$ that comes in contact with the gases is converted into $UCl_3$. The amount of $UCl_4$ that is converted to $UCl_3$ is stoichiometric with the amount of Si used as the Si is highly reactive with $UCl_4$ but not with $UCl_3$. Therefore, with a known starting amount of $UCl_4$, any desired mixture of $UCl_4$—$UCl_3$ can be obtained simply by controlling the amount of Si placed into contact with the $UCl_4$ gas and the amount of $UCl_4$. An equation for a suitable reaction that could be used in this embodiment of the operation 906 is as follows:

$$4UCl_4(g\ or\ l)+Si(s)=4UCl_3(g)+SiCl_4(g)$$

Silicon tetrachloride boils at 57° C., which at molten salt temperatures will readily vaporize and be carried away with the argon. Once removed it can be collected or reacted with a neutralization bath. The naturally existing oxide layer, silicon dioxide, is inert to the salt and will exist as a suspension or settle as a precipitate. Its presence will not affect the quality of the salt.

Other reactions are also possible. For example, the silicon contacting operation 906 may involve using silane ($SiH_4$) or another silicon containing gas such as silicon dichloride ($SiCl_2$) under the temperature and pressure conditions to allow the formation of $UCl_3$ and $SiCl_4$ from the $UCl_4$. The $UCl_4$ may be either in gaseous or solid form during this reaction, depending on the temperature and pressure conditions.

In an alternative embodiment, rather than using an excess of $UCl_4$ the silicon contacting operation 906 may instead convert a known amount of $UCl_4$ to the same stoichiometric amount $UCl_3$ in an excess of Si. As the goal is to generate a known amount of $UCl_3$ and the resulting silicon chloride specie are unimportant, performing the silicon contacting operation 906 in an excess of Si may be simpler than controlling the reaction conditions.

The contacting operations 902, 904, 906 may be performed using any suitable contacting vessels or equipment, now known or later developed. For example, in an embodiment the solid material to be contacted is a loose particulate or powder and the gaseous material is flowed or circulated under pressure through the contacting vessel (e.g., flowed into a valve at one end of the vessel and removed from a valve at the other end of the vessel) such that the vessel temporarily becomes a packed bed reactor or, if the flow rate through the container is sufficient, a fluidized bed reactor. In these embodiments, the contacting of the gases with the solid material is performed without removing solid material from the vessel container.

The method 900 further includes mixing the generated $UCl_3$, $UCl_4$ and NaCl to obtain the desired fuel salt embodiment. The mixing may be done while the $UCl_3$, $UCl_4$ and NaCl are, independently, in the gas, liquid or solid phase. For example, the appropriate amount of each compound may be created separately, then the separate compounds may be heated to the molten state and transferred into a single container where they are allowed to mix and solidify. This creates a solid fuel salt embodiment that is easily transported. As previously noted, the components can be mixed and/or melted within or external to the reactor vessel.

The method 900 may be performed as independent operations or may be performed in a way that the execution of the operations is coordinated. For example, the same chlorine gas may be used in the $UO_2$ contacting operation 902 and the $Na_2CO_3$ contacting operation 904 by connecting the contacting vessels.

Figure 10:
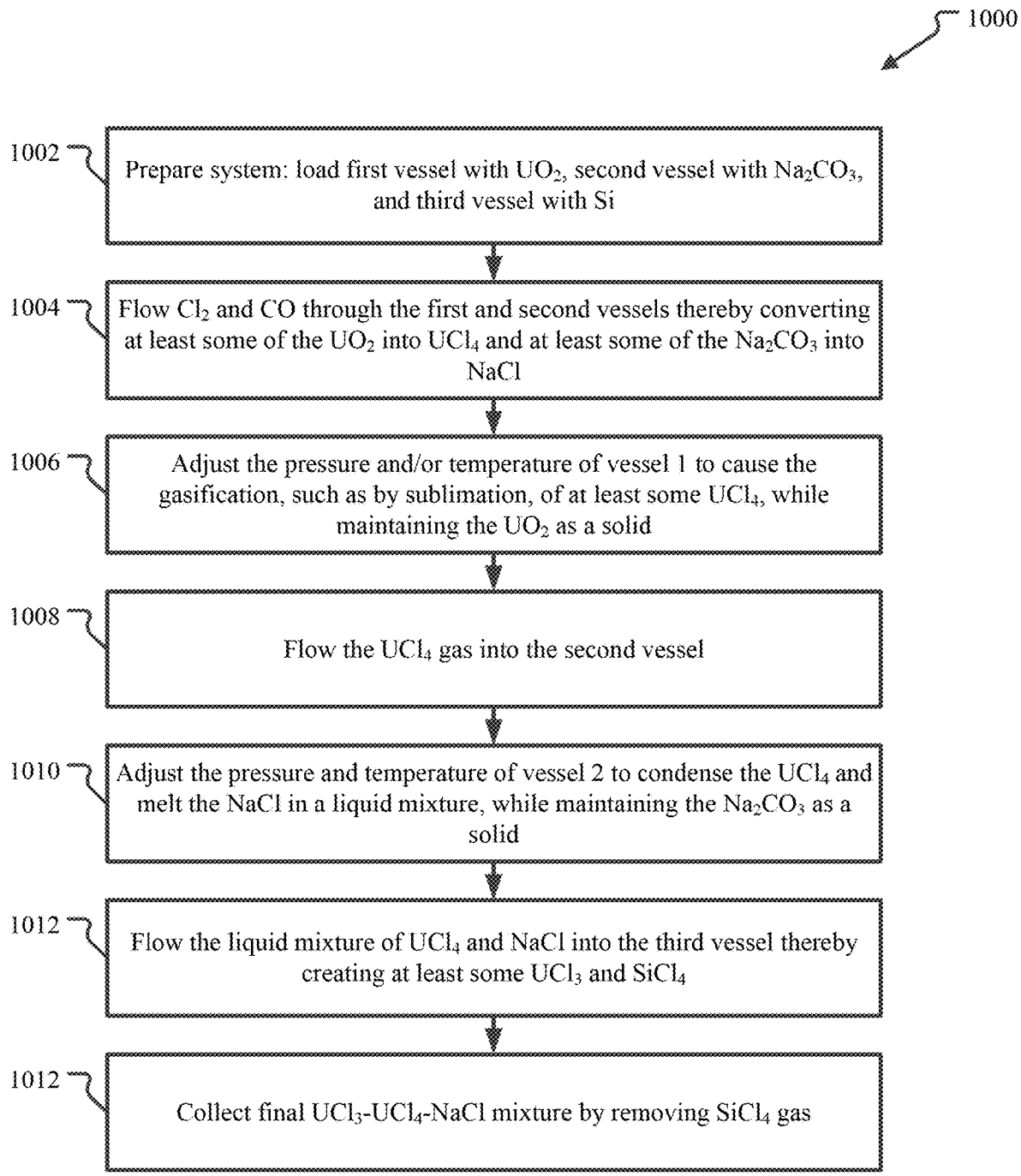
FIG. 10 illustrates an embodiment of a coordinated method of manufacturing a fuel salt containing $UCl_4$ based on the method of FIG. 9.

FIG. 10 illustrates an embodiment of a coordinated method of manufacturing a fuel salt containing $UCl_4$ based on the method of FIG. 9. In the coordinated method 1000, a first contacting vessel containing solid $UO_2$, a second contacting vessel containing solid $Na_2CO_3$ and a collection vessel containing element Si solid are provided in a system preparation operation 1002. This operation 1002 also includes providing the $Cl_2$ and CO as well as bringing all of the components of the system up to the appropriate operating conditions, e.g., from 200-550° C. and 1-5 atm. In an embodiment, the vessels may be prepared with an inert gas, such as argon, filing the gas space around the solid contents.

As discussed above, the $Cl_2$ gas may have a modified amount of $^{37}Cl$ (i.e., an amount different than the naturally occurring amount of 24% $^{37}Cl$) to change the neutron moderation and absorption of the Cl content in the final fuel salt. For example, in one embodiment the modified $Cl_2$ may have less than 23% $^{37}Cl$. In another embodiment, the $Cl_2$ gas may have greater than 25% $^{37}Cl$.

Figure 11:
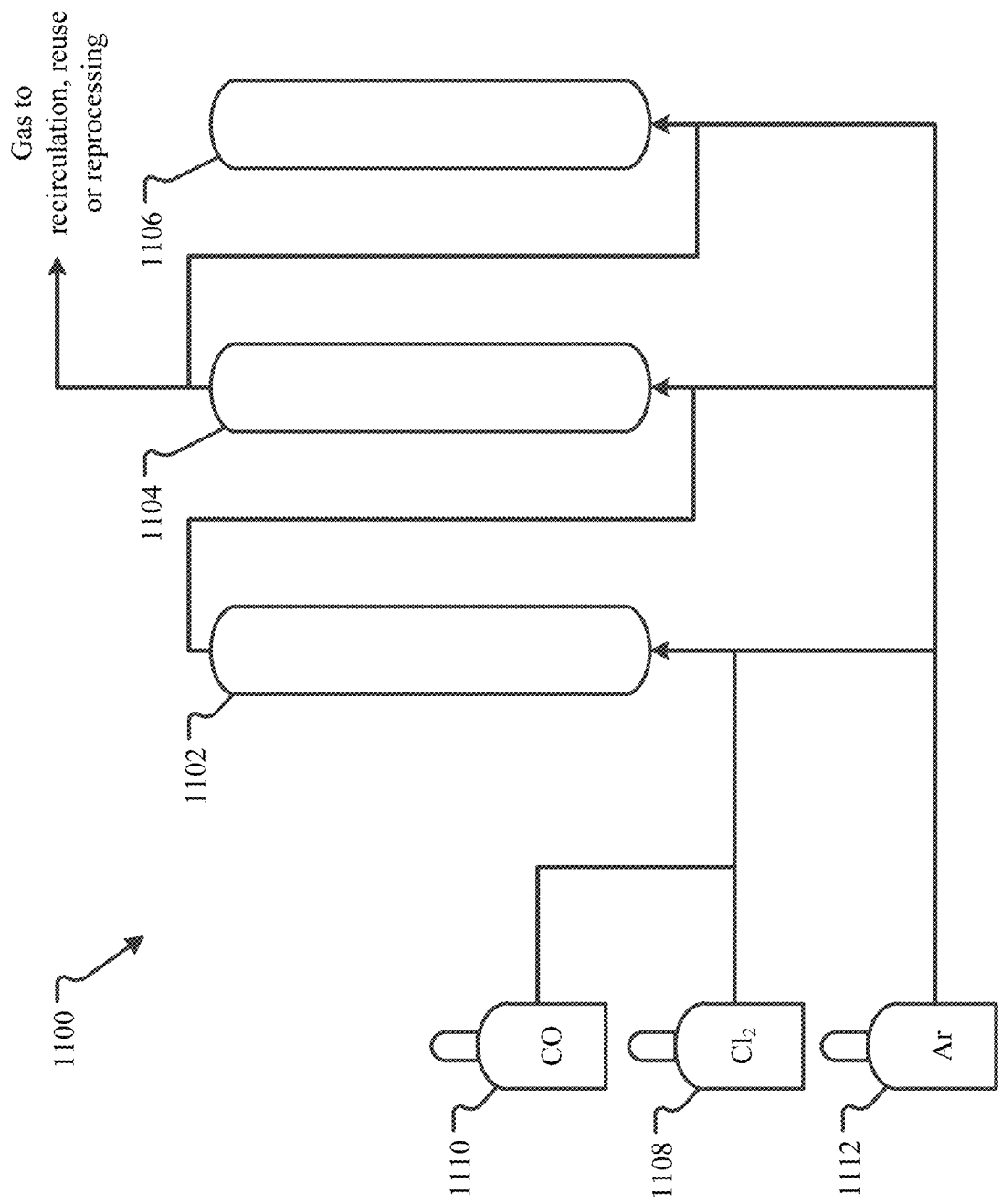
FIG. 11 illustrates a schematic of the contacting vessels and their connections suitable for use in performing the method of FIG. 10.

FIG. 11 illustrates a schematic of the contacting vessels and their connections suitable for use in performing the method of FIG. 10. FIG. 11 shows a first contacting vessel 1102 holding solid $UO_2$, a second contacting vessel 1104 with solid $Na_2CO_3$, and a collection vessel 1106 containing silicon (Si) metal solid. The vessels 1102, 1104, 1106 are connected such that gas can be flowed through the first vessel 1102 and then through the second vessel 1104. The collection vessel 1106 is further connected to the second vessel 1104 so that it can receive one or both of a gas or liquid from the second vessel 1104, such as via gravity or an induced pressure differential between the vessels 1104, 1106. In an alternative embodiment, the Si may be added to the second vessel 1104 or provided in an intermediate contacting vessel (not shown).

A $Cl_2$ source 1108, a CO source 1110 and an inert gas source 1112 are shown as gas cylinders, although any source may be used. In the embodiment shown, the CO and $Cl_2$ are connected only to the first vessel 1102, while the inert gas (illustrated as argon although any inert gas may be used) is connected to all three vessels so that the environment in each vessel may be independently controlled.

Ancillary components such as valves, filters, check valves, pressure and temperature sensors, flow monitors and flow controllers, heating and cooling equipment, pumps, and compressors are not illustrated, one of skill in the art who ready recognize how to implement these components to achieve the results described herein. Likewise, fittings and access ports, internal diffusion components and other elements may be used where needed and are not specifically identified on FIG. 11.

Returning now to FIG. 10, after the system has been prepared in the preparation operation 1002, the $Cl_2$ and CO are flowed through the first vessel 1102 and the second vessel 1104 of FIG. 11 in a reactant gas flowing operation 1004. This serves to contact the $UO_2$ and the $Na_2CO_3$ with the $Cl_2$ and CO so that $UCl_4$ and NaCl are created, respectively, in each vessel. The gases may be flowed through each vessel 1102, 1104 once (single pass) or recirculated for some amount of time. For example, in an embodiment the reactant gas flowing operation 1004 may be performed until all of the $UO_2$ has been converted into $UCl_4$, until all of the $Na_2CO_3$ or both. Alternatively, the reactant gas flowing operation 1004 may be performed only for a fixed period of time sufficient to produce as much or more $UCl_4$ and NaCl as currently necessary to create the final fuel salt.

After flowing gases through the two vessels 1102, 1104, the gases may be collected for reprocessing and reuse. In particular, if an enriched $Cl_2$ gas is used, it may be cost effective to recover as much of the Cl gas as possible. Alternatively, the gases could be treated and discharged to the environment, such as, for example, by passing the gases through a copper oxide scrubber which will reduce the CO.

The amount of $UCl_4$ and NaCl created will depend on the operating conditions and how long the gases are flowed through the vessels 1102, 1104. Thus, the operator can easily control the system 1100 to get a desired amount of each material. In addition, the relative size and shape of the vessels 1102, 1104 can be tuned so that a specific relative amount of NaCl is created for a given amount of $UCl_4$ from a single operation. This allows the system to be configured to create any desired $UCl_4$—NaCl fuel salt and, by extension as discussed in greater detail below with reference to operation 1012, any $UCl_3$—$UCl_4$—NaCl fuel salt.

In the system embodiment shown in FIG. 11, the vessels are connected in series and the gases flow first through the first vessel and then through the second vessel. In an alternative embodiment, the gases may be flowed independently through each vessel. This alternative embodiment allows different sources (and therefore enrichments) of $Cl_2$ to be used.

After flowing gases through the two vessels 1102, 1104, thereby creating at least some $UCl_4$ in the first vessel 1102 and NaCl in the second vessel 1104, a $UCl_4$ gasification operation 1006 is performed in which the temperature and/or pressure of the first vessel 1102 is adjusted such that the $UCl_4$ is converted from the solid phase to the gas phase. In an embodiment, the conversion is through sublimation and the $UCl_4$ does not go through a liquid phase. In an alternative embodiment, the temperature and pressure conditions are adjusted so that the $UCl_4$ is first converted into a liquid before it is boiled into a gas. In an embodiment, the gasification operation 1006 may maintain the sublimation conditions for a certain period of time selected so that most or all of the $UCl_4$ is converted to the gas phase.

In an embodiment the carbochlorination of uranium dioxide is run to completion. However, the extent of the reaction does not matter except for efficiency purposes. Any mixture of powdered uranium dioxide and uranium tetrachloride can be conveniently separated via uranium tetrachloride's high vapor pressure. Uranium tetrachloride has been found to sublimate at temperatures as low as 520° C. By heating up the uranium tetrachloride, for example in an embodiment to 520° C. (70° C. below its melting point), the $UCl_4$ should be slowly volatilized and easily removed from any unreacted $UO_2$. The $UCl_4$ gasification operation 1006 may be performed after flushing all or most of the reactant $Cl_2$ and CO gas from the first vessel 1102.

The gaseous $UCl_4$ is then transferred to the second vessel 1104 in a $UCl_4$ transfer operation 1008. This may be achieved through any conventional means. Because $UO_2$ has a higher melting point (2,865° C. at 1 atm) than $UCl_4$ has boiling point (791° C.), any $UO_2$ remains in the first vessel as a solid. However, filters or dropouts may be provided to prevent any particulate from being unintentionally removed from the first vessel 1102 during the gas transfer. In an embodiment, all or substantially all of the $UCl_4$ is transferred during this operation 1008. Alternatively, a known amount of $UCl_4$ may be transferred based on the desired amount and proportion of the final fuel salt desired. Real-time flow meters and gas analyzers may be used to verify or control the amount transfers, as is known in the art.

After the selected amount of UCl$_4$ gas has been transferred to the second vessel 1104, the environment of the second vessel 1104 is adjusted so that the UCl$_4$ gas is condensed and NaCl solid is melted, bringing both to a liquid state in a fuel salt melting operation 1010. In an embodiment in which the second vessel is maintained at a pressure of 1 atm, this environment corresponds to a temperature range of from 368° C. and 800° C. depending on the relative amounts of UCl$_4$ to NaCl (as shown on the lower axis of the ternary diagram of FIG. 4). As the melting point of Na$_2$CO$_3$ is 851° C. at 1 atm, the environment can be easily adjusted to a point where the UCl$_4$—NaCl mixture because liquid while the Na$_2$CO$_3$ is maintained in the solid state. In an embodiment, for example, the sodium chloride will be kept at 350° C., or 20° C. below the eutectic of UCl$_4$—NaCl.

After the fuel salt melting operation 1010, the some or all of the liquid UCl$_4$—NaCl is then transferred into the collection vessel 1106 in a UCl$_4$—NaCl transfer operation 1012. This may be achieved by any conventional means, such as pressurizing the second vessel 1104 with argon to displace the molten UCl$_4$—NaCl mixture and drive it into the collection vessel 1106. Alternatively, the liquid could simply be decanted using gravity into the collection vessel 1106. Again, care and special equipment may be utilized to prevent any remaining Na$_2$CO$_3$ from being removed from the second vessel 1104.

The system 1100 is further designed so that, upon entering the collection vessel 1106, the UCl$_4$ in the liquid will come into contact with the Si in the collection vessel 1106. In an embodiment, the conditions will be controlled so that the Si reaction has the effect, described above, of stoichiometrically reacting with the UCl$_4$ to form SiCl$_4$ and UCl$_3$. The collection vessel is maintained at an operating condition so that the UCl$_3$ remains a liquid, while the SiCl$_4$ is boiled off into a gas that can be easily removed. Therefore, by controlling the amount of Si in the collection vessel 1106, the amount of resulting UCl$_3$ can be controlled.

Because the system 1100 allows for easy control of the relative amounts of UCl$_4$ and NaCl that ultimately are transferred into the collection vessel 1106, and the amount of UCl$_4$ converted into UCl$_3$ can also be easily controlled, any desired UCl$_3$—UCl$_4$—NaCl mixture can be made using the system 1100 and the method 1000.

After the UCl$_4$—NaCl transfer operation 1112, a final collection operation 1012 may be performed. In this operation 1012, the SiCl$_4$ may be removed and replaced with an inert gas. The fuel salt may be solidified for easy transportation within the collection vessel 1106 or may be transferred into another container (in a liquid, solid or gaseous state) for storage or transportation.

The kinetics of the reactions in the vessels 1102, 1104, 1106 will depend on the form of the solid UO$_2$ and solid Na$_2$CO$_3$ used, e.g., powder, particulate, porous matrix, block, etc., and the flow, temperature and pressure conditions of the gases, as well as the internal configuration of the contacting vessels, e.g., they are configured to enhance contact with the flowing gases through the use of internal baffles, diffusers or other components. While any solid form of UO$_2$ and Na$_2$CO$_3$ can be used, high surface area forms will enhance the kinetics of the reaction and be generally more efficient. Likewise, while any type of vessel, now known or later developed, may be used, contacting vessel designs specifically adapted to enhance solid-gas and liquid-gas contacting will be more efficient than simpler designs. In addition, active components such as mixers or agitators may be used in any or all vessels to enhance contacting, gasification or mixing during any of the operations of FIG. 9 or 10.

While various embodiments of the UCl$_3$—UCl$_4$—NaCl fuel salt generation system 1100 and methods 900, 1000 have been described for purposes of this disclosure, various changes and modifications may be made which are well within the scope of the technology described herein. For example, one of skill in the art will recognize that many minor alterations to the system 1100 or methods 900, 1000 may be made while still achieving the same control over the final fuel salt mixture and final product. For example, solid silicon could be introduced into the second vessel 1104 or the solid silicon could be kept in a flow-through chamber (not shown) between the second vessel 1104 and the collection vessel 1106. Likewise, the first and second vessels could be operated independently, instead of serially, and the UCl$_4$ gas and NaCl liquid could be separately transferred into the collection vessel 1106. Numerous other changes may be made which will readily suggest themselves to those skilled in the art and which are encompassed in the spirit of the disclosure and as defined in the appended claims.

In addition, the methods of FIG. 9 or 10 may be further adapted if a UCl$_3$—NaCl binary mixture is desired. In this embodiment, the entire UCl$_4$—NaCl mixture can be sparged with hydrogen for extended periods of time initiating the reaction:

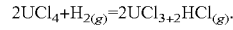

$$2UCl_4 + H_{2(g)} = 2UCl_3 + 2HCl_{(g)}.$$

By providing the excess H$_2$, all of the UCl$_4$ may be converted to UCl$_3$.

Synthesis of UCl$_4$ from UO$_2$ Using Ammonium Chloride

Figure 16:
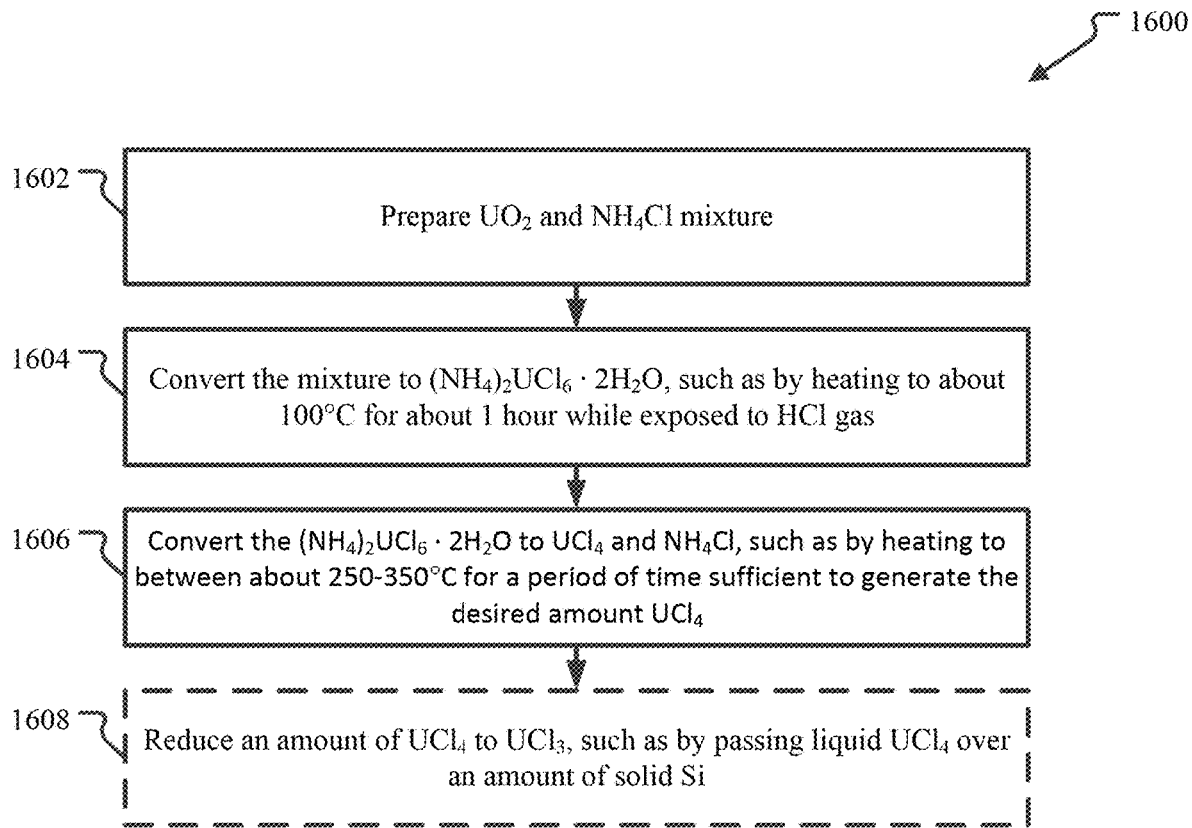
FIG. 16 illustrates an embodiment of a method for the manufacture of $UCl_4$ using ammonium chloride. In the embodiment of the method shown, a mixture of solid $UO_2$ and $NH_4Cl$ is created in a uranium preparation operation.

FIG. 16 illustrates an embodiment of a method for the manufacture of UCl$_4$ using ammonium chloride. In the embodiment of the method 1600 shown, a mixture of solid UO$_2$ and NH$_4$Cl is created in a uranium preparation operation 1602. The solid mixture may be created using any conventional means such as grinding, crushing, or cutting with any suitable equipment such as a ball mill, rod mill, autogenous mill, SAG mill, pebble mill, roll grinder, stamp mill, etc.

A first conversion operation 1604 is then performed, in which the solid mixture is exposed to HCl under the conditions appropriate to generate (NH$_4$)$_2$UCl$_6$ by the reaction:

$$UO_2(s) + 2NH_4Cl(s) + 4HCl(g) = (NH_4)_2UCl_6 \cdot 2H_2O$$

In an embodiment, the conversion operation 1604 includes heating the solid mixture while exposing the mixture to the HCl gas in an enclosed environment to 100° C. at 1 atm and maintaining the temperature until sufficient conversion is obtained. Depending on the embodiment, the temperature may be maintained for at least one hour. However, for full conversion additional time may be desirable, such as maintaining the temperature for two, three, four or more hours. Depending on the concentration of HCl used, the temperature may be maintained just below the boiling point of aqueous HCl and allows the HCl gas environment to be maintained by providing a pool of aqueous HCl in the enclosed environment.

Alternative methods for achieving the conversion to (NH$_4$)$_2$UCl$_6$ are also possible, such as passing HCl gas at a higher temperature through a kiln, moving bed, cyclone, fluidized bed reactor, or any other gas-solid contacting technologies. Fuming HCl (aqueous HCl at greater than 40% concentration) may also be used to generate HCl gas. In yet another embodiment, the mixture may be contacted with aqueous HCl in liquid, rather than gaseous, form under conditions that result in the $(NH_4)_2UCl_6$.

Yet another embodiment involves creating HCl gas for the first conversion operation 1604 by using calcium chloride ($CaCl_2$) and aqueous HCl. In this embodiment, HCl gas is generated via the following reaction:

$$CaCl_2(s, anhydrous) + HCl(aq) = CaCl_2 \cdot 2H_2O(s) + HCl(g)$$

In this embodiment, the first conversion operation 1604 includes providing anhydrous $CaCl_2$ pellets in the reaction environment and contacting the anhydrous $CaCl_2$) with aqueous HCl. In an embodiment the contacting may be done by placing the $CaCl_2$ pellets in a pool of HCl. In the first conversion operation 1604, a reactor vessel may be provided that can separately hold both the mixture and the pool of HCl with $CaCl_2$ pellets so that only the HCl gas can contact the mixture. In an alternative embodiment, the liquid HCl may be circulated or flowed over a solid form $CaCl_2$. Regardless of how the contacting is performed, as the water is removed from the aqueous HCl to hydrate the $CaCl_2$, the concentration of the HCl in the liquid increases until HCl gas is released into the environment. This method for generating HCl gas can use a safer and more easily handled aqueous HCl concentration as the input and may be preferred over using other sources of HCl gas. This method for making HCl may be adapted for use with any of the methods described herein.

Furthermore, aqueous HCl and $NH_4Cl$ having a modified amount of $^{37}Cl$ isotope as the anion may be used to generate chloride fuel salts from the method 1600. As mentioned above, separation and collection of the $^{37}Cl$ isotope is possible by several methods. This $^{37}Cl$ can then be used to generate hydrogen chloride which, when combined with water, will generate modified aqueous HCl. There are many known methods for making hydrogen chloride and any suitable method maybe used, including combining $Cl_2$ gas with $H_2$ gas and reacting NaCl with $H_2SO_4$. Likewise, modified $NH_4Cl$ may also be generated using a source of $^{37}Cl$ from any known method. The amount of modification of either of both the HCl and the $NH_4Cl$ may be controlled to achieve any desired ratio of $^{37}Cl$ to total Cl in the final fuel salt, such as a final salt having a ratio of $^{37}Cl$ to total Cl in the fuel salt of greater than 25%.

After the first conversion operation 1604, a second conversion 1606 operation is performed in which the $(NH_4)_2UCl_6$ is maintained under the appropriate conditions to convert it into $UCl_4$ by the reaction:

$$(NH_4)_2UCl_6 = UCl_4 + 2NH_4Cl$$

In an embodiment, the second conversion 1606 includes removing the $(NH_4)_2UCl_6 \cdot 2H_2O$ from the HCl environment, heating it to a temperature sufficient for the conversion until the desired amount of the $(NH_4)_2UCl_6$ has been converted to $UCl_4$. Conversion is expected above 200° C., but higher temperatures may speed the reaction. In an embodiment, the $(NH_4)_2UCl_6 \cdot 2H_2O$ may be heated to any temperature above 200° C. but below a temperature that melts the $(NH_4)_2UCl_6$ or $UCl_4$, such as from 200-500° C., from 250-350° C. or 400° C. Alternative embodiments are also possible, including embodiments that heat the $(NH_4)_2UCl_6$ to temperatures that cause the generated $UCl_4$ to melt during the conversion operation 1606.

The embodiment of the method 1600 shown is suitable for producing $UCl_4$ product in bulk. Furthermore, since $UCl_3$ can be easily obtained from $UCl_4$ via reduction, such as described above, the method 1600 can be easily used to create bulk quantities of $UCl_3$ also, simply by adding an optional reduction operation 1608, as shown in FIG. 16.

An embodiment of method 1600 was performed to verify the method. In the experiment, 2 grams of $UO_2$ and 0.44 grams of $NH_4Cl$ (i.e., 10% excess $NH_4Cl$) were ground together and placed in a reactor with aqueous HCl so that the environment had excess HCl gas. The reactor was heated to 100° C. and maintained at that temperature for four (4) hours. The resulting product was then removed and placed in a decomposition tube under vacuum and heated from 80 to 400° C. The creation of $UCl_4$ was verified through x-ray diffraction.

In the experiment, the HCl gas was produced using the $CaCl_2$ method. The mixture of $UO_2$ and $NH_4Cl$ was placed in an open-topped glass vessel and the vessel placed within the reactor. A pool of aqueous HCl was provided in the bottom of the reactor and pellets of $CaCl_2$ were placed in contact with the aqueous HCl. An excess of HCl gas was produced by the hydration of the $CaCl_2$ and this gas reacted with the solid mixture in the vessel.

Uranium Chloride-Fluoride Fuel Manufacturing Processes

Figure 17:
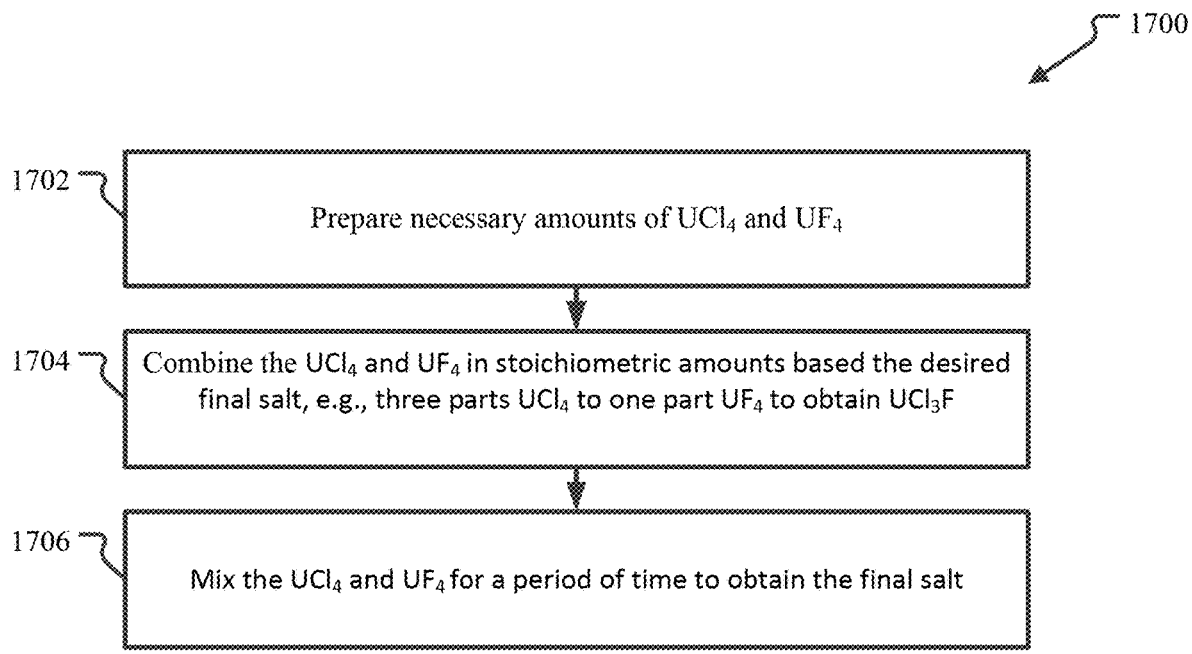
FIG. 17 illustrates an embodiment of method for manufacturing $UCl_3F$.

FIG. 17 illustrates an embodiment of a method for manufacturing $UCl_3F$. The method 1700 is based on the following reaction:

$$3UCl_4 + UF_4 = 4UCl_3F$$

In the embodiment shown, the method 1700 starts with preparing amounts of $UCl_4$ and $UF_4$ in a precursor preparation operation 1702. The $UCl_4$ and $UF_4$ may be prepared by any methods described herein or known in the art.

Solid $UCl_4$ and $UF_4$ are then combined in stoichiometric amounts in a combining operation 1704. In the embodiment shown, three parts $UCl_4$ and one part $UF_4$ are combined. The combining operation 1704 may be done in a mixer (e.g., a ball mill) in anticipation for the mixing operation 1706, discussed next, or may be done an intermediate vessel prior to transfer to a mixer.

The combined $UCl_4$ and $UF_4$ is then mixed for a period of time to obtain a solid $UCl_3F$ mixture in a mixing operation 1706. The mixing operation 1706 may use any conventional solid mixing means such as grinding, crushing, or cutting with any suitable equipment such as a ball mill, rod mill, autogenous mill, SAG mill, pebble mill, roll grinder, stamp mill, etc. The mixing may or may not be performed at an elevated temperature or pressure. The time period of mixing may be a fixed time, based on the mixing conditions (e.g., at a high temperature), selected from 15 minutes to 5 days, such as, for example, a quarter of an hour, half an hour, three-quarters of an hour, an hour, two hours, four hours, six hours, eight hours, 12 hours or 24 hours. Alternatively, mixing may be performed for a time period sufficient for completion of the reaction, which time period is determined based on real-time or prior testing.

In an alternative embodiment, the mixing operation 1706 may be performed with one or both uranium salts in a molten state, instead of a solid state. In yet another embodiment, the mixing operation may be performed in the reactor core of a reactor, such that the $UCl_3F$ salt is created within the reactor core.

Any and all of the operations 1702-1706 may further be performed in an oxygen free environment, such as by mixing under argon or some other inert gas.

An experiment was performed to validate the method 1700. As performed, 700 mg of $UCl_4$ was mixed with 193 mg of $UF_4$ in a ball mill for one hour under argon. After the one hour mixing time x-ray diffraction analysis of the precursors prior to mixing and the product of the experiment indicated that none of the precursor $UCl_4$ or $UF_4$ was present in the final product. Based on this, it is presumed that the reaction went to completion and the final product was $UCl_3F$.

Note that the method 1700 can be adapted to produce $UCl_2F_2$ and $UClF_3$ by varying the stoichiometric amounts of the precursor salts. As discussed above, these salts may also have suitable properties for use as nuclear fuel, or as a constituent of a nuclear fuel salt, in a molten salt reactor.

Figure 18:
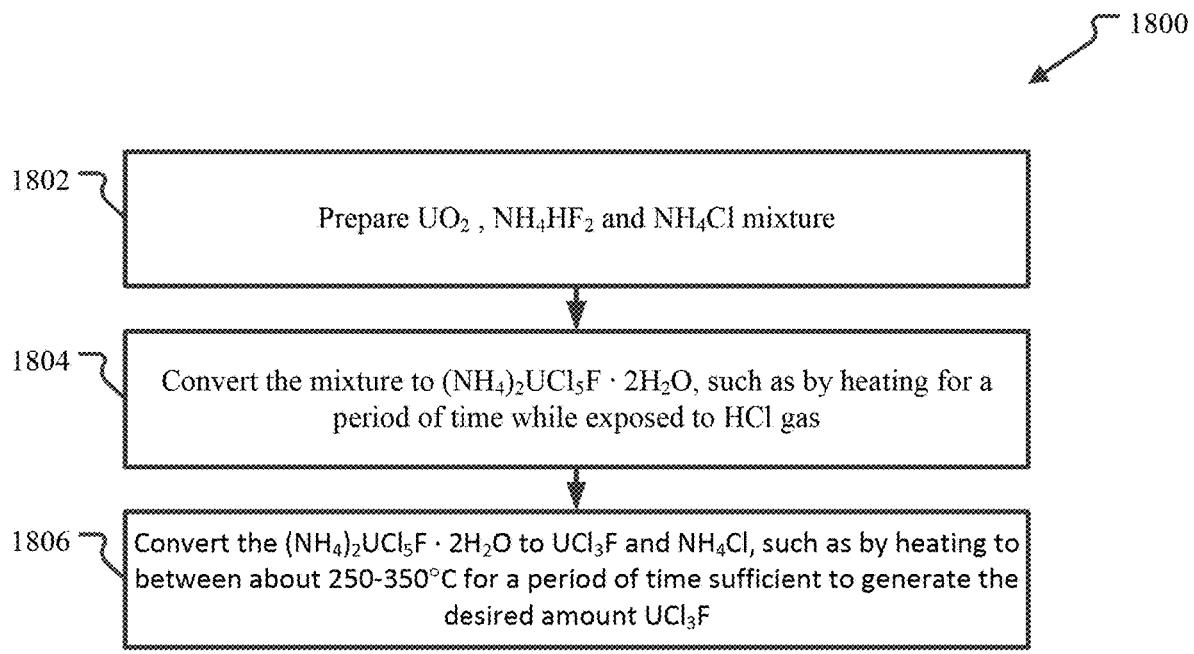
FIG. 18 illustrates an embodiment of another method for manufacturing $UCl_3F$.

FIG. 18 illustrates an embodiment of another method for manufacturing $UCl_3F$. This method 1800 generates $UCl_3F$ from $UO_2$ based on the following reactions:

$$2UO_2(s)+3NH_4Cl(s)+NH_4HF_2(s)+7HCl(g)= 2[NH_4]_2UCl_5F \cdot 2H_2O(s)$$

$$[NH_4]_2UCl_5F \cdot 2H_2O(s)=2NH_4Cl+UCl_3F+2H_2O$$

This reaction is similar to that described with reference to FIG. 16.

In the embodiment of the method 1800 shown, a mixture of solid $UO_2$, $NH_4Cl$, and $NH_4HF_2$ is created in a precursor preparation operation 1802. The solid mixture may be created using any conventional means such as grinding, crushing, or cutting with any suitable equipment such as a ball mill, rod mill, autogenous mill, SAG mill, pebble mill, roll grinder, stamp mill, etc.

A first conversion operation 1804 is then performed, in which the solid mixture is exposed to HCl under the conditions appropriate to generate $(NH_4)_2UCl_5F$ by the reaction:

$$2UO_2(s)+3NH_4Cl(s)+NH_4HF_2(s)+7HCl(g)= 2[NH_4]_2UCl_5F \cdot 2H_2O(s)$$

In an embodiment, the first conversion operation 1804 includes heating the solid mixture while exposing the mixture to an excess of HCl gas in an enclosed environment to 100° C. at 1 atm and maintaining the temperature until sufficient conversion is obtained. Depending on the embodiment, the temperature may be maintained for at least one hour. However, for full conversion additional time may be desirable, such as maintaining the temperature for two, three, four or more hours. Depending on the concentration of HCl used, the temperature may be maintained just below the boiling point of aqueous HCl and allows the HCl gas environment to be maintained by providing a pool of aqueous HCl in the enclosed environment.

Alternative methods for achieving the conversion to $(NH_4)_2UCl_5F$ are also possible, such as passing HCl gas at a higher temperature through a kiln, moving bed, cyclone, fluidized bed reactor, or any other gas-solid contacting technologies. Fuming HCl (aqueous HCl at greater than 40% concentration) may also be used to generate HCl gas. In yet another embodiment, HCl gas for the first conversion operation 1804 may be created using calcium chloride ($CaCl_2$) and aqueous HCl as has been previously described with reference to FIG. 16.

After the first conversion operation 1804, a second conversion 1806 operation is performed in which the $(NH_4)_2UCl_5F$ is maintained under the appropriate conditions to convert it into $UCl_3F$ by the reaction:

$$[NH_4]_2UCl_5F \cdot 2H_2O(s)=2NH_4Cl+UCl_3F+2H_2O$$

In an embodiment, the second conversion 1806 includes removing the $(NH_4)_2UCl_5F \cdot 2H_2O$ from the HCl environment, heating it to a temperature sufficient for the conversion until the desired amount of the $(NH_4)_2UCl_5F$ has been converted to $UCl_3F$. Conversion is expected above 200° C., but higher temperatures may speed the reaction. In an embodiment, the $(NH_4)_2UCl_5F \cdot 2H_2O$ may be heated to any temperature above 200° C. but below a temperature that melts the $(NH_4)_2UCl_5F$ or $UCl_3F$, such as from 200-500° C., from 250-350° C. or 400° C. Alternative embodiments are also possible, including embodiments that heat the $(NH_4)_2UCl_5F$ to temperatures that cause the generated $UCl_3F$ to melt during the second conversion operation 1806.

The method 1800 may also be used to generate modified $^{37}Cl$ salts by using aqueous HCl and $NH_4Cl$ having a modified amount of $^{37}Cl$ isotope as the anion, as has been discussed elsewhere. The amount of modification of either of both the HCl and the $NH_4Cl$ may be controlled to achieve any desired ratio of $^{37}Cl$ to total Cl in the final fuel salt, such as a final salt having a ratio of $^{37}Cl$ to total Cl in the fuel salt of greater than 25%.

Fuel Salt Examples

Various fuel salt embodiments were manufactured in the laboratory and tested to confirm the ternary phase diagram of FIG. 4.

A number of $UCl_3$ batches were prepared. One batch, which was typical of the preparations, was prepared as follows. A 1.895 g sample of uranium metal was washed with hexanes and treated with nitric acid to remove oxides. The uranium metal was placed in a quartz crucible, loaded into a tube furnace and held at 250° C. for 30 minutes under flowing $H_2$, producing $UH_3$. The $UH_3$ was observed as a higher surface area product, morphologically different than the uranium metal starting material. The furnace temperature was increased to 350° C., the flowing gas switched to HCl, and held at temperature for 90 minutes, producing $UCl_3$. The atmosphere was changed to $H_2$ and the furnace brought to room temperature. The tube furnace was held under $H_2$ atmosphere and transferred to an Ar glovebox. The $UCl_3$ was characterized by x-ray diffraction, with a total recovered mass of 2.47 g.

A number of $UCl_4$ batches were also prepared. One batch, which was typical of the preparations, was prepared as follows. A 1.50 g sample of $UO_3$ was added to a Schlenk flask and charged with Ar. Hexachloropropene was added under inert conditions in 10 times molar excess. The flask temperature was increased to 75° C. and held for 30 minutes. The temperature was increased to reflux around 165° C. and held for 3 hours. The product was brought to room temperature and washed with carbon tetrachloride, toluene, and hexane. After the hexane wash the product was dried and identified as $UCl_4$ by x-ray diffraction. The procedure yielded 1.9 g of $UCl_4$.

The binary and ternary mixtures were created by melting appropriate amounts of the constituent compounds in a Mo crucible at 650° C. for 2 hours under an Ar atmosphere. A sample of 66NaCl-34$UCl_3$ was prepared and characterized in the same manner using 3.761 g $UCl_3$ and 1.239 g NaCl. A typical batch for the 71$UCl_4$-17$UCl_3$-12NaCl contained 0.6188 g of $UCl_4$, 0.1331 g of $UCl_3$ and 0.0158 g of NaCl. The three components were added to a Mo crucible and treated as described above. The mixed salt products were analyzed by differential scanning calorimetry.

An embodiment of $UCl_3F$ was created using the synthesis reaction between $UCl_4$ and $UF_4$ as described above. In that experiment, 700 mg of $UCl_4$ was mixed with 193 mg of $UF_4$ in a ball mill for one hour under argon. After the one hour mixing time x-ray diffraction analysis of the precursors prior to mixing and the product of the experiment indicated that none of the precursor $UCl_4$ or $UF_4$ was present in the final product. Based on this, it is presumed that the reaction went to completion and the final product was $UCl_3F$.

The following fuel salts were created and their melting points determined as shown in Table 4.

TABLE 4

Fuel Salt Embodiments

| Fuel Salt | Melting Point (° C.) |
|---|---|
| 71UCl$_4$—17UCl$_3$—12NaCl | 491-512 |
| 66NaCl—34UCl$_3$ | 508 |
| 17UCl$_3$—40.5UCl$_4$—42.5NaCl | 351 |
| 47UCl$_4$—53NaCl | 343 |
| UCl$_3$F | NA |

Fuel Modification to Reduce Corrosion

Management of molten salt corrosion may dictate the use of advanced materials, such as nickel and molybdenum alloys, for fuel salt-facing components, such as reflectors, PHX and vessel. In some embodiments, because of the design and operating conditions of suitable reactors components may only need to be clad or coated using these advanced materials, while the bulk of such components can be constructed from more traditional materials such as stainless steels and other materials with existing ASME code cases. Additionally, if components will be replaced on a regular basis, it is not necessary to provide exceptional clad performance or to demonstrate perfect coatings.

In an embodiment, a compatible corrosion resistant cladding (CRC) will be utilized in conjunction with ASME Code compliant base material on all fuel salt-facing surfaces. ASME Section III, Division V "High Temperature Reactors" permits the use of CRC. Careful selection of materials, joining processes, and non-destructive examination allows for the construction of a robust composite metallic reactor enclosure with multiple layers of defense against corrosion, radiation damage, and high temperature service. In the embodiment, the CRC is the first barrier against uncontrolled release of radionuclides. It is comprised of corrosion resistant cladding on pressure vessel plate, piping, primary heat exchanger tubing and tube sheets and is designed for positive pressure.

In an embodiment, the fuel salt is adapted to prevent or reduce corrosion by providing one or more chloride salts that correspond to the salts that would have been created through corrosion. By providing such a salt as one of the (or the only) additional, non-fissile chloride salt, this will reduce or prevent the corrosion of the salt-facing mechanical components.

Figure 12:
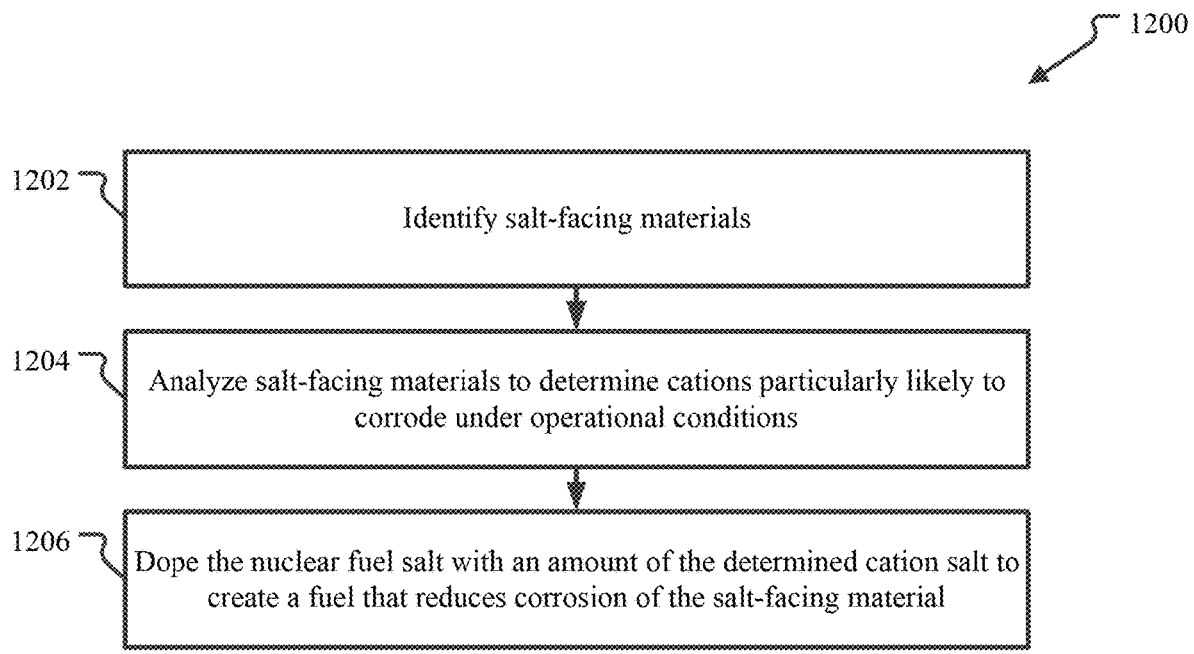
FIG. 12 illustrates an embodiment of a method of reducing corrosion in a nuclear reactor using a molten nuclear fuel.

FIG. 12 illustrates an embodiment of a method of reducing corrosion in a nuclear reactor using a molten nuclear fuel. The method 1200 is suitable for any fuel salt anion including Cl, F, or combinations such as Cl$_3$F, Cl$_2$F, Cl$_2$F$_2$, etc. In the embodiment shown, the method 1200 starts with an identification operation 1202 that determines what material or materials will be salt-facing in the reactor. For example, as discussed above it is anticipated that nickel and molybdenum alloys may be used for various salt-facing components.

The identification operation 1202 is then followed by a determination of the cation or cations in the identified material that is most likely to corrode in an analysis operation 1204. The analysis operation 1204 may be a purely theoretical analysis, for example, based on a comparison of the relative free energies of salt formation for each of the elements in the material. Alternatively or in addition, the analysis operation 1204 may include corrosion testing using different representative salts in order to experimentally identify the likely corrosion chemistry.

After the cation or cations subject to salt corrosion have been determined, a fuel salt may be generated specifically for that reactor that includes in the nuclear fuel salt a corrosion inhibiting salt consisting of the salt anion (e.g., chloride in a MCFR) and the material cation (e.g., Mo, if the analysis operation 1204 determines Mo corrosion is an issue with that particular alloy). The amount of the corrosion inhibiting salt may be determined experimentally or may be selected based on the amount of salt necessary to eliminate the corrosion reaction by bringing amount of the corrosion inhibiting salt in the fuel salt to the amount necessary to achieve equilibrium under the reactor's operational conditions (pressure, temperature, etc.). Alternatively, the maximum amount of the corrosion inhibiting salt in the nuclear fuel that can be solubilized in the nuclear fuel.

For example, in an embodiment of the method 1200 it may be determined in the analysis operation 1204 that Cr corrosion will likely occur. In response, a corrosion resistant fuel may be created that includes at least some CrCl$_2$.

FIG. 13 lists some alloys of potential applicability. The figure lists the alloy, the major element or elements (>1% by mass) of each alloy, and the minor elements (<1% by mass) of each alloy.

Experiments were performed on some of the alloys in FIG. 13 using both 71UCl$_4$-17UCl$_3$-12NaCl and 66NaCl-34UCl$_3$ fuel salt embodiments under representative conditions. The alloys tested included 316SS stainless steel. In these experiments, a coupon of alloy was inserted into a volume of the fuel salt and the conditions were maintained at 650° C. for 100 hours. The coupons were then inspected using energy dispersive spectroscopy. Inspection of the stainless steel showed significant depletion of the chromium and measurable depletion of the Fe from the alloy coupon. This validated the results of theoretical analysis based on the relative free energies of the cations in the alloy (see below) that indicated that Cr would be more corroded by Cl salt, Fe relatively less, and Ni and Mo even less.

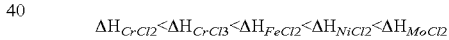

$\Delta H_{CrCl2} < \Delta H_{CrCl3} < \Delta H_{FeCl2} < \Delta H_{NiCl2} < \Delta H_{MoCl2}$ In response to this analysis, a corrosion inhibiting salt could include one or more of CrCl$_2$, CrCl$_3$ and FeCl$_3$ for the 316SS alloy. Some or all of these corrosion inhibiting salts could be added to a chloride fuel salt to reduce or eliminate the corrosion of this alloy.

Fuel Monitoring

During operation, the fuel salt in a molten salt reactor may be monitored. This monitoring may be done in order to determine when sufficient breeding has occurred so that some of the fuel may be removed and replaced with new fuel in order to keep the reactivity down. Such monitoring may take many forms but includes monitoring at least one concentration of a molecule in the molten salt that is indicative of the overall quality of the salt. In response to the results of the monitoring, e.g., a result indicating sufficient breeding has occurred, some action may be taken such as changing an operational parameter or replacing some fuel salt with new fuel salt.

Monitoring may be performed using any type of suitable speciation method or equipment including spectroscopic methods or tools, now known or later developed. For example, in an embodiment, the monitoring is performed in real-time using Raman spectroscopy, or laser ablation methods. Raman spectroscopy provides information from molecular vibrations that can be used for sample identification and quantitation. The technique involves shining a monochromatic light source (i.e. laser) on a sample and detecting the scattered light. Some amount of fuel may be removed from the reactor core, such as in a side stream, and passed through a monitoring cell that includes a 'window' through with the spectroscopy can be performed. Examples of Raman windows materials are fused quartz, fused silica, sapphire, diamond, and some glasses. Laser ablation methods excited the compound to high energy states. The excited material can be evaluated with a mass spectrometer or optically to determine element composition and possibly molecular species. Any material may be used as long as it can meet the operational parameters of the reactor and monitoring system. In some embodiments, the removed fuel from the core for monitoring may be all of or a portion of a side stream of fuel removed for fuel polishing/processing as described further below, a side stream for control purposes to be replaced with fertile fuel, and/or a side stream off of the primary coolant loop 110 described above with respect to FIG. 1A.

Other sampling configurations than a side-stream sampling configuration may also be used. For example, in an embodiment a window may be provided somewhere in the reactor core, through which the speciation equipment (e.g., Raman spectrograph or ablation system) may transmit light to the fuel, or the headspace, if any, above the fuel. Alternatively, the speciation equipment may be a remote instrument that is wirelessly- or wire-connected to a monitoring system outside of the reactor and that is capable of being inserted into the fuel salt or a fuel salt stream, such as through a wall of the reactor core or piping. In another embodiment, the spectrograph may be included within a heat exchanger apparatus or other component physically within the reactor core in order to sample fuel salt directly. In yet another embodiment, the spectrograph or ablation system may be an ancillary component 127 as described with reference to FIG. 1A.

In yet another embodiment that is not real-time, samples may be periodically removed from the reactor core and analyzed. Such samples may then be returned or collected for later use. For example, in an embodiment some amount of fuel salt is replaced in an operating MCFR on a schedule and the removed fuel salt is analyzed by laser ablation, optical methods, or with a Raman probe. The results of this analysis are then used to modify one or more parameters such as to modify the schedule for replacing fuel salt. Examples of other operation parameters that may be adjusted include reactor core temperature, fuel salt replacement quality, a position of a displacement element, a reactivity of the fuel salt, and a feed rate of an additive to the reactor core.

Figure 14:
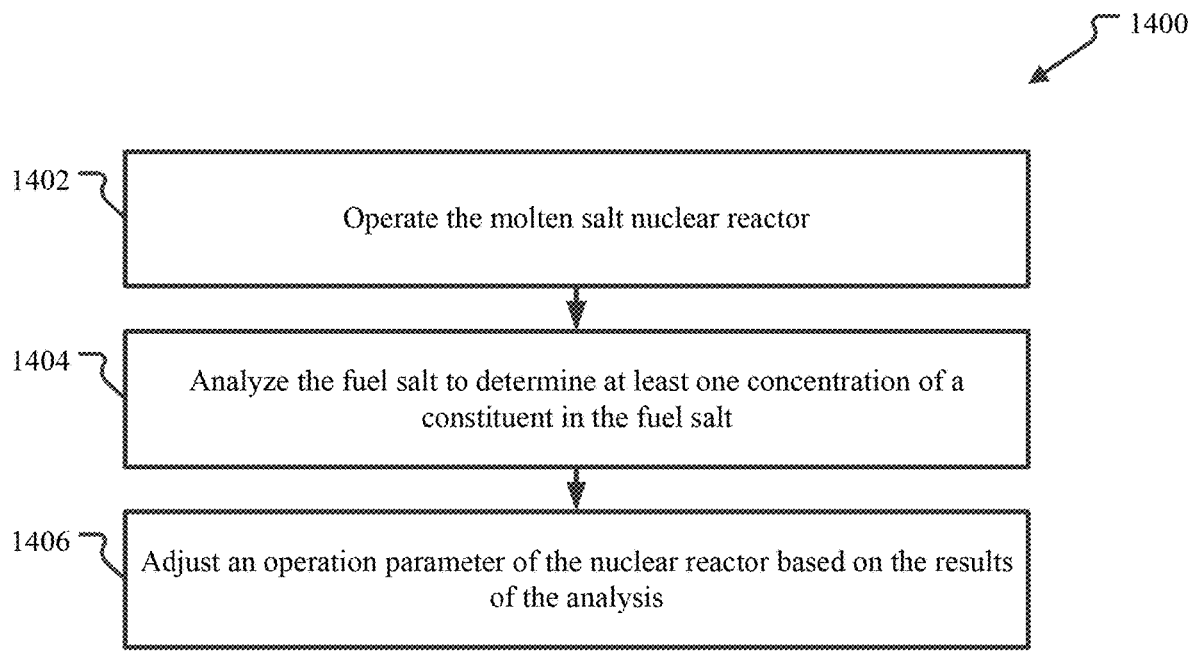
FIG. 14 illustrates a method of operating a molten salt nuclear reactor.

FIG. 14 illustrates a method of operating a molten salt nuclear reactor. In the embodiment shown, the method 1400 starts with maintaining breed-and-burn behavior in molten salt in a reactor core of the nuclear reactor in operation 1402.

During operation, at least some of the molten salt is analyzed in a real-time analysis operation 1404. In an embodiment, the analysis is done using speciation methods such as a Raman spectroscopy or laser ablation methods to determine at least one concentration of a molecule in the molten salt. Alternatively, the speciation may be done to determine most if not all of the molecules in the fuel and their relative amounts allowing for a complete or near-complete chemical makeup of the fuel salt at that location to be known. In yet another embodiment, radiation detectors such as gamma detectors may be used to monitor the energy or activity of the molten salt, and determinations of the partial or complete chemical makeup of the fuel salt at that location may be made based on the salt makeup and measurements.

Based on the resulting knowledge of the chemical makeup of the fuel salt, an adjustment operation 1406 may be performed if the chemical makeup or a particular concentration exceeds some predetermined threshold. The adjustment may include adjusting one or more operational parameter of the nuclear reactor or performing specific tasks such as fuel replacement.

Raman spectroscopy is but one of the speciation techniques that could be used to monitor fuel salt quality and/or other safety or design considerations, e.g., accumulation of fission products, viscosity, etc. Other techniques include absorbance spectroscopy, laser ablation spectroscopy, laser induced breakdown spectroscopy, infrared (IR) spectroscopy, and electrochemistry to determine the relative concentrations of different salt constituents (e.g., $UCl_3$, $UCl_4$ and $NaCl$). As discussed above, any technique, now known or later developed, may be used for monitoring.

Freeze Plugs

Another aspect of molten fuel salt reactors includes the possible use of frozen material plugs for different purposes. A frozen material plug, referred to herein as a freeze plug, is a volume of material that at intended operational conditions is solid, non-reactive with the fuel salt, and has a sufficiently strong solid structure that it can be used to prevent the movement of fuel salt within the reactor but that also, upon reaching a desired activation temperature, melts to allow mixing with and movement of the fuel salt.

Freeze plugs may be used for many different purposes and, in some embodiments, for multiple purposes at one time. For example, in a simple embodiment a freeze plug may be used to prevent fuel salt from flowing out of the reactor core into a dump tank when at operational temperatures, but that melts if the reactor core temperature exceeds that plug's activation temperature, thereby allowing the fuel salt to exit into the dump tank. This may be achieved by locating the dump tank below the reactor core so that the fuel salt can flow by gravity or by maintaining the reactor core and the dump tank at different pressures so that, upon melting of the freeze plug, molten fuel salt flows under pressure into the dump tank.

In some cases, the freeze plugs may be detectable within the fuel upon melting. For example, the freeze plug may be made of some material that is a neutron poison so that if the reactor core exceeds the activation temperature the poison material melts and is subsequently distributed throughout the reactor core reducing reactivity. In this embodiment, the freeze plug is the neutron poison. Achieving a similar function, in another embodiment the freeze plug is used to prevent a quantity of neutron poison held in a vessel separate from the reactor core from mixing with the fuel salt. Upon reaching the activation temperature, the freeze plug melts and releases the poison into the reactor. As with the dump tank embodiments, the vessel of poison may be located above the reactor core so that it flows under gravity into the reactor core or alternatively, may be maintained under pressure so that the poison is forced into the reactor core. In this manner, activation or melting of the freeze plug is highly detectable in the neutronic reactions of the reactor core. In additional or alternative embodiments, the freeze plug may contain or separate one or more elements that are detectable in other suitable manners, such as by the fuel monitoring system (e.g., Ramen Spectroscopy), other sensors within the reactor, etc. Many other configurations of safety-related freeze plugs are possible.

Freeze plugs may be passively maintained by providing a freeze plug material that has the appropriate melting point tailored to the desired activation temperature. In an alternative embodiment, freeze plugs may be actively maintained by providing an actively cooled component, such as a cooling jacket, around the location of freeze plug. Actively maintained freeze plugs may be used, for example, to allow for operator control of activation (through control of the cooling) or as a safety measure that activates upon loss of external power or control. Active control also allows for the use of fuel salt as a freeze plug, simplifying the use of freeze plugs in the operation of the reactor.

Suitable freeze plug materials include salts that are miscible in the fuel salt and that have the appropriate melting temperature higher than that of the reactor's operational temperature. In some cases, it may be appropriate to include a chemical barrier between the freeze plug and fuel salt to reduce the occurrence of inadvertent dissolution of the plug. For example, in an embodiment of an MCFR using a ternary fuel salt such as those described above, a suitable freeze plug may be any chloride salt, which has a melting point higher than that of the ternary salt embodiments.

For moderating purposes, an embodiment of a freeze plug that acts as a neutron poison includes freeze plugs made with $^{35}Cl$. As discussed above, $^{35}Cl$ is a neutron moderator and absorber and salts of $^{35}Cl$ when dissolved into the fuel salt will reduce the salt's reactivity. Other potential freeze plugs suitable for use in an MCFR include chloride salts of fission products with high absorption cross sections such as $^{133}Cs$, $^{101}Ru$, $^{103}Rh$, $^{99}Tc$ and $^{105}Pd$.

In some embodiments, the freeze plug material may not be a fuel salt or even a salt with the same anion as the fuel salt. Suitable freeze plug materials include those materials with a melting temperature that is targeted for the safety melting point for an action to occur and likely not react negatively with the fuel salt. Modified fuel salt with a higher melting temperature is just one example of this. Thus, a freeze plug potentially may be made of any material.

In yet another embodiment, the freeze plug material may be a neutron reflective material such that, upon reaching the activation temperature, the reflective freeze plug melts and provides less reflection of neutrons, thereby changing the overall reactivity of the reactor. In this embodiment, the freeze plug may further expose, release or uncover a neutron poison upon melting. For example, a reflective freeze plug may cover a neutron absorber and thus operate as a reflector component that self-destructs upon reaching an activation temperature.

Ongoing Fuel Polishing

In an embodiment, during normal operations MCFR fuel salt only receives minor treatments other than periodic replacement of an amount of nuclear fuel salt with fresh fuel salt. In some cases, the removed fissile fuel will be replaced with fertile fuel salts. Some possible minor treatments for fuel polishing include mechanical filtering of fission products such as the noble metals and minimal removal of noble gases. In an embodiment, the treatment includes removal of noble gases that are created during the ongoing nuclear reaction. Such gases will include various isotopes of Kr, Xe and Ar. These gases may be removed by sparging of the fuel salts. Sparging will also have the effect of removing any other gaseous volatile fission products that may be created.

In an embodiment, fissile materials are not separated in any portion of the MCFR fuel cycle. Rather, bred plutonium is mixed in operation with fertile uranium and created fission products, including lanthanides, which are chemically similar and expected to be soluble in the fuel salt embodiments. In this manner, fuel polishing may be simplified in MCFR over typical fuel processing of prior fluoride molten salt reactors since the lanthanides in the MCFR will not need to be removed.

Fuel polishing may further include mechanical filtering to remove any precipitates that may be generated by the ongoing nuclear reaction and/or operation of fluid flow and moving components. Both filtering and sparging may be performed by conventional means including those presented above with reference to FIG. 1A.

Fuel polishing may further include mechanical filtering to remove any precipitates that may be generated by the ongoing nuclear reaction and/or operation of fluid flow and moving components. Both filtering and sparging may be performed by conventional means including those presented above with reference to FIG. 1A.

Figure 19:
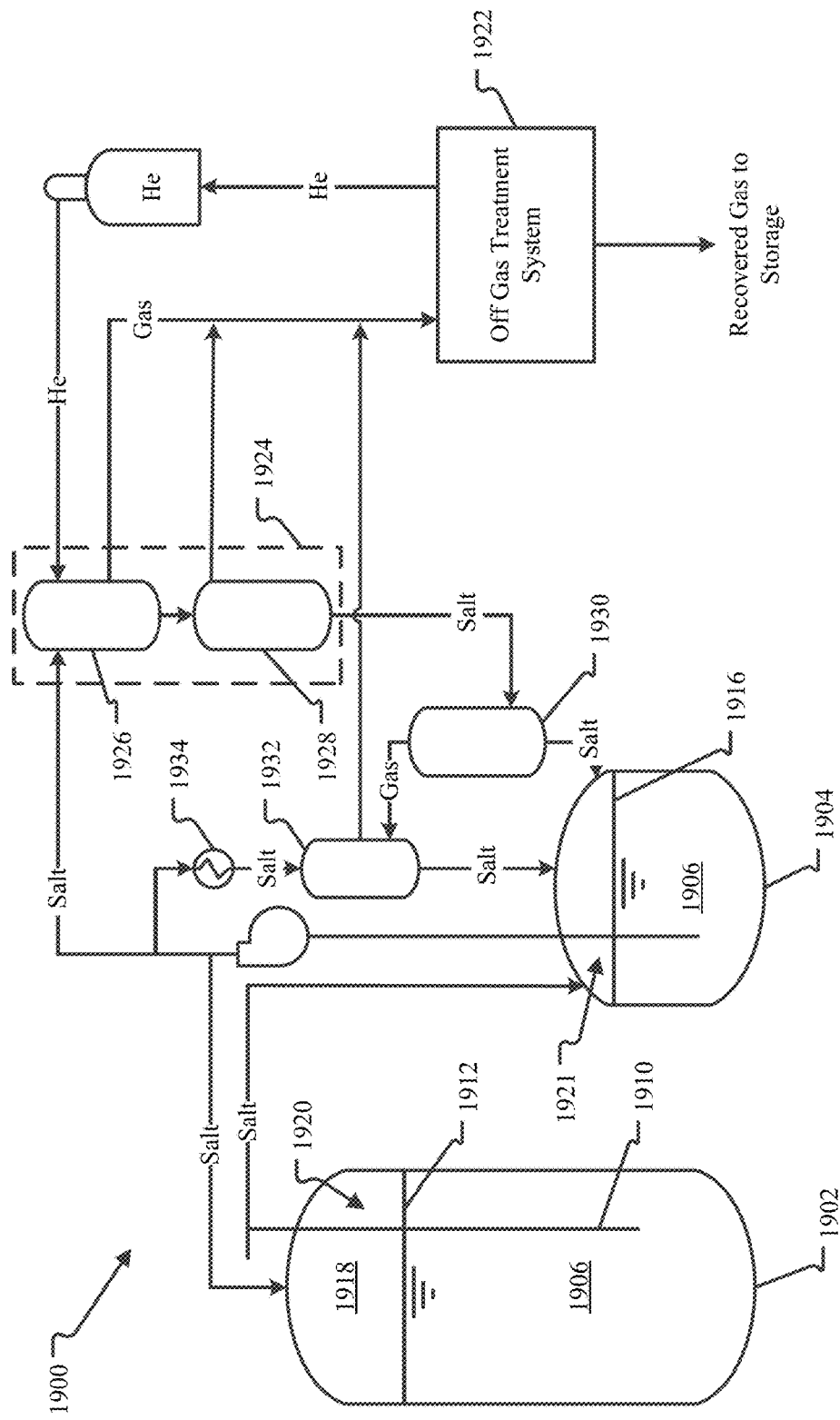
FIG. 19 illustrates an embodiment of a polishing system for fuel polishing that utilizes a drain tank.

FIG. 19 illustrates an embodiment of a polishing system for fuel polishing that utilizes a drain tank 1904. In an embodiment, the system 1900 is designed to remove most, if not all, insoluble fission products, corrosion products, and other compounds that have the potential to alter the fuel salt stoichiometry beyond design specifications. The system 1900 may also clean the fuel salt to acceptable specifications under normal and off-design operation. In the system 1900 illustrated, gas phase contaminants may evolve into the void space above the reactor core. These contaminants could contain fission products, noble gases, $UCl_4$, etc. The off-gas system includes the equipment for safely handling this off gas stream and recovering the $UCl_4$. The system 1900 includes equipment to dissipate the heat, collect and store/dispose of stable and long-lived gases, recovery of the $UCl_4$, and recompression/recycling of the inert gases. The system 1900 further may have the ability to reduce the concentration of corrosion elements such as oxygen and sulfur. In addition, the system 1900 may remove dissolved noble gases, such as $^{135}Xe$.

In the embodiment shown, the system is comprised of several different unit operations to facilitate the cleanup of the fuel salt. These include: Filtration of insoluble fission products; helium bubble generation to aid in the removal of noble gas fission products from the fuel salt prior to reinsertion in the reactor core; degassing of the helium bubbles/noble gases from the molten salt prior to reinsertion in the reactor core; passing the degassed helium bubbles/noble gases through a long delay chemical trap system where the isotopes will decay to insignificant levels; and recycling of the helium. In an embodiment, any vent gases from the reactor system would be vented to this system 1900. These gases would pass through a scrubber where it would be contacted with cooled fuel salt to remove any $UCl_4$ in the gas stream.

In the embodiment shown, the drain tank 1904 is located at a level lower than the fuel salt level 1912 in the reactor core 1902 to allow molten fuel salt from the reactor core 1902 to flow under gravity into the drain tank 1904 for polishing. The fuel 1906 may be removed from one or more locations in the reactor core by gravity flow or siphon. The transfer of gas between the reactor core head space 1920 and the drain tank headspace 1921 may be controlled to maintain the desired level 1916 of fuel salt in the drain tank 1904. In an embodiment, to preserve the integrity of the reactor core, a dip tube 1910 is provided from the top of the reactor core 1902 to the depth within the fuel salt 1906 from which removal is desired. The flow rate may be controlled by valves or by selection of discharge pipe diameter and pressure differential between the reactor core 1902 and drain tank 1904.

The treatment system 1900 can be operated in continuous or batch fashion. The system may be sized to treat any desired throughput, such as for example 1% per minute or 0.1% per minute of the total fuel salt 1906 in the system. In an embodiment, the drain tank 1904 may be maintained at the same operating temperature and pressure as the reactor core. In an alternative embodiment, drain tank and treated sidestream of fuel salt may be maintained under different conditions selected to improve treatment or handling characteristics of the fuel salt. For example, in an embodiment the fuel salt 1906 in the drain tank 1904 may be maintained at a temperature from 800-900° C., such as 850° C. A heater exchanger 1908 is illustrated in the drain tank 1904 for temperature control, however any suitable technology may be used such as heated jacket around the drain tank. In yet another embodiment, the relative operating conditions of the reactor core 1902 and the drain tank 1904 may allow treatment to occur without actively heating the drain tank 1904, in which case the tank 1904 may only be insulated rather than actively heated.

In some embodiments, the number of valves may be reduced or eliminated to reduce the amount of maintenance needed. For example, in an embodiment the system is operated in batch fashion and valves are eliminated. The drain tank 1904 is filled from and discharged back into the reactor core 1902 by adjusting the pressure in the drain tank 1904 relative to the reactor core 1902, e.g., by pumping gas into the drain tank 1904 or by physically raising/lowering the drain tank 1904 relative to the fuel salt level 1912 in the reactor core 1902. In an alternative embodiment, one or more pumps 1914, such as the VTP™ variable speed molten salt pump by Flowserve Corporation, may be provided to transfer treated fuel salt 1906 back to the reactor core 1902. In an embodiment, it would be undesirable to have level control valves in the return line, so the level 1916 of salt 1906 in the drain tank 1904 could be controlled by the speed of the pump 1914. The level 1916 could be measured by either a non-intrusive nuclear level detector, by thermocouples in the drain tank or by any suitable level sensing technique.

The system 1900 includes three different fuel salt treatment components that can receive fuel salt from the drain tank 1904: a degassing system 1924 that includes a helium contactor 1926 and a separation vessel 1928; a filtration system illustrated as filter 1930; and a UCl$_4$ condenser 1932. In the embodiment illustrated, the degassing system 1924 and filtration system 1930 are connected serially so that fuel salt exiting the degassing system flows through the filtration system and the UCl$_4$ condenser 1932 is a parallel treatment component. However, in alternative embodiments the three components may be connected in any configuration either serially or in parallel. Each component 1924, 1930, 1932 will be discussed in greater detail below.

In the degassing system 1924 illustrated, fuel salt 1906 from the drain tank 1904 is transferred into a degassing vessel that acts as a helium contactor 1926 where helium would be added in the presence of strong agitation. In an embodiment, a rotary degasser may be used as the helium contactor 1926. As a result of the contacting, the $^{135}$Xe and other noble gases diffuse from the fuel salt 1906 to the helium gas. The helium gas, now a He mixture with $^{135}$Xe and other noble gases, would separate from the fuel salt 1906 and vent to the off gas treatment system 1922, either directly or indirectly by being routed first through the headspace 1921 in the drain tank 1904. The fuel salt 1906 from the helium contactor 1926 is transferred, for example via overflow by gravity or by pumping, to a separation vessel 1928 to provide more residence time for the helium to separate from the fuel salt 1906. In an embodiment, the helium contactor 1926 and separation vessel 1928 are located at a higher elevation than the drain tank to provide the pressure drop necessary for the fuel salt to "overflow" from the helium contactor, through the separation tank and to the filter 1930 without a second pump. Alternative embodiments may also be used in which pumping or differential pressure transfer may be used. In yet another embodiment, the separation vessel 1928 may be omitted in favor of a larger helium contactor 1926 or a series of parallel contactors 1926 that are independently and alternately operated in a batch mode to provide sufficient helium contacting and separation time.

In the embodiment shown, the degassing system 1924 may be operated continuously such that a constant flow of fuel salt is maintained through both vessels and out the bottom of each 1926, 1928. On benefit of the gravity flow and draining each vessel from the bottom is to avoid the accumulation of solids in the bottom of either vessel. Accumulated solids would be a radioactive waste that would have to be removed and disposed. The separation vessel 1928 drains into the filter system 1930, which removes any particulate prior to returning the fuel salt 1906 to the drain tank 1904.

In an embodiment, some treatment chemicals may be added to the fuel salt prior to its introduction into the degassing system 1924 or the filter system 1930 or both. The purpose of such treatment chemicals would be to chemically modify contaminants in the fuel salt in order to more efficiently remove the contaminants by the degassing system 1924 or the filter system 1930. For example, injecting liquid NaAlCl$_4$ may assist in oxide removal.

In an alternative embodiment, the degassing system 1924 may be incorporated into the reactor core 1902. In this embodiment, helium gas is delivered into the reactor core 1902. While some gas will leave the fuel salt and collect in the headspace 1920 where it can be removed and treated by the off gas system 1922 as described above (with or without being passed through the drain tank 1904), some helium will cause cavitation in the circulation pumps. In this embodiment, the helium may be collected from the pumps and likewise removed and treated by the off gas system 1922 as described above.

In an embodiment, the filter system 1930 may be directly connected to the top of the drain tank 1904. Any suitable type of filter may be used. For example, in an embodiment the filtration system may include a tube sheet supporting a number of individual tube filter elements inside of a filter vessel 1930. In an embodiment, filter elements would not be cleaned in service. Solids will accumulate on the filter material surface over time until the filter vessel 1930 is taken out of service and the filter elements either discarded as waste or regenerated. The filter vessels 1930 may be sized for any desired nominal lifetime based on the design throughput of the system 1900.

In an embodiment, the filter elements are made from either sintered molybdenum powder or fiber to reduce corrosion. The initial pressure drop of the filter system will be very low. The filter elements could be installed "upside down", that is with the tube sheet at the bottom of the vessel 1930 and the filter elements extending vertically upwards above the tube sheet, so that the vessel would continually drain into the tank 1904. The filter inlet may be located as close to the tube sheet as possible to minimize the holdup of molten salt in the filter vessel. As particulate accumulates on the filter surface and the pressure drop increases, the liquid level will rise in the filter vessel.

The $UCl_4$ condenser 1932 is designed condense gaseous $UCl_4$ and return it to the drain tank 1906. In the embodiment illustrated, the $UCl_4$ condenser 1932 is connected so that it receives and treats gas from the filter system 1930 and the drain tank 1904. In an alternative embodiment, the $UCl_4$ condenser 1932 may be connected to other gas streams from other components such as the reactor core 1902.

In an embodiment, the condenser 1932 is a countercurrent contacting heat exchanger using cooled fuel salt 1906 from the drain tank 1904 as the coolant. The melting point of pure $UCl_4$ is 590° C. and the boiling point is 791° C., so a portion of the fuel salt 1906 from the drain tank 1904 may be cooled, using any conventional heat exchanger such as a shell and tube heat exchanger 1934, illustrated, to below the boiling point of $UCl_4$, such as 700° C., and flowed through nickel or molybdenum structured packing countercurrent to the vent gases. The condenser 1932 may be a packed column of containing random nickel and/or molybdenum packing elements. This would condense any $UCl_4$ in the vent gas. Because the exchanger is a contacting vessel, condensed $UCl_4$ would combine with the cooled fuel salt and be returned to the drain tank 1904. The gaseous output of the condenser 1932 may be cooled prior to delivery to the off gas treatment system 1922.

As shown in FIG. 19, the discharge flow from the drain tank 1904 may be transferred to the reactor core 1902, the degassing system 1926, or to the $UCl_4$ condenser 1932 as the coolant. These flows may be actively controlled by valving (not shown) or restricting orifices may be placed in the various lines to balance the fuel salt flows and avoid the requirement for valves. Sizing of these restricting orifices will depend on the actual routing of the piping and ensuing hydraulic calculations.

The off gas treatment system 1922 receives fission product gases and holds them for a sufficient time to allow some radioisotopes to decay. In the embodiment shown, vent gases 1918 are removed from the void space 1920 above the fuel salt level 1912 in the reactor core 1902 and flow into the drain tank 1904. The gas flow leaving from the drain tank 1904 would flow, either directly or as illustrated in FIG. 19 indirectly via the $UCl_4$ condenser 1928, through an off gas treatment system 1922. In addition, in the embodiment illustrated the off gas treatment system 1922 receives gas directly from the degassing system 1924. In an embodiment, the flowrate of gases through the entire system including the reactor core 1902, drain tank 1904 and the off gas treatment system 1922 are controlled by valving and instrumentation located at the exit of the off gas treatment system 1922 where the temperature is cool and there is little to no radiation. This embodiment avoids the need for a compressor/blower between the reactor and the drain tank. It is anticipated that the total yield of tritium will flow out through the off gas system 1922.

Figure 20:
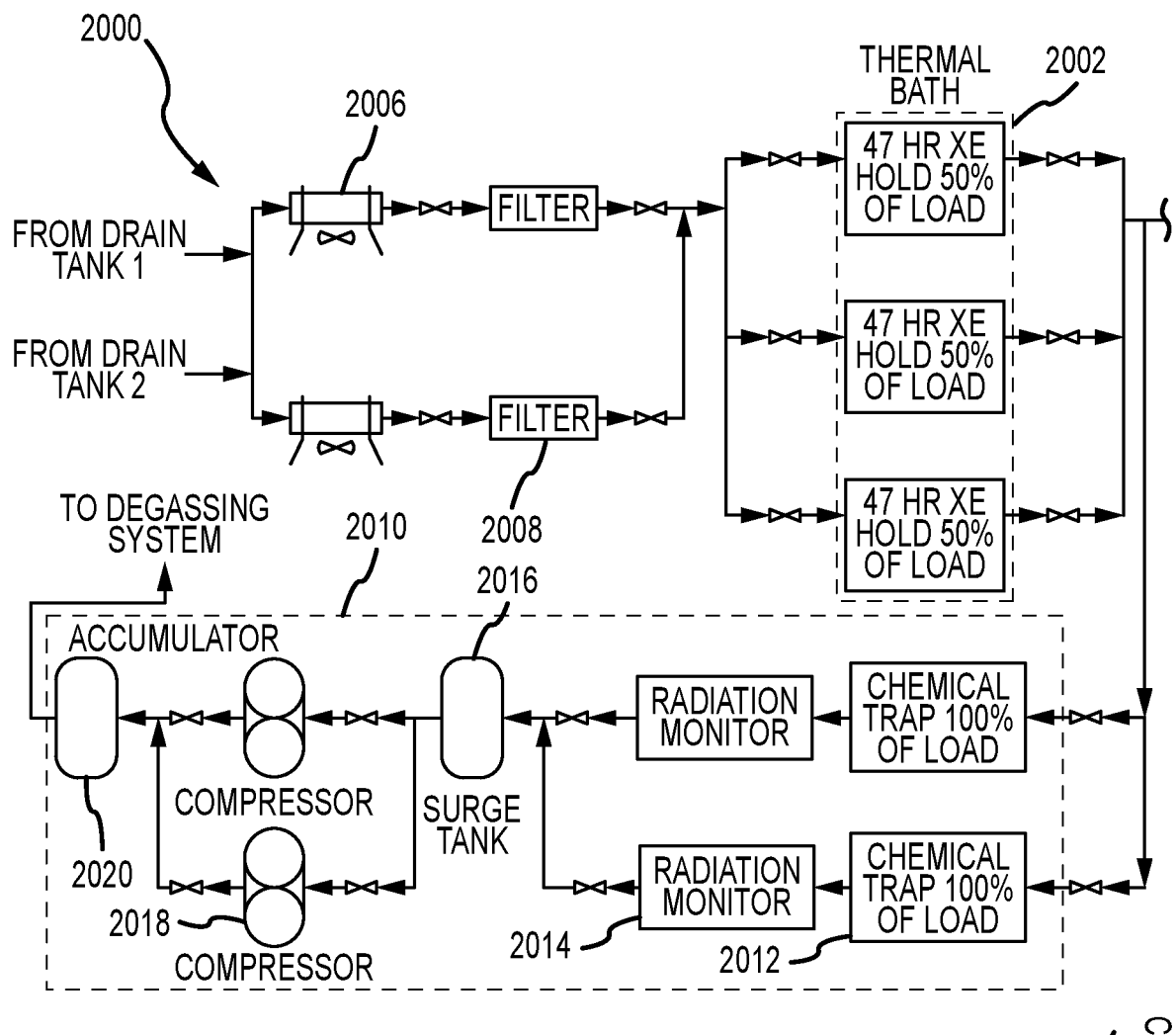
FIG. 20 illustrates an embodiment of an off gas treatment system suitable for use in treating gaseous fission products produced by a molten salt reactor, for example as the off gas treatment system in FIG. 19.
Figure 20:
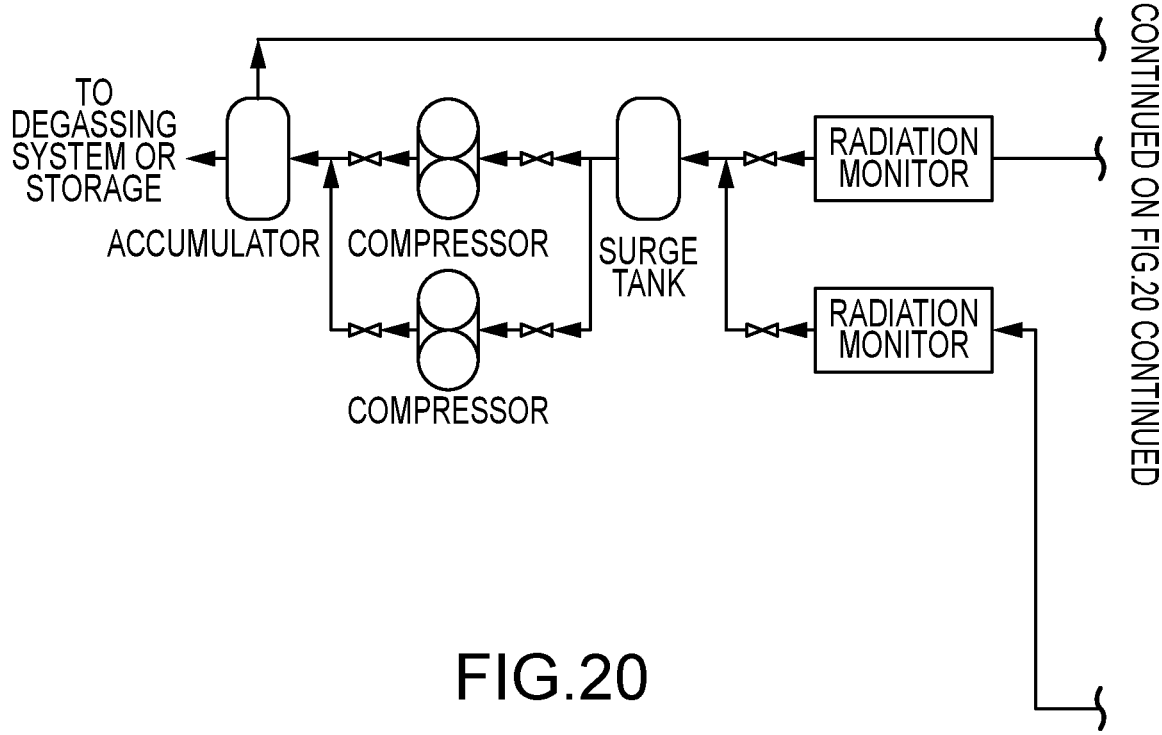
Figure 20:
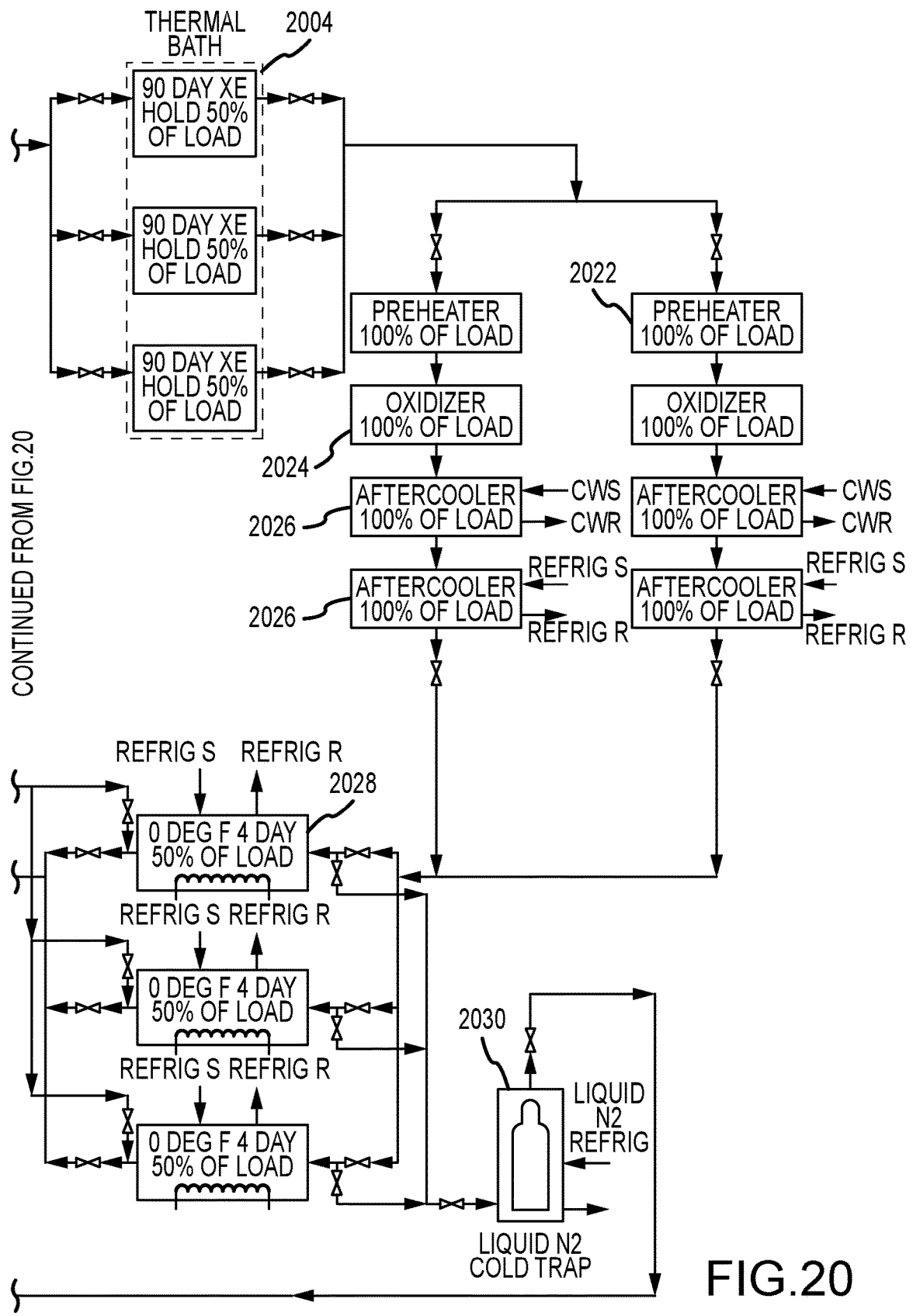

FIG. 20 illustrates an embodiment of an off gas treatment system 2000 suitable for use in treating gaseous fission products produced by a molten salt reactor, for example as the off gas treatment system 1922 in FIG. 19. The system is designed to receive the gaseous fission products in a carrier gas such as helium although other gases are possible. In the embodiment shown, the flow through the off-gas system 200 primarily consists of two recycle loops, a short delay holdup loop 2002 and a long delay holdup loop 2004.

Inlet gas to be treated may first be cooled and filtered before entering the recycle loops as illustrated in FIG. 20 by cooler 2006 and filter 2008. In an embodiment, the filter 2008 is designed to remove any gas borne particulate, metals, salts, or fission products that may be in the gas. Based on the molten salt chemistry, the primary constituents of the filtered inlet gas will be Kr, Xe and tritium.

The short delay holdup loop 2002 includes one or more vessels containing activated carbon. In the embodiment shown, the short delay holdup loop 2002 has three parallel activated carbon vessels 2006, each nominally sized to handle 50% of the anticipated Xe load. In an embodiment, the short delay holdup loop 2002 is a holdup loop designed to retain the received gases for a period sufficient to allow the $^{135}Xe$ to decay to less than 5% of the inlet concentration. This period may be actively controlled and determined by monitoring the inlet and outlet concentrations of $^{135}Xe$ or the loop 2002 may be designed with a fixed residence time based on the half-life of $^{135}Xe$, such as for example from 45 to 49 hours or 40 to 60 hours.

The activated carbon vessels 2006 may be maintained in a shielded enclosure or may be individually shielded vessels to attenuate any radiation escaping the system 2000. A vessel cooling system 2008 may also be provided, such as a thermal bath of water or other heat transfer fluid in which the vessels 2006 are immersed, to mitigate the decay heat. In an embodiment, waste heat from the vessels 2006 may be used to generate low pressure steam, thus recovering energy from the cooling system 2008.

Gas exiting the short delay holdup loop 2002 may be transferred to the long delay holdup loop 2004, may be transferred to a carrier gas recovery system or both. In the embodiment shown, gas exiting the short delay holdup loop 2002 is divided into two streams, one stream going to the long delay holdup loop 2004 and the other stream to a helium gas recovery system 2010. In an embodiment, some flow of gas greater than 50% of the total outflow of the short delay holdup loop 2002 (e.g., 70-90%) is passed through one or more chemical traps 2012 and radiation alarms 2014 before entering a surge tank 2016 at the inlet of a carrier gas compressor 2018. The helium is compressed and then stored in the accumulator tank 2020. In an embodiment, helium from this accumulator tank 2020 is metered and recycled for use as new carrier gas, such as by being fed into degassing system 1924.

Any outlet gas from short delay holdup loop 2002 not treated by the carrier gas recovery system 2010 will be transferred to the long delay holdup loop 2004. The long delay holdup loop 2004 is designed to retain the Kr and Xe long enough for the radioisotope concentration to drop to an acceptable discharge threshold. In an embodiment, similar to the short delay holdup loop 2002, the long delay holdup loop 2004 includes one or more vessels containing activated carbon. In the embodiment shown, the long delay holdup loop 2004 has three parallel activated carbon vessels 2006, each nominally sized to handle 50% of the anticipated Xe load for the specified period, in this case 90 days but which may be from 50-150 days depending on the desired discharge threshold. The activated carbon vessels 2006 may be maintained in a shielded enclosure or may be individually shielded vessels to attenuate any radiation escaping the system 2000. A vessel cooling system 2008 may also be provided, as described above.

Exiting the long term Xe holdup system, the gas may be transferred through a preheater 2022 which raises the gas temperature to 800° C. or higher. The gas may then be passed through a catalyst vessel 2024 where the tritium is oxidized with air. The gas then flows through a water cooled aftercooler 2026 or set of aftercoolers 2026, as shown, that reduces the temperature to reduce the heat load on the final charcoal packed absorber 2028. In an embodiment, the absorber 2028 is designed to operate at to −20° C. The tritium, Kr and Xe are retained on the charcoal while the helium gas passes thorough the bed. After leaving the refrigerated absorber, the helium is compressed and can be recycled to the reactor purge system for pump seals, etc. In the embodiment shown, there are three refrigerated absorbers 2028 sized for 50% of the anticipated load with two of the three in service at all times. At any given time, the out-of-service absorber 2028 will be regenerated by heating the absorber electrically and flowing a small heated helium stream through the absorber in the reverse direction. This regenerated gas stream containing Kr, Xe, and $^3H_2O$ would flow into a liquid nitrogen cooled receiver cylinder 2030 for permanent storage.

Figure 21:
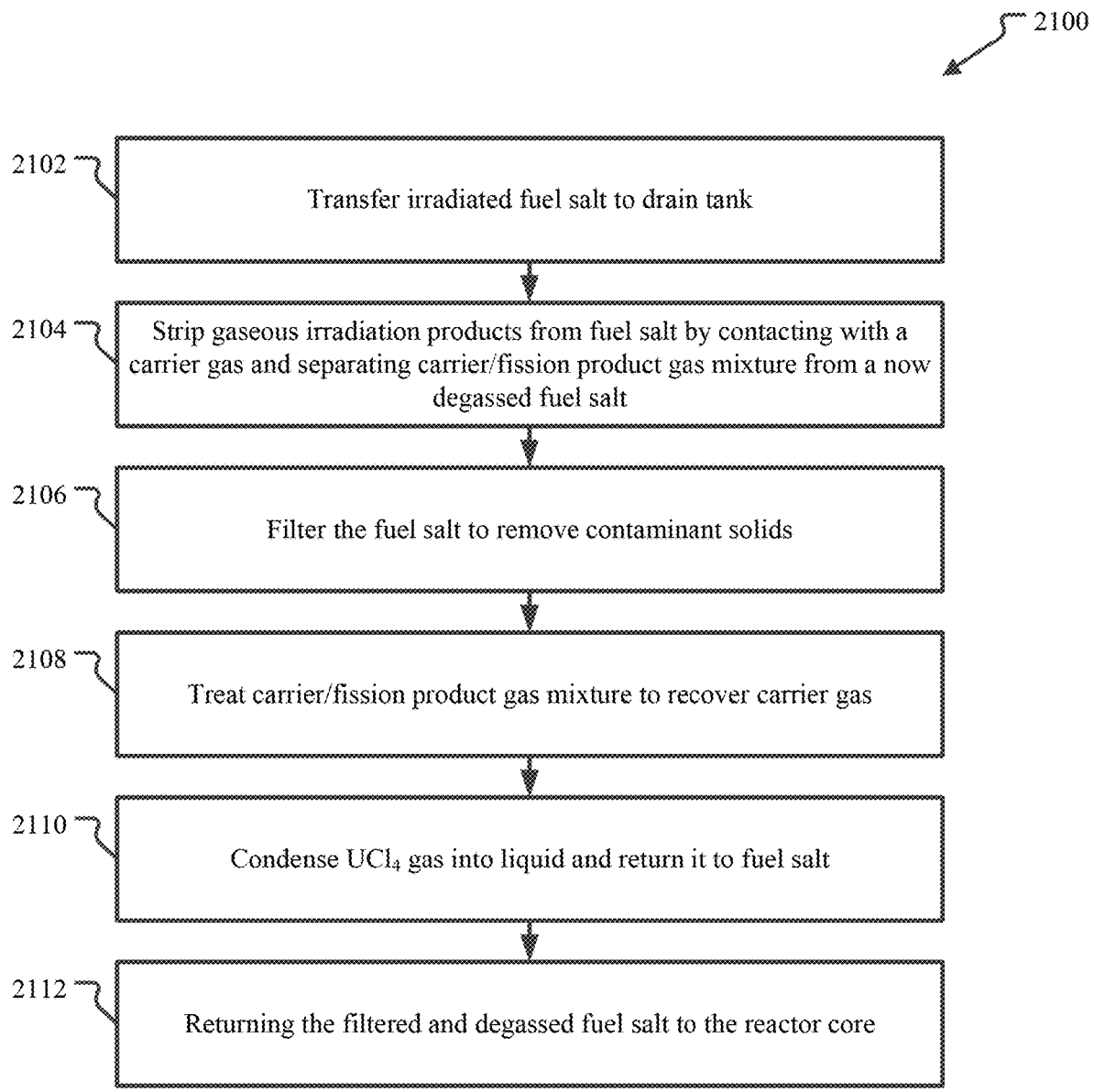
FIG. 21 illustrates an embodiment of a method for polishing fuel salt based on the systems described in FIGS. 19 and 20.

FIG. 21 illustrates an embodiment of a method for polishing fuel salt based on the systems described in FIGS. 19 and 20. In the embodiment shown, the method 2100 starts with transferring irradiated fuel salt from the operating reactor core 1902 to the drain tank 1904 in a transferring operation 2102.

The fuel salt is then degassed in a degassing operation 2104 in which a carrier gas, such as helium, is contacted with the irradiated fuel salt, thereby removing gaseous fission products from the fuel salt. In an embodiment, the degassing operation 2104 may include contacting the fuel salt with the carrier gas in a contacting vessel then transferring the fuel salt to a second vessel for some residence time to allow additional time for the separation to occur. This operation 2014 creates a carrier/fission product gas mixture and a degassed fuel salt having a reduced amount of gaseous fission products relative to the irradiated fuel salt.

After the degassing operation 2104, the degassed fuel salt may be filtered in a filtration operation 2106. In an embodiment of the filtration operation 2106, degassed fuel salt passes through a filter 1930 under gravity and the filtered fuel salt effluent drains into the drain tank 1904. As presumably any solids in the fuel salt at operational temperature are some form of contaminant (either a fission product solid, corrosion product, or some other contaminant), any filtered solids are unwanted and are removed and disposed of in this operation 2106.

The polishing method 2100 further includes treating the carrier/fission product gas mixture generated by the degassing operation 2104 in a carrier gas treatment and recovery operation 2108. This operation 2108 includes collecting the carrier gas/fission product mixture from the system and transferring it to an off gas treatment system, such as the system 1922 described above. The carrier gas treatment and recovery operation 2108 may include storing the carrier gas/fission product mixture for a first period of time, then recovering the carrier gas from the mixture by passing the carrier gas through a separator, carbon filter, ion exchanger, or other chemical trap that removes Kr and Xe from the carrier gas and otherwise cleans the carrier gas sufficiently to allow it to be reused.

The polishing method 2100 may further include collecting gaseous $UCl_4$ that evaporates from the fuel salt and re-condensing it in a $UCl_4$ condensation operation 2110. Recovered $UCl_4$ condensate is returned to the fuel salt by dissolving it into a fuel salt stream and returning the stream, which may be considered a high concentration $UCl_4$ fuel salt, to the drain tank or reactor core.

The method 2100 includes returning the filtered, degassed fuel salt to the reactor core. In an embodiment for the system 1900 in FIG. 19, the method 2100 is continuously operated on a sidestream taken from the reactor core 1902. In this embodiment the drain tank 1904 is continuously receiving both irradiated fuel salt from the reactor core 1902 and filtered fuel salt from the filtration system 1930. In addition, fuel salt with condensed $UCl_4$ is also received from the $UCl_4$ condenser. Simultaneously, polished fuel salt from the drain tank is being transferred to the reactor core. In alternative embodiments, the operations of the method 2100 described above may be performed concurrently as continuous or batch processes. In addition, the various operations may be performed serially as continuous or batch processes.

Fuel Salt Post-Processing

Fuel salts removed from an operational reactor will include fission products in addition to the fuel salt constituents described herein. While some fission products may be easily removed by sparging, settling or differential precipitation, others, particularly the lanthanides as described above, may be difficult to remove. Note that such used fuel salt purification may not be necessary in the fast spectrum of the chloride fuel salts, as used fuel salt may be suitable for use 'as is' as startup material for another molten salt reactor. However, if purification is desired, a fission product removal system may be utilized.

A removal system may be configured to remove one or more lanthanides from the nuclear fuel salt. A fission product removal system may include one or more plasma mass filters. By way of non-limiting example, the one or more plasma mass filters may include an Archimedes-type plasma mass filter. The use of an Archimedes-type plasma mass filter is described by R. Freeman et al. in "Archimedes Plasma Mass Filter," AIP Conf. Proc. 694, 403 (2003), which is incorporated herein by reference in the entirety.

In another embodiment, an Archimedes filter plant (AFP) may act to remove one or more lanthanides from fuel salt from one or more reactors. In one embodiment, the AFP may include two plasma mass filters. By way of non-limiting example, each of the two plasma mass filters is capable of processing approximately a ton of fuel salt per day. In another embodiment, the first plasma filter is tuned so as to separate out the heavy elements from the fuel salt, with the second filter being tuned to separate the salt constituents from the fission products. In this configuration, the AFP could support a fleet of approximately 100-200 molten salt nuclear reactors (e.g., molten chloride salt fast reactors). In another embodiment, the fleet could utilize Archimedes-type filtering in a batch-type process. By way of non-limiting example, in a batch-type process, each reactor may send a portion (e.g., 10-20%) of its salt to the AFP every 1-3 years. Further, the salt may either be returned to the original reactor, swapped with the salt from another reactor, or replaced with depleted uranium loaded salt in the original reactor. The lanthanide-cleaned salts may be used to start up additional molten salt nuclear reactors without the need for ongoing enrichment, as discussed above.

It is noted that the reactor 100 of the present disclosure is not limited to the Archimedes-type filter described above, which is provided merely for illustrative purposes. It is recognized herein that the separation requirement of the reactor 100 of the present disclosure may be significantly less than system typically used in the context of an Archimedes-type system. For example, the reactor 100 of the present disclosure may only require a separation efficiency required of approximately 0.99 or 0.9. As such, a significantly simplified plasma mass filter design may be used in the context of reactor 100 of the present disclosure.

In another embodiment, the fission product removal system includes a significantly smaller plasma mass filter capable of cleaning 30-50 kg of salt each day. By way of a non-limiting example, a small bypass flow (~10-8 of the flow) may be sent to the filter for cleaning and immediately sent back to the core without the need for off-site transport. It is noted herein that, while small plasma mass filters may lose some economy of scale, they are affordable and significantly less expensive than procurement of fresh fuel that has been enriched in fissile material.

Anti-Proliferation Technologies

Since molten nuclear fuel salt may be removed from the reactor 100, it is desirable to provide anti-proliferation safeguards to the molten fuel salt 108 of the present disclosure. In one embodiment, the molten fuel salt 108 is pre-loaded or initially created with one or more materials, such as lanthanides or other elements, that can be difficult to separate from the fuel salt but improve the proliferation resistance and which serve as a neutron absorber in the molten fuel salt 108. This diminishes the capacity of the fuel salt for use in weapons applications if it were to be intercepted prior to its use as a nuclear fuel in a molten salt reactor but does not substantially affect the criticality of the MCFR due to its fast spectrum. The addition of lanthanides also make the fuel salt more dangerous to handle, thereby also reducing its attractiveness for use in weapons applications.

One method of determining the attractiveness of a material for weapons use is referred to as the Figure of Merit (FOM). The FOM is a calculation that takes into account the mass of a material (or materials), its dose and its decay heat. One equation for the FOM is as follows:

$$FOM = 1 - \log_{10}\left(\frac{M}{800} + \frac{Mh}{4500} + \frac{M}{50}\left[\frac{D}{500}\right]^{\frac{1}{\log_{10} 2}}\right)$$

where M is the bare critical mass in kg of the metal component of a compound (i.e., does not include the weight contribution of oxides, chlorides, other anions, etc.), h is the heat content or decay heat in W/kg, and D is the dose of 0.2*M at 1 m from the surface in rad/hr. For non-proliferation purposes, an FOM of <1.0 is deemed to be unattractive for weapons purposes. Thus, in an embodiment, lanthanides are added to the fuel salt to the extent necessary to obtain an FOM of <1.0.

In one embodiment, when pre-loaded into a molten chloride-based fuel, the one or more pre-loaded lanthanides act to form one or more lanthanide trichlorides. It is noted that these compounds are similar, in at least a chemical sense, to $PuCl_3$, which is present in the molten fuel (e.g., Pu-239 is formed during enrichment and may form $PuCl_3$). The presence of the one or more lanthanide trichlorides makes $PuCl_3$ less usable for weapons applications.

The presence of lanthanide trichlorides in the molten fuel salt 108 reduces the usability of the Pu present in the molten fuel salt 108 in the event one attempts to apply a chemical process to separate the Pu from the rest of the molten fuel salt. In this sense, the lanthanides "ride along" with the Pu during some forms of chemical separation. This feature provides at least three benefits. First, the lanthanides cause the ultimate Pu sample to become more radioactive, making it more difficult to handle, shield, etc. Second, the lanthanides increase heat generation within the Pu sample, again, making the Pu more difficult to handle, shield, etc., as it may reach temperatures above the Pu melting point. Three, the presence of lanthanides changes the critical mass of the material such that the reaction process within a given Pu sample is far less efficient than a lanthanide-free sample. As such, in the case of a lanthanide-loaded Pu sample, more Pu material would be required for weapon device purposes, making weapons use more difficult and unwieldy.

Further, uranium chemically separated from the mixture is not suitable for weapons applications as it is low enrichment uranium (LEU).

It is noted that while some lanthanides may be formed in the fuel salt 108 as fission products during operation of the nuclear reactor 100, it is contemplated herein that the lanthanides of the present embodiment are pre-loaded into the nuclear fuel salt 108 prior to start-up of the reactor 100 and, thus, prior to the production of any significant amount of plutonium. After operation has begun, the fuel salt will naturally become less suitable for weapons applications as lanthanide fission products are created and build up due to the chain reaction.

In one embodiment, the one or more lanthanides are pre-loaded into the molten fuel salt 108 prior to start-up of the reactor 100. In one embodiment, the one or more lanthanides are pre-loaded into the molten fuel salt 108 prior to the reactor 100 reaching a selected reactivity threshold. By way of non-limiting example, the one or more lanthanides are pre-loaded into the molten fuel salt 108 prior to the reactor 100 reaching criticality or a sub-critical threshold.

In another embodiment, the one or more lanthanides are pre-loaded into the molten fuel salt 108 prior to the generation of a selected threshold of plutonium (e.g., Pu-239) within the reactor (e.g., generated by enrichment of uranium in a uranium-plutonium breed-and-burn operation). By way of non-limiting example, the one or more lanthanides are pre-loaded into the molten fuel salt 108 prior to the generation of a selected amount of plutonium within the reactor. For instance, the one or more lanthanides are pre-loaded into the molten fuel salt 108 prior to the generation of 8 kg of plutonium within the reactor 100. In another instance, the one or more lanthanides are pre-loaded into the molten fuel salt 108 prior to the generation of 4 kg of plutonium within the reactor 100. In yet another instance, the one or more lanthanides are pre-loaded into the molten fuel salt 108 prior to the generation of 2 kg of plutonium (and so on) within the reactor 100. It is noted that the above plutonium masses are not limitations on the present embodiment and are provided merely for illustrative purposes as any plutonium threshold may be implemented in the context of the present embodiment.

In another embodiment, the one or more lanthanides may be mixed with the molten fuel salt 108 such that the resulting lanthanide-loaded fuel salt has a lanthanide concentration from 0.1 and 10% by weight. In another embodiment, the one or more lanthanides may be mixed with the molten fuel salt 108 such that the resulting lanthanide-loaded fuel salt has a lanthanide concentration from 4 and 8%. In yet another embodiment, the selected lanthanide or lanthanides may be mixed with the molten fuel salt 108 in such proportions to achieve a threshold FOM that is <1.0, such as for example, an FOM threshold of less than 0.99, 0.98, 0.97, 0.96 or 0.95. In some embodiments, an FOM threshold of less than 0.95 may be desired such as less than 0.9 or 0.8.

In one embodiment, the one or more lanthanides may include one or more of La, Ce, Pr, or Nd. In another embodiment, in the case of a chloride-based molten nuclear fuel salt 108, the one or more lanthanides may be mixed into the molten nuclear fuel salt 108 by mixing the molten fuel salt 108 with one or more lanthanide chlorides. By way of example, the one or more lanthanide chlorides may include one or more of $LaCl_3$, $CeCl_3$, $PrCl_3$ or $NdCl_3$. In another embodiment, in the case of a chloride-based molten nuclear fuel salt 108, the one or more lanthanides (or one or more lanthanide chlorides) may be mixed into the molten nuclear fuel salt 108 by mixing the molten fuel salt 108 with one or more carrier salts (e.g., NaCl) loaded with one or more lanthanides or lanthanide chlorides.

In another embodiment, the mixture of molten nuclear fuel salt and the at least one lanthanide is formed outside of the fast spectrum molten salt nuclear reactor. By way of non-limiting example, the mixture of molten nuclear fuel salt 108 and the one or more lanthanides may be formed by mixing a volume of molten nuclear fuel salt 108 (prior to loading into reactor 100) and the one or more lanthanides (or lanthanides chlorides) in a separate mixing station external to the reactor core section 102 of the reactor 100 or after a predetermined period of time after start up when an expected amount of Pu is modeled to be bred up in the core.

In another embodiment, the mixture of molten nuclear fuel salt and the at least one lanthanide is formed inside of the fast spectrum molten salt nuclear reactor. By way of non-limiting example, the mixture of molten nuclear fuel salt 108 and the one or more lanthanides may be formed by mixing a volume of one or more lanthanides (or lanthanides chlorides) into the molten nuclear fuel salt 108 contained within the primary circuit (e.g., reactor core section 102, primary coolant system 110 and the like) prior to start-up of the reactor 100.

Figure 15:
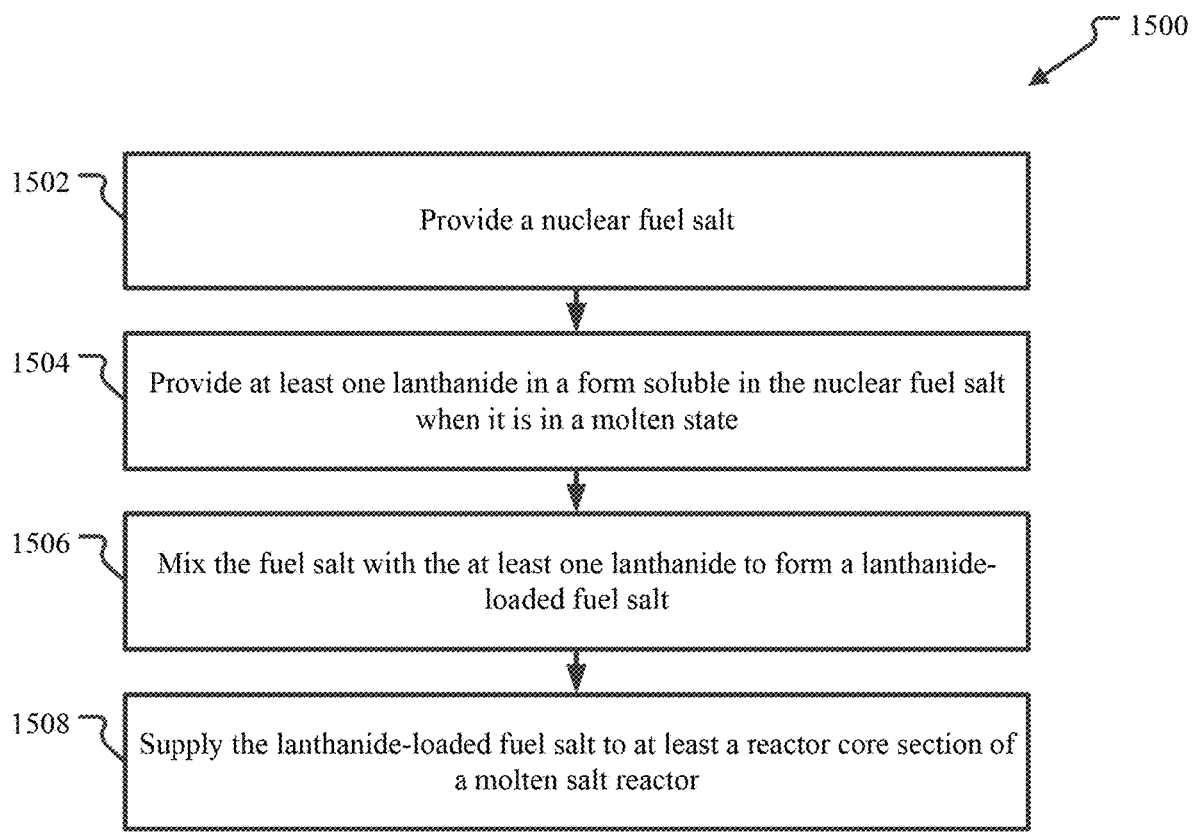
FIG. 15 illustrates an embodiment of a method for creating a fuel salt that has reduced weapons applications by the addition of one or more radioactive isotopes.

FIG. 15 illustrates an embodiment of a process flow 1500 representing example operations related to fueling a fast spectrum molten salt nuclear with nuclear fuel pre-loaded with one or more lanthanides, in accordance with one or more embodiments of the present disclosure. In FIG. 15, discussion and explanation may be provided with respect to the above-described examples of FIGS. 1A-1F, and/or with respect to other examples and contexts. It should be understood that the operational flows may be executed in a number of other environments and contexts, and/or in modified versions of FIGS. 1A-1F. Also, although the operations of FIG. 15 are presented in the sequence(s) illustrated, it should be understood that the various operations may be performed in other orders than those which are illustrated, or may be performed concurrently.

In operation 1502, the process 1500 includes providing a molten nuclear fuel salt. By way of non-limiting example, a selected volume of a molten nuclear fuel salt may be provided. For instance, the molten nuclear fuel salt may include, but is not limited to, any chloride-based fuel salt described throughout the present disclosure. In another instance, the molten nuclear fuel salt may include, but is not limited to, any fluoride-based fuel salt described throughout the present disclosure.

In operation 1504, the process 1500 includes providing at least one lanthanide. By way of non-limiting example, one or more lanthanides, such as, but not limited to, one or more of La, Ce, Pr, or Nd are provided. In one embodiment, the one or more lanthanides are provided in the form of a lanthanide salt. For example, the one or more lanthanides may be provided in the form of a lanthanide salt chemically compatible with the molten nuclear fuel salt of operation 1502. For instance, in the case of a chloride-based molten nuclear fuel salt, the one or more lanthanides may be provided in the form of one or more lanthanide salts, such as, but not limited to, $LaCl_3$, $CeCl_3$, $PrCl_3$ or $NdCl_3$. In another embodiment, a selected volume of one or more lanthanides (or one or more lanthanide salts) may be provided in the form of a mixture of one or more lanthanides (or one or more lanthanide salts) with an additional salt, such as, but not limited to, a carrier salt compatible with the molten nuclear fuel salt of operation 1502.

In operation 1506, the process 1500 includes mixing the molten nuclear fuel salt with the at least one lanthanide to form a lanthanide-loaded molten nuclear fuel salt prior to start-up of the fast spectrum molten salt nuclear reactor or after a determined amount of Pu has been bred up. In one embodiment, the volume of molten fuel salt provided in operation 1502 is mixed with the one or more lanthanides (or one or more lanthanide salts) of operation 1504 such that the resulting molten salt mixture has a lanthanide content level from 0.1-10% by weight. By way of non-limiting example, the volume of molten fuel salt provided in operation 1502 may be mixed, but is not required to be mixed, with the one or more lanthanides (or one or more lanthanide salts) of operation 1504 such that the resulting molten salt mixture has a lanthanide content level from 4-8% by weight.

In operation 1508, the process 1500 includes supplying the lanthanide-loaded molten nuclear fuel salt to at least a reactor core section of the fast spectrum molten salt nuclear reactor. In one embodiment, the mixture of operation 1506 may be formed by mixing the volume of molten fuel salt with the one or more lanthanides (or one or more lanthanide salts) inside of the fast spectrum molten salt nuclear reactor 100. In one example, the lanthanides may be added to the molten fuel salt within the reactor core. In another embodiment, the mixture of operation 1506 may be formed by mixing the volume of molten fuel salt with the one or more lanthanides (or one or more lanthanide salts) outside of the fast spectrum molten salt nuclear reactor 100, such as, but not limited to, a mixing vessel. In this regard, following the mixture of the molten fuel salt with the one or more lanthanides (or one or more lanthanide salts), the lanthanide loaded salt mixture may be loaded into the reactor 100.

As discussed above, a goal of the method 1500 is to make the fuel salt less attractive for use as feedstock for weapons development. An aspect of embodiments of the method 1500 is that the dose, that is the radiation exposure from the lanthanide-loaded fuel salt, is increased. The amount of lanthanides added may be determined based on a target dose. For example, the Department of Energy and other regulatory bodies have published recommended thresholds for what are referred to as "self-protecting limits" at or beyond which that body believes the material is no longer attractive for weapons use. One such attractiveness measure may be dose, which may be made so high that a recipient is exposed to so much radiation that the recipient is prevented from completing an intended task by the damage caused by the exposure. One such dose limit is 100 rads per hour (rads/hr), another is 500 rads/hr and a third is 1,000 rads/hr, all measured at a distance of one meter. However, limits as high as 10,000 rad/hr have been proposed and may be used. Embodiments of the method 1500 can be adapted to provide a fuel salt having any desired dose.

Another such attractiveness measure is the FOM, as described above. As described, based on that measure, initial fuel salts artificially modified to have an FOM of less than 1.0 are deemed unattractive for weapons use. In an embodiment, the selected lanthanide or lanthanides may be mixed with the molten fuel salt 108 in such proportions to achieve a threshold FOM that is <1.0. In alternative embodiments, more stringent FOM thresholds of less than 0.99, 0.98, 0.97, 0.96 or 0.95 may be selected and lanthanides or other ingredients altering the bare critical mass, M, the heat content, h, and the dose, D, factors of the FOM equation to achieve the desired threshold may be added. In some embodiments, an FOM threshold of less than 0.95 may be desired such as less than 0.9 or 0.8.

The lanthanides used may be any lanthanide, however, particularly high dose and long-lived lanthanide isotopes are most suitable. In addition to lanthanides, radioactive isotopes of other elements may be used to increase the dose of a fuel salt. These include caesium-137 and iodine-121.

Activated Anti-Proliferation Dopants

Another anti-proliferation technique is to dope the fuel salt with one or more elements (referred to herein as activation dopants) that, upon exposure to neutrons such as would occur in the fuel salt when a reactor is in operation, undergo a nuclear reaction to, directly or indirectly, form highly active "protecting isotopes" (of the same element as the activation dopant or a different element), thereby increasing the fuel's dose value, D, in the FOM equation sufficiently to achieve an FOM<1.0 within some number of days, e.g., 1 day, 2 days, 5 days, 10 days, 30 days, 45 days, 60 days, 100 days, or even 200 days of operation of the reactor.

During fission of a traditional fuel salt, as described elsewhere in this document such as $UCl_3$—$UCl_4$—$[X]Cl$, weaponizable materials such as Pu-239 or U-235 will be created along with other fission products. The mass of fission products will naturally increase over time, eventually reducing the FOM of the reacted fuel salt to an FOM<1.0 naturally. Depending on the particular fuel salt and the reactor used, however, there may be a period of days or months after the initiation of fission in which the FOM is greater than 1, but there is still an appreciable mass of weaponizable material that has been created. Activated anti-proliferation dopants can be used to 'bridge', so to speak, this period of high FOM by artificially causing the FOM to decrease after the initiation of fission. As the activated dopants do not affect the FOM calculation, this technique does not adversely affect the handlability of the fresh, unreacted fuel salt. However, as the fuel salt undergoes fission, the FOM of the fuel salt is artificially decreased quickly before a significant mass of weaponizable material is created.

In an embodiment, these activated dopants are stable or only slightly active (i.e., less than 1 becquerel/gram of material) in the form in which they are added to the salt, but then converted to a more active or highly active protecting isotope when subjected to neutron radiation. Half-life of the protecting isotopes may also be taken into account with longer half-lives providing longer security than protecting isotopes with shorter half-lives.

In general, suitable activation dopants are those that are stable or have an specific activity of 1 bq/g or less before activation (exposure to neutrons) and, after exposure, become a protecting isotope. In an embodiment, the activation dopants are present in the fuel in an amount sufficient to cause the fuel salt to achieve an FOM<1.0 within some number of days, e.g., 1 day, 2 days, 5 days, 10 days, or even 30 days of operation of the reactor. In an embodiment the protecting isotope(s) created further has a half-life greater than 1 months (e.g., from 1, 2, 3, 4, 5, 6, or 1 year on the low end of a range to 1,000,000 years on the high end of the range).

An example of such an activation dopant is Co-59. Co-59 is a stable isotope of cobalt that is converted to Co-60, a highly active isotope of cobalt of about 10 bq/g and a half-life of 5.2 years, when subjected to neutron radiation. Another example is cesium in which stable Cs-133 can be converted into the protecting isotope Cs-134 or Cs-137 having a specific activity of about 10 bq/g and half-life of 30 years. Yet another possible activation dopant is cerium which can be converted to highly active Ce-144. Another dopant is bismuth which can be converted to Bi-207. Another activation dopant is iridium in which stable Ir-191 after neutron bombardment become Ir-192. Yet another dopant is radium-226 which is converted to actinium-227. Note also that activation dopants need not be directly converted into a protecting isotope that increases the FOM, but rather the protecting isotope may be found in the decay chain of isotopes of the direct fission product of the activation dopant. Many of the lanthanides can be used as activation dopants.

Activation dopants may be added to the fuel salt in an amount and form suitable to remain in the fuel salt during fission. For example, in an embodiment compatible salts of the activation dopant and the protecting isotope are chemically soluble in the fuel salt. For example, in chloride fuel salts, chlorides of activation dopants may be added to the fuel salts to create a activation protected fuel salt. Examples of activation protected chloride fuel salts include an unprotect fuel salt (e.g., $UCl_3$/NaCl, $UCl_3$/$UCl_4$/NaCl, $UCl_3$/KCl, $UCl_3$/$UCl_4$/KCl or any other fuel salt embodiments described elsewhere) combined with one or more of the following activation dopant salts in which the cation is the activation dopant form of the isotope: $CoCl_3$, $CsCl$, $CeCl_3$, $LaCl_3$, $PrCl_3$, $NdCl_3$, $SmCl_3$, $EuCl_3$, $GdCl_3$, $TbCl_3$, $DyCl_3$, $HoCl_3$, $ErCl_3$, $TmCl_3$, $YbCl_3$, $LuCl_3$, $BiCl_3$, $IrCl_3$, or $RaCl_2$. For example, one embodiment of an activation protected fuel salt is $UCl_3$/NaCl/$CoCl_3$. Other embodiments include $UCl_3$/KCl/$CoCl_3$, $UCl_3$/NaCl/$CeCl_3$, $UCl_3$/NaCl/$CoCl_3$/$CeCl_3$, $UCl_3$/KCl/$CoCl_3$/CsCl, $UCl_3$/NaCl/CsCl, and $UCl_3$/NaCl/$LaCl_3$ to explicitly name but a few of the combinations described above.

Protected fuel salts need not be entirely pure. Embodiments of a protected fuel salt include no more than 10 wt. % of other components not discussed above. More pure embodiments include protected fuel salts with no more than 5 wt. % and no more than 1 wt. % of such other components. Such other components are those that are neither unprotected fuel salts as described above nor salts of activation dopants.

Figure 23:
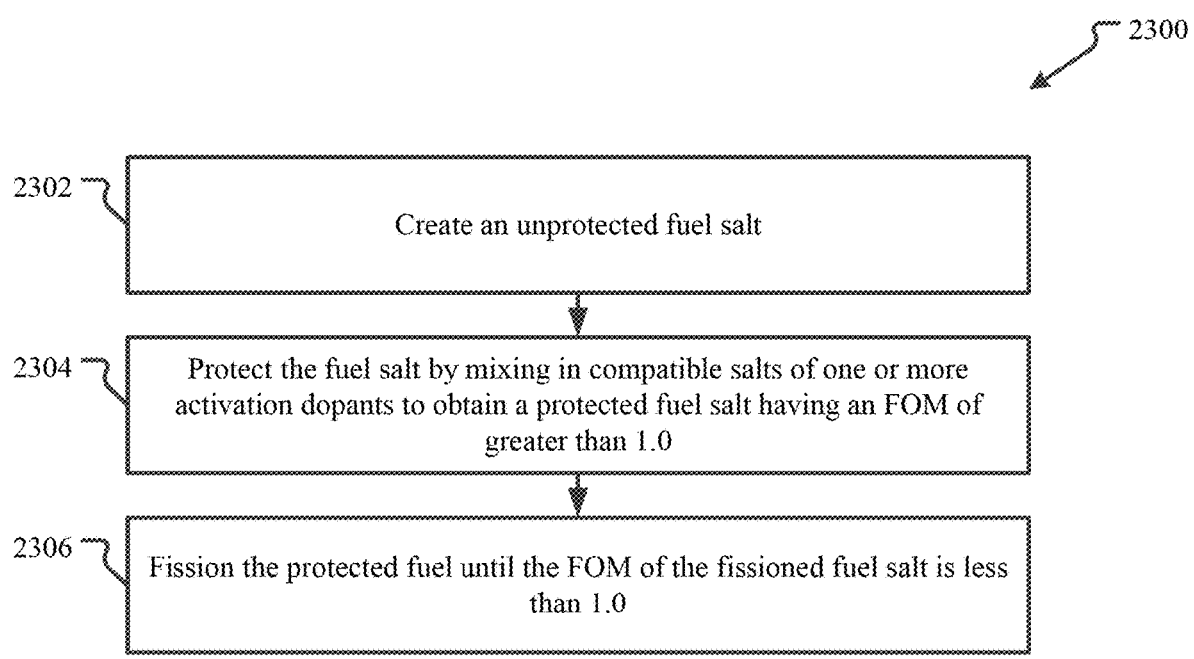
FIG. 23 illustrates an embodiment of a method of creating and using an activation protected fuel salt to provide anti-proliferation protection to a fuel salt.

FIG. 23 illustrates an embodiment of a method of creating and using an activation protected fuel salt to provide anti-proliferation protection to a fuel salt. In the method 2300, an unprotected fuel salt, such as those described elsewhere, is provided in an unprotected fuel salt creation operation 2302. In an embodiment the FOM of the unprotected fuel salt is greater than 1.0.

One or more activation dopants, as described above, are then added to the unprotected fuel salt to create an activation protected fuel salt in a protecting operation 2304. In an embodiment, the resulting activation protected fuel salt has an FOM that is greater than 1.0. In the protecting operation 2304, a sufficient total mass of activation dopants is added so that, upon fissioning of the fuel salt, the FOM of the fissioned protected fuel salt becomes less than 1.0 within some target time period of fissioning. Depending on the embodiment, the target time period of fission to achieve the FOM of less than 1.0 is 1 day, 2 days, 5 days, 10 days, 30 days, 45 days, 60 days, 100 days, 200 days or even 300 days of fission.

The operations 2302 and 2304 may be performed in reverse order or even combined so that the protected fuel salt is created in a single operation.

After the activation protected fuel salt is created, it is then fissioned in a nuclear reactor in a fission operation 2306, thereby creating a fissioned fuel salt. The fission operation

2306 is performed for a period of time, which may be continuous or intermittent. Regardless, as a result of the fissioning, the FOM of the fissioned fuel salt decreases during fissioning so that the FOM becomes less than 1.0 within the target time period due to the conversion of the activation dopants into protecting isotopes in fissioned fuel salt.

Plutonium Chloride Fuel Salt

In one embodiment, the fuel salt 108 may include a selected amount of plutonium. By way of example, in the case of a chloride-based nuclear fuel salt, the plutonium may be presented in the fuel salt 108 in the form of plutonium trichloride (e.g., $PuCl_3$). Methods for manufacturing $PuCl_3$ are known in the art and any suitable method may be used.

$PuCl_3$ has been shown to be compatible with uranium chloride salts. An embodiment utilizing $PuCl_3$ is $UCl_4$—$UCl_3$—$PuCl_3$—[X]Cl where, as above, [X]Cl is any additional, non-fissile salt. In these embodiments, the mol ratios of the any of various chloride salts may be determined as needed to obtain the desired melting point. In an embodiment, the amount of $PuCl_3$ varies from a detectable amount of $PuCl_3$ to 80 mol % and the other components (i.e., $UCl_4$, $UCl_3$, and [X]Cl) vary independently from 0 to 80%. Thus, embodiments such as $UCl_3$—$PuCl_3$—[X]Cl, and $UCl_4$—$PuCl_3$—[X]Cl are contemplated as are $UCl_4$—$UCl_3$—$PuCl_3$—NaCl.

Uranium Fuel Salt Embodiments

The $17UCl_3$-$71UCl_4$-$12NaCl$ embodiment of fuel salts disclosed above represents the embodiment of the ternary uranium chloride salt with the highest uranium density for a fuel salt that has a melting point of 500° C. or less. Thus, this salt embodiment is appropriate for those situations and reactors for which maximizing the amount of uranium in fuel, and thereby minimizing the overall critical salt volume, is the only goal.

However, the critical salt volume size is not the only cost driver in a molten salt reactor. Other characteristics of the fuel also affect the overall reactor costs including the thermal properties of the fuel salt such as volumetric heat capacity and thermal conductivity (which affect the size of the heat exchangers and piping needed, the velocities of the coolant and fuel salt through the system, and the volume of fuel salt, at any given time, that is outside of the reactor core being cooled), the corrosivity of the fuel salt (which affects the cost of materials needed for the salt-facing components of the reactor), and the amount of $UCl_4$ in the salt (which, because of its relatively high vapor pressure, means that a higher $UCl_4$ fuel salt will have a larger concentration of $UCl_4$ in the headspace above the salt, requiring more expensive equipment and materials for handling the offgas).

It has been determined that embodiments of fuel salts having relatively lower uranium density, but higher thermal conductivity and higher specific heat, can be more cost-effective than high-uranium content fuels salts in certain molten salt reactor designs. A fuel salt embodiment that is potentially more cost-effective than the $17UCl_3$-$71UCl_4$-$12NaCl$ embodiment is a ternary embodiment of $UCl_3$—$UCl_4$—NaCl having a melting point of less than 600° C.: a uranium density of greater than 1.5 g/cc; and a specific heat of greater than 600 J/kg-C. Embodiments of fuel salts may have melting points of less than 600° C., 550° C., 500° C., 450° C., 400° C., or even 350° C. Embodiments of fuel salts may have a uranium density of greater than 1.5 g/cc, 1.6 g/cc, 1.7 g/cc, 1.8 g/cc, 1.9 g/cc, 2 g/cc or even 2.1 g/cc. Embodiments of fuel salts may have a specific heat of greater than 600 J/kg-C, 700 J/kg-C, 800 J/kg-C, or even 900 J/kg-C.

Embodiments of fuel salts may also have reduced amounts of $UCl_4$ (relative to $17UCl_3$-$71UCl_4$-$12NaCl$) in order to be more reducing and less corrosive than $17UCl_3$-$71UCl_4$-$12NaCl$. Reduced corrosivity fuel salt allows for potentially less expensive components because the components are easier to fabricate and the salt-facing materials (such as nickel cladding instead of molybdenum cladding) are less expensive. Embodiments of uranium fuel salts have a molar fraction of $UCl_4$ from 1% to 50% by molar fraction $UCl_4$. Less corrosive embodiments of fuel salts may have less than 50 mol % $UCl_4$, less than 40%, 30%, 20%, 15% or even less than 10 mol % $UCl_4$. For example, fuel salts having from 2% to 30% by molar fraction $UCl_4$, from 5% to 20% by molar fraction $UCl_4$, and from 8% to 12% by molar fraction $UCl_4$ are contemplated. In some embodiments, less corrosive uranium fuel salt embodiments may have only trace (less than 1%), but measurable, amounts of $UCl_4$.

Embodiments of fuel salts have a molar fraction of $UCl_3$ from 1% to 33% by molar fraction $UCl_3$. Embodiments of fuel salts have a molar fraction of NaCl wherein the fissionable fuel salt has from 40% to 66% by molar fraction NaCl.

Based on thermal calculations, an example of a fuel salt embodiment as described above is $30UCl_3$-$10UCl_4$-$60NaCl$. Table 5, below, illustrates the difference in calculated material properties at 650° C. between the $30UCl_3$-$10UCl_4$-$60NaCl$ fuel salt and the high-uranium-density embodiment of $17UCl_3$-$71UCl_4$-$12NaCl$. Table 6, below, illustrates how the $30UCl_3$-$10UCl_4$-$60NaCl$ embodiment fuel salt improves the performance of a nominally-sized (2500 W), representative molten salt reactor relative to the $17UCl_3$-$71UCl_4$-$12NaCl$ fuel salt.

TABLE 5

Comparison of Thermal Properties Fuel Salt Embodiments

| Fuel Salt | $17UCl_3$—$71UCl_4$—$12NaCl$ | $30UCl_3$—$10UCl_4$—$60NaCl$ |
|---|---|---|
| Melting Point (° C.) | 491-512 | 508 estimated, (505.6 measured, see below) |
| Density (g/cc) | 3.68 | 3.44 |
| Uranium density (g/cc) | 2.27 | 1.83 |
| Specific Heat (J/kg-C.) | 544 | 937 |
| Volumetric Heat Capacity (J/m³) | 2.01e6 | 3.22e6 |

TABLE 6

Comparison of Thermal Properties Fuel Salt Embodiments

| Fuel Salt | $17UCl_3$—$71UCl_4$—$12NaCl$ | $30UCl_3$—$10UCl_4$—$60NaCl$ |
|---|---|---|
| Nominal Reactor Power (W) | 2500 | 2500 |
| Temperature difference across primary heat exchanger ($\Delta T$) | 78 | 85 |
| Fuel Salt Flow Rate Through Heat Exchangers (m/s) | 7 | 7 |
| Mass Flow Rate (kg/s) | 60,000 | 31,400 |
| Vol. Flow Rate Through Heat Exchangers ($m^3/s$) | 16.3 | 9.1 |
| Minimum Heat Exchanger Cross-sectional Area ($m^2$) | 2.33 | 1.30 |

As shown by the Tables, above, molten salt reactors utilizing embodiments of fuel salts can be operated at lower fuel salt flowrates because of the improved heat transfer properties, thus allowing both small pumps to be utilized. Molten salt reactors utilizing embodiments of fuel salts with from 40% to 66% by molar fraction NaCl will require a relatively larger core to have a comparable mass of uranium and/or power generation capability as opposed to more uranium-dense embodiments. However, molten salt reactors utilizing some embodiments of fuel salts with from 40% to 66% by molar fraction NaCl are calculated to require a lower total volume of fuel salt overall to operate because less fuel salt will be needed outside of the reactor for cooling purposes. This is even though the fuel salt embodiments are less dense in uranium. As fuel salt is very expensive, this reduction in the total amount of fuel to operate a reactor is a significant cost savings. Additional benefits of the fuel salt embodiments are stronger natural circulation in the core, reduced pump size because of the reduced volumetric flow rates, less expensive components due to ease of fabrication and cheaper materials, and decreased maintenance costs due to reduced radiation damage.

An example of fuel salts was manufactured in the lab. In the experiment, 0.12272 g of $UCl_3$, 0.04792 g of $UCl_4$ and 0.04089 g of NaCl were combined to form 0.21153 g of 30.143 mol % $UCl_3$-10.671 mol % $UCl_4$-59.186 mol % NaCl. A 31.31 mg sample of this compound was analyzed using thermogravimetric and differential scanning calorimetry analysis (TGA-DSC) using a Netzch STA 449 F3 Jupiter simultaneous thermal analyzer. The TGA-DSC analysis determined that the melting temperature of the sample was 505.6° C.

Figure 22:
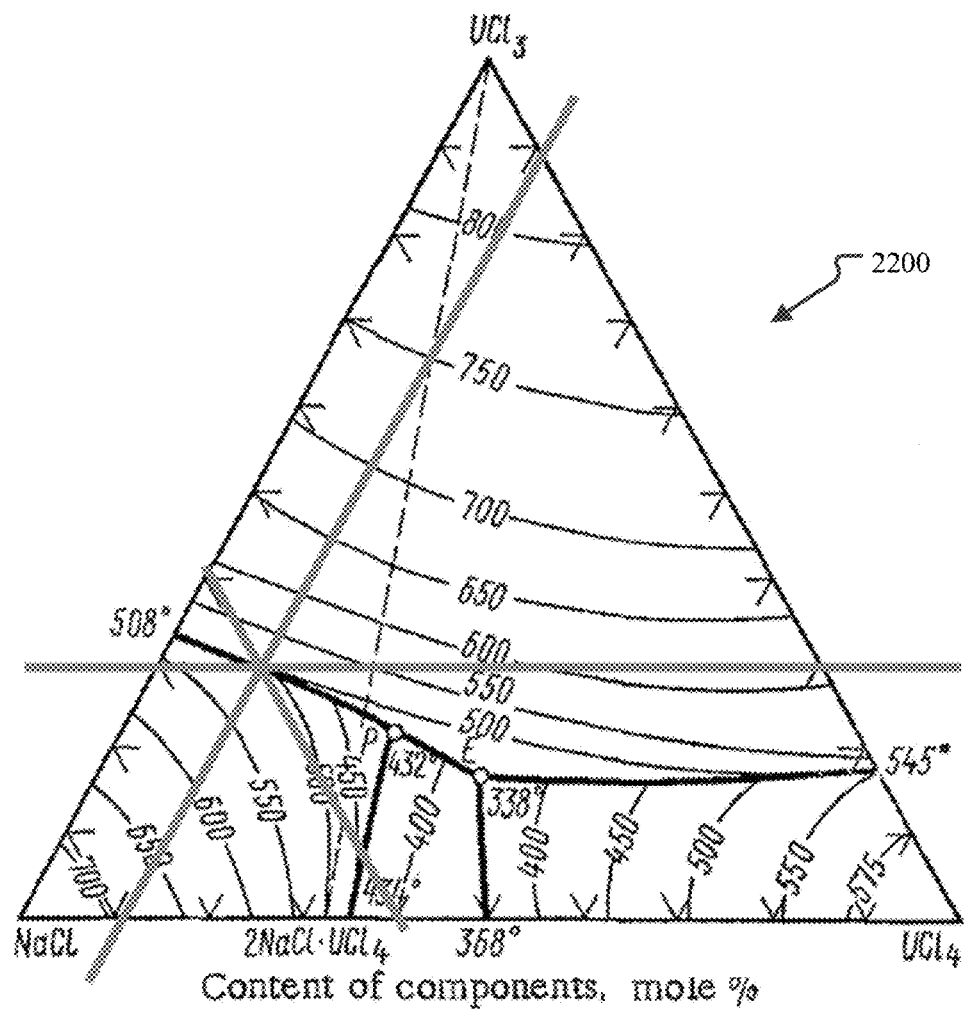
FIG. 22 illustrates the ternary phase diagram for $UCl_3$—$UCl_4$—$NaCl$ fuel salts showing the location on the diagram of the manufactured fuel salt embodiment.

FIG. 22 plots the location of the manufactured fuel salt on the ternary diagram of FIG. 4. The calculations of FIG. 4 for the manufactured embodiment identify the melting point as 508° C. As mentioned above, the laboratory analysis indicates that the measured melting point is 505.6° C.

Conclusion

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Unless otherwise indicated, all numbers expressing quantities of ingredients, properties such as molecular weight, reaction conditions, and so forth used in the specification and claims are to be understood as being modified in all instances by the term "about." The term "about" is not intended to either expand or limit the degree of equivalents which may otherwise be afforded a particular value. Further, unless otherwise stated, the term "about" shall expressly include "exactly," consistent with the discussions regarding ranges and numerical data. The term "about" in the context of the present disclosure means a value within 15% (±15%) of the value recited immediately after the term "about," including any numeric value within this range, the value equal to the upper limit (i.e., +15%) and the value equal to the lower limit (i.e., −15%) of this range. For example, the value "100" encompasses any numeric value that is between 85 and 115, including 85 and 115 (with the exception of "100%", which always has an upper limit of 100%).

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "4% to 7%" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5; etc. This same principle applies to ranges reciting only one numerical value. Furthermore, such an interpretation should apply regardless of the breadth of the range or the characteristics being described.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope of the technology described herein. For example, although not explicitly stated Raman spectroscopy may be but one of many techniques used to monitor fuel salt quality during operation of a molten salt reactor and, likewise, multiple Raman probes may be used in order to get an understanding of the variations in fuel salt quality at different locations within the reactor. Numerous other changes may be made which will readily suggest themselves to those skilled in the art and which are encompassed in the spirit of the disclosure and as defined in the appended claims.

What is claimed is:

1. An anti-proliferation fissionable uranium fuel salt consisting of:
   one or both of $UCl_3$ and $UCl_4$;
   one or more chloride salts selected from NaCl, $MgCl_2$, $CaCl_2$, or KCl; and
   one or more chloride salts of activation dopants wherein the activation dopants are selected from stable isotopes of Co, Cs, Ce, La, Pr, Nd, Bi, Ir, Sm, Eu, Gd, Tb, Dy, Ho, Er, Tm, Yb, Lu, or Ra;
   wherein the anti-proliferation fissionable uranium fuel salt has an FOM greater than 1.0 prior to fissioning the anti-proliferation fissionable uranium fuel salt and, after no more than 300 days of fissioning, the anti-proliferation fissionable uranium fuel salt has an FOM of less than 1.0 due to the conversion of the activation dopants into protecting isotopes.

2. The anti-proliferation fissionable uranium fuel salt of claim 1 wherein the one or more chloride salts of activation dopants are selected from $CoCl_3$, CsCl, $CeCl_3$, $BiCl_3$, $IrCl_3$, $LaCl_3$, $PrCl_3$, $NdCl_3$, $SmCl_3$, $EuCl_3$, $GdCl_3$, $TbCl_3$, $DyCl_3$, $HoCl_3$, $ErCl_3$, $TmCl_3$, $YbCl_3$, $LuCl_3$, or $RaCl_2$.

3. The anti-proliferation fissionable uranium fuel salt of claim 1 wherein the fuel salt contains no $UCl_4$.

4. The anti-proliferation fissionable uranium fuel salt of claim 1 wherein the fuel salt consists of $UCl_3$, NaCl, and one or more chloride salts of the activation dopants.

5. The anti-proliferation fissionable uranium fuel salt of claim 1 wherein the fuel salt consists of $UCl_3$, NaCl, $CaCl_2$), and one or more chloride salts of the activation dopants.

6. The anti-proliferation fissionable uranium fuel salt of claim 1 wherein the fuel salt consists of $UCl_3$, NaCl, KCl, and one or more chloride salts of the activation dopants.

7. The anti-proliferation fissionable uranium fuel salt of claim 1 wherein the fuel salt consists of $UCl_3$, $UCl_4$, NaCl, and one or more chloride salts of the activation dopants.

8. A protected fuel salt consisting of:
   one or both of $UCl_3$ and $UCl_4$;
   one or more chloride salts selected from NaCl, $MgCl_2$, $CaCl_2$), or KCl;
   one or more chloride salts of activation dopants wherein the activation dopants are selected from stable isotopes of Co, Cs, Ce, La, Pr, Nd, Bi, Ir, Sm, Eu, Gd, Tb, Dy, Ho, Er, Tm, Yb, Lu, or Ra; and
   and no more than 5 wt. % of any other component;

wherein the protected fuel salt has an FOM greater than 1.0 and, after no more than 300 days of fissioning, the fissioned fuel salt has an FOM of less than 1.0 due to the conversion of the activation dopants into protecting isotopes.

9. The protected fuel salt of claim 8 wherein the fuel salt contains no $UCl_4$.

10. The protected fuel salt of claim 8 wherein the fuel salt consists of $UCl_3$, NaCl, one or more chloride salts of the activation dopants, and no more than 5 wt. % of any other component.

11. The protected fuel salt of claim 8 wherein the fuel salt consists of $UCl_3$, $UCl_4$, NaCl, one or more chloride salts of the activation dopants, and no more than 5 wt. % of any other component.

12. The protected fuel salt of claim 8 wherein the fuel salt consists of $UCl_3$, NaCl, $CaCl_2$), one or more chloride salts of the activation dopants, and no more than 5 wt. % of any other component.

13. The protected fuel salt of claim 8 wherein the one or more chloride salts of the activation dopants are selected from $CoCl_3$, CsCl, $CeCl_3$, $BiCl_3$, $IrCl_3$, $LaCl_3$, $PrCl_3$, $NdCl_3$, $SmCl_3$, $EuCl_3$, $GdCl_3$, $TbCl_3$, $DyCl_3$, $HoCl_3$, $ErCl_3$, $TmCl_3$, $YbC_{13}$, $LuCl_3$, or $RaCl_2$.

14. The protected fuel salt of claim 8 wherein the protected fuel salt has a melting point at or below 800° C.

* * * * *